US007772953B2

(12) United States Patent
Huang et al.

(10) Patent No.: US 7,772,953 B2
(45) Date of Patent: Aug. 10, 2010

(54) SYMMETRICAL AUTO TRANSFORMER DELTA TOPOLOGIES

(75) Inventors: Jian Huang, Everett, WA (US); Jeffrey J. White, Shoreline, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 12/336,457

(22) Filed: Dec. 16, 2008

(65) Prior Publication Data

US 2010/0148899 A1 Jun. 17, 2010

(51) Int. Cl.
*H01F 30/12* (2006.01)
*H02M 7/06* (2006.01)

(52) U.S. Cl. ................................ 336/5; 336/12; 363/5

(58) Field of Classification Search .................... 363/2, 363/4, 5, 39, 44, 67, 69, 70, 125, 126; 336/2, 336/125

See application file for complete search history.

(56) References Cited

U.S. PATENT DOCUMENTS 4,779,181 A 10/1988 Traver et al.
5,093,614 A * 3/1992 Woodworth ................. 323/361
5,148,357 A * 9/1992 Paice ............................ 363/5
5,455,759 A * 10/1995 Paice .......................... 363/126
5,619,407 A 4/1997 Hammond
5,781,428 A 7/1998 Paice
6,101,113 A 8/2000 Paice
6,498,736 B1 * 12/2002 Kamath ....................... 363/44
6,995,993 B2 * 2/2006 Sarlioglu et al. .............. 363/44
7,095,636 B2 * 8/2006 Sarlioglu ..................... 363/39
7,207,521 B2 4/2007 Atkey et al.
7,210,653 B2 5/2007 Atkey et al.
2007/0267540 A1 11/2007 Atkey et al.
2007/0284480 A1 12/2007 Atkey et al.

OTHER PUBLICATIONS

Furmanczyk et al., "Demonstration of Very High Power Airborne AC to DC Converter", in proceed, SAE international power System Conference, Nov. 2004.
Kamath et al., "A Novel Autotransformer based 18-pulse Rectifier Circuit", in Proceed. IEEE APEC'02, vol. 2, pp. 795-801, Mar. 2002.
Kamath et al., "A Compact Autotransformer based 12-pulse Rectifier Circuit", in Proceed. IEEE IECON'01, vol. 2, pp. 1344-1349, Nov. 2001.

* cited by examiner

*Primary Examiner*—Anh T Mai
(74) *Attorney, Agent, or Firm*—Yee & Associates, P.C.; Kevin G. Fields

(57) ABSTRACT

Various embodiments of multi-phase transformers are disclosed. Exemplary transformer includes primary windings, secondary windings and third windings. Primary windings, secondary windings and third windings may include sub windings coupled to form functions. Primary windings are coupled at ends to form a delta configurations. Secondary windings are coupled to primary windings. Third windings are coupled to primary windings and secondary windings. Secondary windings and the third windings are magnetically coupled to primary windings. The outputs at second ends of third windings are greater than the outputs at the second ends of secondary windings. In some embodiments, the outputs at adjacent second ends of the third windings are substantially equal. In some embodiments, the phase angle difference of outputs at adjacent second ends of third windings are substantially equal. In some embodiments, the phase angle difference of outputs at adjacent second ends of secondary windings are substantial equal.

32 Claims, 37 Drawing Sheets

SYMMETRICAL AUTO TRANSFORMER DELTA TOPOLOGIES

CROSS REFERENCE TO RELATED APPLICATIONS

This application is related to U.S. patent application, entitled "SYMMETRICAL AUTO TRANSFORMER WYE TOPOLOGIES", Ser. No. 12/336,467, filed on even date herewith, the disclosure of which is incorporated herein by reference in its entirety.

BACKGROUND

1. Field of the Disclosure

This disclosure is directed to transformer topologies.

2. Related Art

In many applications, especially shipboard and aircraft applications, a high voltage direct current (DC) power is used to power motor controllers. Typically, a three phase alternating current (AC) voltage of 230 Volts RMS (root mean square) is generated in a ship or an aircraft. The generated AC voltage is applied to an auto transformer rectifier unit (ATRU) and rectified to generate a DC voltage of +/− 270 Volts. The rectified DC voltage from the ATRU is then used to power motor controllers. The output voltage of the motor controllers is limited by the rectified DC voltage of the ATRU. It is desirable to increase the voltage output of the motor controllers.

In order to increase the output voltage of the motor controllers, various approaches have been tried. One approach is to provide a higher input AC voltage. This approach has shortcoming because if the input AC voltage is increased, due to increased power, one has to increase the overall insulation level of the whole ship or aircraft. Increased input AC voltage may also lead to additional challenges like corona, high voltage spikes and component breakdown.

Another approach has been to cod a step-up autotransformer before the motor controller to get higher rectified output DC voltage or after the motor controller to get higher output AC voltage. Adding an additional step-up transformer before or after the motor controller adds additional heavy magnetic components the power generation system. Especially in a shipboard or aircraft applications, additional autotransformers may significantly add to the weight of the electrical subsystem and hence may not be desirable.

It is with these needs in mind the current disclosure arises.

SUMMARY OF THE DISCLOSURE

In one embodiment, a multi-phase transformer is disclosed. The multi-phase transformer includes a first group of windings, a second group of windings and a third group of windings. The first group of windings includes a plurality of primary windings. Each of the primary windings includes one or more sub primary windings coupled in series. A junction of two sub primary windings defines an interior junction.

Each end of the primary windings is coupled to an end of another primary winding to form a delta configuration. The junction of two primary windings defines an exterior junction. Each of the primary windings is configured to receive a phase of a multi-phase input voltage at the exterior junction.

The second group of windings includes a plurality of secondary windings. Each secondary winding has a first end and a second end. Each secondary winding is magnetically coupled to a primary winding. The first end of each secondary winding is coupled to a primary winding.

The third group of windings includes a plurality of third windings. Each third winding has a first end and a second end. Each third winding is magnetically coupled to a primary winding. The first end of each of the third winding is coupled to a secondary winding or to a primary winding.

The third group of windings is configured such that an output voltage at the second end of the third windings is higher than an output voltage at the second end of the secondary windings and the exterior junction of the primary windings.

In another embodiment, another multi-phase transformer is disclosed. The multi-phase transformer includes a first group of windings, second group of windings and third group of windings.

The first group of windings includes a plurality of primary windings. Each primary winding includes one or more sub primary windings that are coupled in series. A junction of two sub primary windings defines an interior junction. Each end of the primary windings is coupled to an end of another primary winding to form a delta configuration. The junction of two primary windings defines an exterior junction. Each of the primary windings is configured to receive a phase of a multi-phase input voltage at the exterior junction.

The second group of windings includes a plurality of secondary windings. Each secondary winding has a first end and a second end. Each secondary winding is magnetically coupled to a primary winding. The first end of each secondary winding is coupled to an interior junction of one of the primary windings.

The third group of windings includes a plurality of third windings. Each third winding has a first end and a second end. Each third winding is magnetically coupled to a primary winding. The first end of each of the third winding is coupled to a second end of a secondary winding or an exterior junction of the primary winding.

The third group of windings is configured such that an output voltage at the second end of the third windings is higher than an output voltage at the second end of the secondary windings and the exterior junction of the primary windings.

In yet another embodiment, a multi-phase transformer is disclosed. The multi-phase transformer includes a first group of windings, a second group of windings and a third group of windings. The first group of windings includes a plurality of primary windings. Each primary winding includes one or more sub primary windings coupled in series.

A junction of two sub primary windings defines an interior junction. Each end of the primary windings is coupled to an end of another primary winding to form a delta configuration. A junction of two primary windings defines an exterior junction. Each of the primary winnings is configured to receive a phase of a multi-phase input voltage at the exterior junction.

The second ground of windings includes a plurality of secondary windings. Each secondary winding has a first end and a second end. Each secondary winding is magnetically coupled to a primary winding. The first end of each secondary winding is coupled to an interior junction of one of the primary windings.

The third group of windings includes a plurality of third windings. Each third winding has a first end and a second end. Each third winding is magnetically coupled to a primary winding. The first end of each of the third winding coupled either to an interior junction of one of the primary windings other than an interior junction to which a secondary winding is coupled or to an exterior junction of the primary winding.

The third group of windings is configured such that an output voltage at the second end of the third windings is higher than an output voltage at the second end of the secondary windings and the exterior junction of the primary windings.

In yet another embodiment, a multi-phase transformer is disclosed. The multi-phase transformer includes a first group of windings, a second group of windings and a third group of windings. The first group of windings includes a plurality of primary windings. Each primary winding includes one or more sub primary windings coupled in series.

A junction of two sub primary winding defines an interior junction. Each end of the primary windings is coupled to an end of another primary winding to form a delta configuration. A junction of two primary windings defines an exterior junction. Each of the primary windings is configured to receive a phase of a multi-phase input voltage at the exterior junction.

The second group of windings includes a plurality of secondary windings. Each secondary winding has a first end and a second end. Each secondary winding is magnetically coupled to a primary winding. The first end of each secondary winding is coupled to an interior junction of one of the primary windings.

The third group of windings includes a plurality of third windings. Each third winding has a first end and a second end. Each third winding is magnetically coupled to a primary winding. The first end of each of the third winding is coupled to a second end of a secondary winding, an interior junction of the primary winding or an exterior junction of the primary winding.

The third group of windings is configured such that an output voltage at the second end of the third windings is higher than an output voltage at the second end of the secondary windings and the exterior junction of the primary windings.

In yet another embodiment, a multi-phase transformer with a first group of windings, a second group of windings and a third group of windings is disclosed. The first group of windings includes a plurality or primary windings. Each primary winding includes ore or more sub primary windings coupled in series.

A junction of two sub primary winding defines an interior junction. Each end of the primary windings is coupled to an end of another primary winding to form a delta configuration. The junction of two primary windings defines an exterior junction. Each of the primary windings is configured to receive a phase of a multi-phase input voltage at the exterior junction.

The second group of windings includes a plurality of secondary windings. Each secondary winding has a first end and a second end. Some of the secondary windings include a plurality of sub-winding connected in series. Junctions of two sub-windings define a sub-junction. Each secondary winding is magnetically coupled to a primary winding. First end of each secondary winding is coupled to an interior junction of one of the primary windings.

The third group of windings includes a plurality of third windings. Each third winding has a first end and a second end. Each third winding is magnetically coupled to a primary winding. The first end of each of the third winding is coupled to a second end of a secondary winding, a sub-junction of a secondary winding or an exterior junction of the primary winding.

The third group of windings is configured such that an output voltage at the second end of the third windings is higher than an output voltage at the second end of the secondary windings and the exterior junction of the primary windings.

In yet another embodiment, a multi-phase transformer with a first group of windings, a second group of windings and a third group of windings is disclosed. The first group of windings includes a plurality of primary windings. Each primary winding includes one or more sub primary windings coupled in series. A junction of two sub primary winding defines an interior junction. Each end of the primary windings is coupled to an end of another primary winding to form a delta configuration. The junction of two primary windings defines an exterior junction. Each of the primary windings is configured to receive a phase of a multi-phase input voltage at the exterior junction. The second group of windings includes a plurality of secondary windings. Each secondary winding has a first end and a second end. Some of the secondary windings include a plurality of sub-windings connected in series. A junction of two sub-windings defines a sub-junction. Each secondary winding is magnetically coupled to a primary winding. The first end of each secondary winding is coupled to an interior junction of one of the primary windings or the exterior junction of the primary windings. The third group of windings includes a plurality of third windings. Each third winding has a first end and a second end. Some of the third windings include a first sub-winding and a second sub-winding. The first sub-winding and the second sub-winding of the third winding are connected in series a one end. A junction of two sub-windings defines a sub-junction. Each of the third winding is magnetically coupled to a primary winding. The first end of each of the third winding is coupled to a sub-junction of a secondary winding or an exterior junction of the primary winding. The third group of windings is configured such that an output voltage at the second end of the third windings is higher than an output voltage at the second end of the secondary windings and the exterior junction of the primary windings.

This brief summary has been provided so that the nature of the disclosure may be understood quickly. A more complete understanding or the disclosure may be obtained by reference to the following detailed description of embodiments, thereof in connection with the attached drawings.

BRIEF DESCRIPTION OF THE DRAWINGS

The foregoing features and other features of the present disclosure will now be described with reference to the drawings. In the drawings, the same components have the same reference numerals. The illustrated embodiment is intended to illustrate, but not to limit the disclosure. The drawings include the following figures.

DETAILED DESCRIPTION

Definitions:

The following definitions are provided for convenience, as they are used in describing various embodiments of this disclosure.

"Exterior junction" means a junction of two primary windings coupled together at their ends. Three primary windings may be coupled at their ends to form a delta winding configuration.

"First group of winding" means a collection of plurality of primary windings.

"Interior junction" means a junction of two sub primary windings of a primary winding.

"Primary winding" is a winding may have one or more sub primary windings coupled in series. Primary windings may have two ends.

"Second group of windings" means a collection of a plurality of secondary windings.

"Secondary winding" is a winding that may have a winding or a plurality of sub-windings. Secondary windings have at least a first end and a second end. In some embodiments, the sub-windings may be coupled together to form a sub-junction. Secondary windings may be magnetically coupled to a primary winding. Sub-windings of secondary winding may be magnetically coupled to the same primary winding or a different primary winding.

"Sub-junction" means a junction of sub-windings. In some embodiments, two sub-windings may be coupled in series. In some embodiments, three sub-windings may be coupled at one end to form a WYE configuration.

"Third group of windings" means a collection of a plurality of third windings.

"Third winding" means a winding that may have a winding or a plurality of sub-windings. Third windings have at least a first end and a second end. Third windings may be magnetically coupled to a primary winding. Sub-windings of third winding may be magnetically coupled to the same primary winding or a different primary winding.

To facilitate an understanding of the various embodiments, the general architecture of an auto-transformer rectifier system with an exemplary auto-transformer will be described. The specific architecture of various alternate embodiments of auto-transformers will then be described with reference to the general architecture.

Figure 1A:
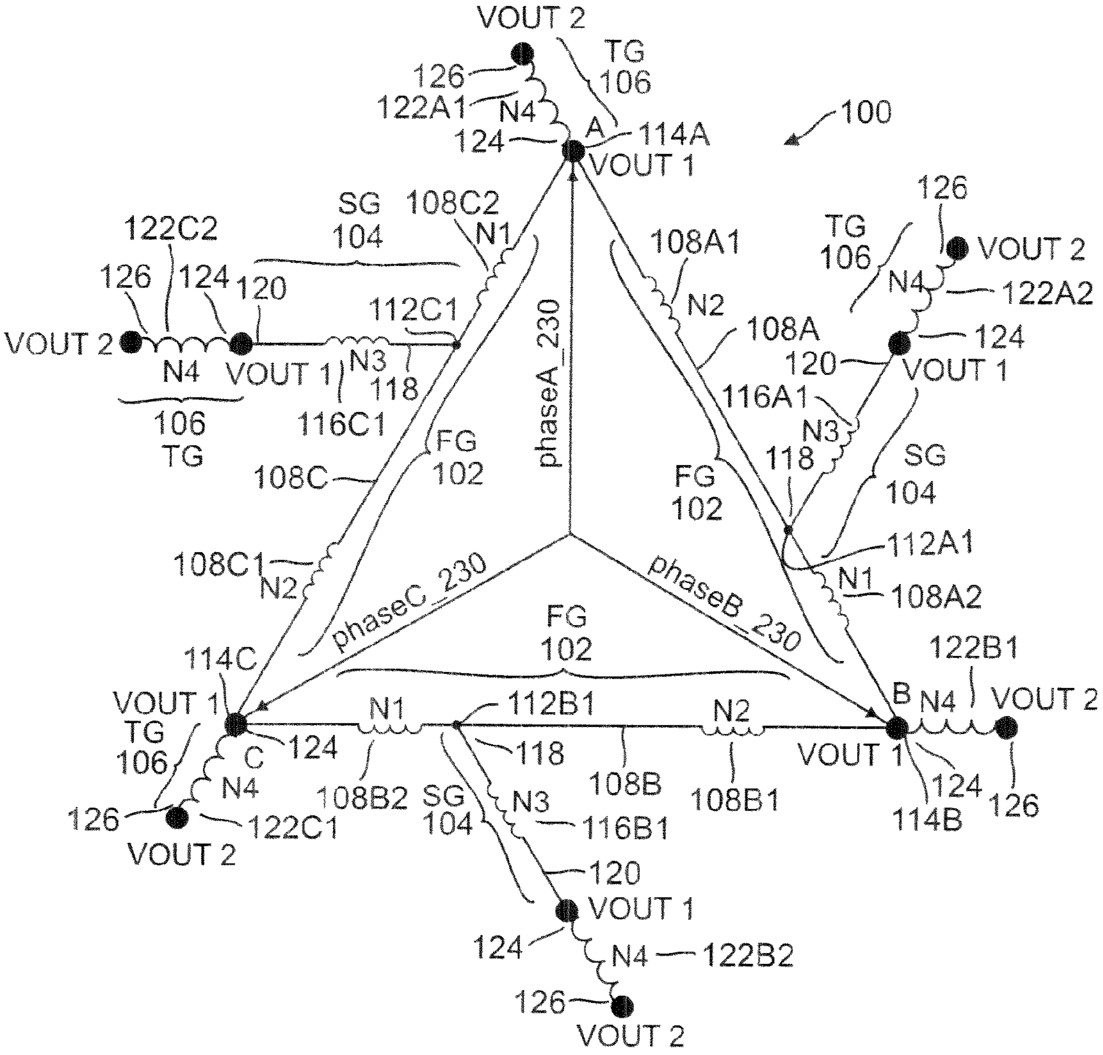
FIG. 1A is a winding diagram for an exemplary multi-phase auto-transformer.
Figure 1B:
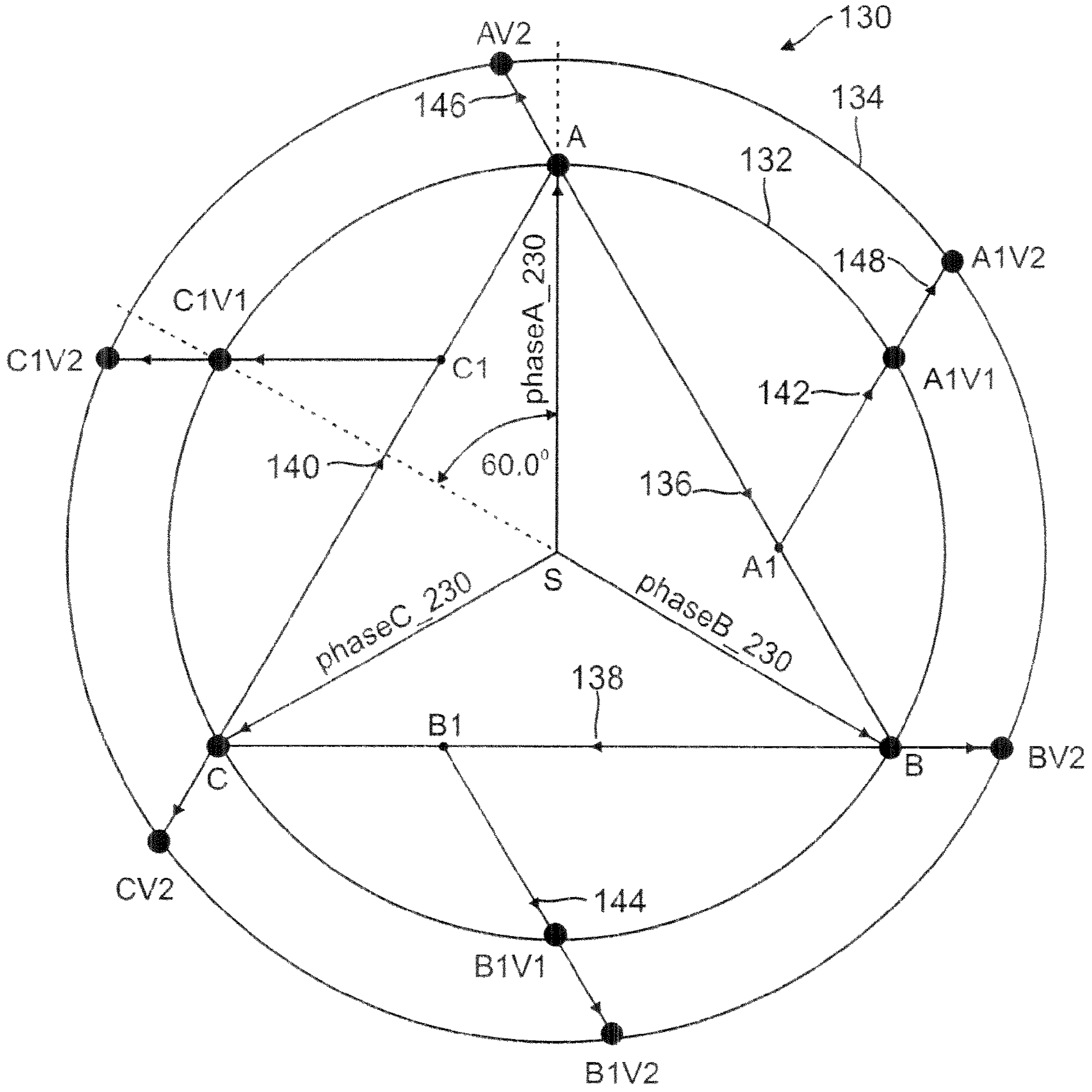
FIG. 1B is a phasor diagram for the multi-phase auto-transformer of FIG. 1A.

A multi-phase transformer 100 is described with reference to FIG. 1A and 1B. FIG. 1A is a winding diagram of a multi-phase transformer 100. FIG. 1B is a phasor diagram for the multi-phase transformer 100. Transformer 100 may be six phase or twelve pulse multi-phase transformer.

Referring to FIG. 1A, transformer 100 may include a first group of windings 102, a second group of windings 104 and a third group of windings 106.

The first group of windings 102 may include a plurality of primary windings 108A-108C. Each primary winding may include one or more sub primary windings coupled in series, with a junction of two sub primary windings defining an interior junction. For example, primary winding 108A may include sub primary windings 108A1-108A2 coupled in series to define interior junction 112A1. Similarly, primary winding 108B may include sub primary windings 108B1-108B2 coupled in series to define interior junction 112B1 and primary winding 108C may include sub primary windings 108C1-108C2 coupled in series to define interior junction 112C1.

Each end of the primary windings is coupled to the ends of the other primary winding to form a delta configuration with the junction of two primary windings defining an exterior junction. For example, an end of primary winding 108A and 108C is coupled together to define exterior junction 114A. Similarly, an end of primary winding 108A and 108B is coupled together to define exterior junction 114B. Furthermore, an end of primary winding 108B and 108C is coupled together to define exterior junction 114C.

Each of the primary winding may be configured to receive a phase of a multi-phase input voltage at the exterior junctions. For example primary winding 108A may a phase at exterior junctions 114A and 114B. Similarly, primary winding 108B may receive another phase at exterior junctions 114B and 114C. Furthermore, primary winding 108C may receive yet another phase at exterior junctions 114C and 114A.

The second group of windings 104 includes a plurality of secondary windings, for example, secondary windings 116A1-116C1. Each secondary winding 116A1-116C1 includes a first end 118 and a second end 120. Each secondary winding 116A1-116C1 may be magnetically coupled to one of the primary windings 108A-108C. The first end 118 of each secondary winding 116A1-116C1 may be coupled to one of the primary windings 108A-108C.

The third group of windings 106 may include a plurality of third windings. For example, third windings 122A1, 122A2, 122B1, 122B2, 122C1 and 122C2. Each third winding 122A1-122C2 includes a first end 124 and a second end 126. Each third winding 122A1-122C2 may be magnetically coupled to one of the primary windings 108A-108C.

The first end 124 of each of the third winding 122A1-122C2 may be coupled to a secondary winding 116A1-116C1 or to a primary winding 108A-108C. The third group of windings 106 may be configured with respect to the first group of windings 102 and the second group of windings 104 such that the output voltage Vout2 at the second end 126 of the third windings 122A1-122C2 is higher than the output voltage Vout1 at the second end 120 of the secondary windings 116A1-116C1 and the exterior junction 114A-114C of the primary windings 108A-108C.

In one embodiment, the first end of secondary winding may be coupled to the interior junction of a primary winding. For example, the first end 118 of the secondary winding 116A1 may be coupled to the interior junction 112A1 of primary winding 108A. The first end 118 of the secondary winding 116B1 may be coupled to the interior junction 112B1 of the primary winding 108B. The first end 118 of the secondary winding 116C1 may be coupled to the interior junction 122C1 of primary winding 108C.

In one embodiment, the second end of a secondary winding may be coupled to the first end of a third winding. For example, the second end 120 of secondary winding 116A1 may be coupled to the first end 124 of the third winding 122A2, the second end 120 of secondary winding 116B1 may be coupled to the first end 124 of the third winding 122B2 and the second end 120 of the second winding 116C1 may be coupled to the first end 124 of the third winding 122C2.

In one embodiment, the phase angle difference of the output voltage Vout2 at two adjacent second ends or third windings are substantially same. For example, the phase angle difference of the output voltage Vout2 at second end 126 of two adjacent third windings 122A1-122A2, 122A2-122B1, 122B1-122B2, 122B2-122C1, 122C1-122C2 and 122C2-122A1 are substantially same.

In one embodiment, the output voltage Vout2 an the second end of the third windings are substantially equal. For example, the output voltage Vout2 at the second end 126 of the third windings 122A1-122C2 are substantially same.

In one embodiment, output voltage Vout1 at the second end of secondary windings 116 and at the exterior junction of the primary windings 108 are substantially equal. For example, the output voltage Vout1 at the second end 120 of secondary windings 116A1-116C1 and at the exterior junction 114A-114C of primary windings 108A-108C are substantially equal.

In one embodiment, the output voltage Vout2 may be greater than output voltage Vout1.

FIG. 1A also shows exemplary number of turns for various windings and sub windings, with some of the windings or sub windings having substantially same number of turns. For example, the sub-primary windings 108A1, 108B1 and 108C1 have substantially same number of turns N2. The sub-primary windings 108A2, 108B2 and 108C2 have substantially same number of turns N1. Similarly, the secondary windings 116A1, 116B1 and 116C1 have substantially same number of turns N3. Further, the third windings 122A1-122C2 have substantially same number of turns N4.

Now referring to FIG. 1B, an exemplary phasor diagram 130 for the multi-phase transformer 100 of FIG. 1A is disclosed. As one skilled in the art appreciates, the phasor diagram graphically depicts various aspects the multi-phase transformer. For example, the phasor diagram depicts the relationship between the first group of windings, second group of windings and the third group of windings. More specifically, various windings are represented by lines in a phasor diagram and the length of a line represents the number of turns of the winding. The lines in a phasor diagrams are vector lines depicting the vector of the induced voltage. Two vector lines that are parallel to each other represent magnetic coupling between corresponding two windings. The radial length of each segment between two junctions along the circumference represents the phase angle difference between the output signals at those junctions, with the full circle representing 360 degrees. The common center of the circle represents the effective electrical neutral position.

The phasor diagram 130 includes a first circle 132 and a second circle 134, both having a common center S. The sides AB, BC and CA of triangle ABC represent the primary windings 108A-108C respectively. Points A1, B1 and C1 on lines AB, BC and CA correspond to the interior junctions 112A1, 112B1 and 112C1 respectively of the primary windings 108A-108C. Lines A-A1, A1-B, B-B1, B1-C, C-C1 and C1-A represent sub primary windings 108A1, 108A2, 108B1, 108B2, 108B1 and 108C2 respectively.

Points A1V1, B1V1 and C1V1 represent the second end 120 the secondary windings 116A1, 116B1 and 116C1 respectively. Similarly, points A1V2, B2V2 and C1V2 represent second end 126 of third windings 122A1, 122B1 and 122C1 respectively.

For example, lines A1-A1V1, B1-B1V1 and C1C1V1 represent the secondary windings 116A1, 116B1 and 116C1 respectively. Lines A-AV2, A1V1-A1V2, B-BV2, B1V1-B1V2, C-CV2 and C1V1-C1V2 represent the third windings 122A1, 122A2, 122B1, 122B2, 122C1 and 122C2 respectively.

For example, the length of the lines A-A1, B-B1 and C-C1 present the number of turns N2 for the sub-primary windings 108A1, 108B1 and 108C1. The length of the lines A1-B, B1-C and C1-A represent the number of turns N1 for the sub-primary windings 108A2, 108B2 and 108C2.

Length of the lines A1-A1V1, B1-B1V1 and C1-C1V1 represent the number of turns N3 for the secondary windings 116A1, 116B1 and 116C1 respectively. Length of the lines A-AV2, A1V1-A1V2, B-BV2, B1V1-B1V2, C-CV2 and C1V1-C1V2 represent the number of turns N4 for the third windings 122A1-122C2 respectively.

In summary, on the phasor diagram, the points A, B and C represent the exterior junction 114A-114C of the primary windings, points A1V1, S1V1 and C1V1 represent the second end 120 of the secondary windings 116A1-116C1 and points AV2, A1V2, BV2, B1V2, CV2 and C1V2 represent the second end 126 of the third windings 122A1-122C2 respectively.

The lines SA, SB and SC represent the input AC voltage Vin applied to the exterior junctions A, B and C of the primary windings. As it is evident from the phasor diagram, a three phase input voltage Vin depicted as phaseA_230, phaseB_230 and phaseC_230 is applied, with each phase separated by about 120 degrees.

As previously described, the lines in a phasor diagrams are vector lines depicting the vector of the induced voltage. For example, the vector of induced voltage in primary windings AB, BC and CA are depicted by the arrows 136, 138 and 140. Similarly, the arrows on lines representing the secondary windings and the third windings represent the vector of induced voltage. For example, arrows 142 and 144 represent the vector of induced voltage in secondary winding 116A1 and 116B1 respectively. The arrows 146 and 148 represent the vector of induced voltage in the third windings 122A1 and 122A2 respectively.

In one embodiment, the vector of induced voltage in the secondary windings are such that they are either in phase or 180 degrees cut of phase with the vector of induced voltage in a primary winding to which they are magnetically coupled. In one embodiment, the vector of induced voltage in the secondary windings are such that the phase angle difference of the output voltage at two adjacent second ends of the secondary windings are substantially same.

In one embodiment, the vector of induced voltage in the third windings are such that they are either in phase or 180 degrees out of phase with the vector of induced voltage in a primary winding to which they are magnetically coupled. In one embodiment, the vector of induced voltage in the third windings are such that the phase angle difference of the output voltage at two adjacent second ends of the third windings are substantially same.

The phasor diagram 130 shows an exemplary vector of induced voltage in the primary windings, secondary windings and the third windings.

For example, in one embodiment, the vector of induced voltage in each of the secondary windings is in phase with the vector of induced voltage in a primary winding other than the primary winding to which the secondary winding is coupled. For example, the vector of induced voltage in the secondary winding depicted by line A1-A1V1 may be in phase with the vector of induced voltage in the primary winding depicted by line CA. Similarly, the vector of induced voltage in the secondary winding depicted by line B1-B1V1 and secondary winding depicted by line C1-C1V1 are in phase with vector of induced voltage in the primary windings depicted by lines AB and BC respectively.

For example, in one embodiment, the vector of induced voltage in a third winding coupled to a secondary winding may be in-phase with the vector of the corresponding secondary winding. Further, the vector of induced voltage in a third winding coupled to a primary winding may be about 180 degrees out of phase with the vector of induced voltage in one of the primary windings coupled to the third winding, such that the phase angle difference of the output voltage at two adjacent second ends of the third windings are substantially same.

Figure 2:
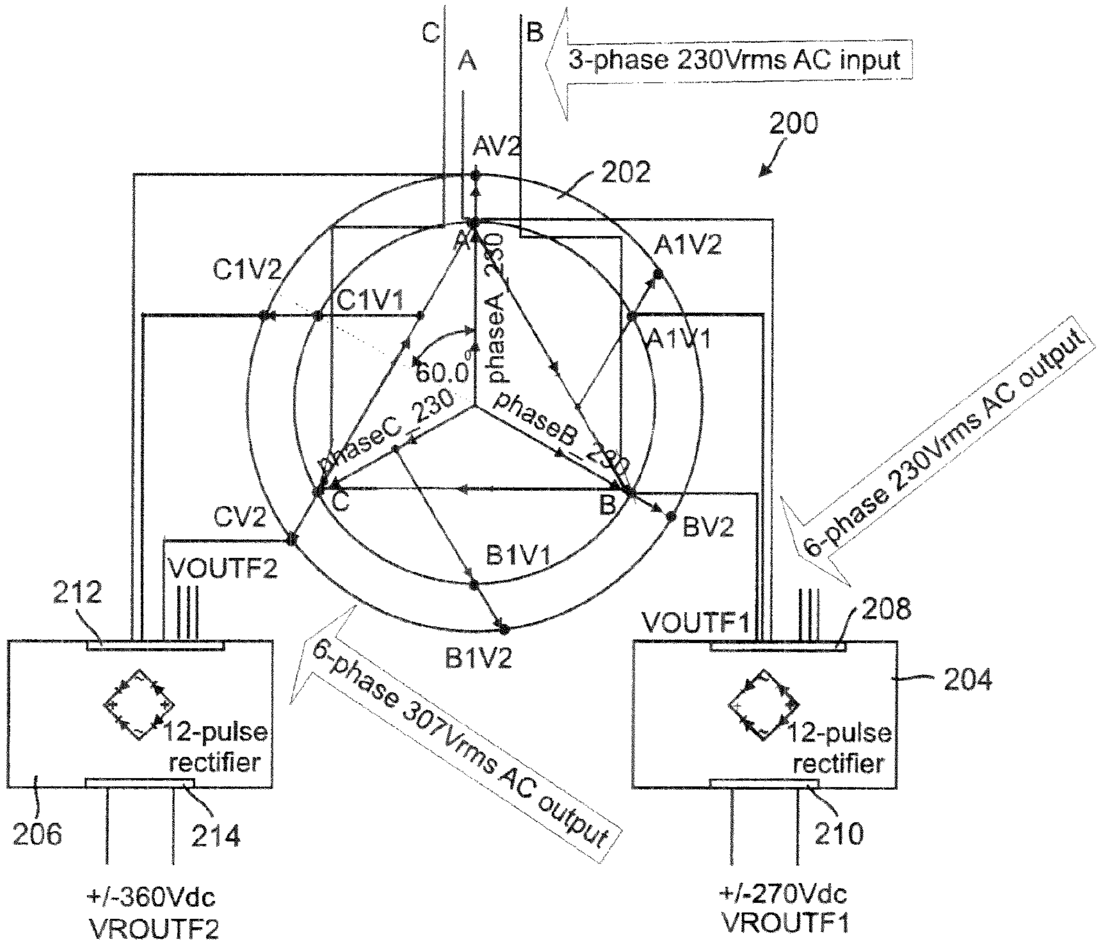
FIG. 2 is an exemplary auto-transformer rectifier unit for use with multi-phase auto transformers.

FIG. 2 shows an exemplary auto-transformer rectifier system 200 for use with this disclosure. The auto-transformer rectifier system includes an auto-transformer 202, a first multi-pulse rectifier 204 and a second multi-pulse rectifier 206. The auto-transformer 202 may be similar to the auto-transformer described with reference to FIGS. 1A and 1B.

The first multi-phase rectifier 204 includes a first input block 208 and a first output block 210. The first input block 208 may be configured to couple to the second end of secondary windings to receive the first output voltage VoutF1 from the auto-transformer 202. The first multi-phase rectifier 204 rectifies the first output voltage VoutF1 and provides a rectified first output voltage VRoutF1. The first output voltage VoutF1 may be same as the output voltage Vout1 of the auto-transformer described with reference to FIGS. 1A and 1B.

The second multi-phase rectifier 206 includes a second input block 212 and a second output block 212. The second input block 212 may be configured to couple to the second end of third windings to receive second output voltage VoutF2 from the auto-transformer. The second multi-phase rectifier 206 rectifies the second output voltage VoutF2 and provides a rectified second output voltage VRoutF2. The second output voltage VoutF2 may be same as the output voltage Vout2 of the auto-transformer described with reference to FIGS. 1A and 1B.

The first output voltage VoutF1 may be same as the output voltage Vout1 of the auto-transformer described with reference to FIGS. 1A and 1B. The second output voltage VoutF2 may be same as the output voltage Vout2 of the auto-transformer described with reference to FIGS. 1A and 1B. As previously described, the auto-transformer 100 of FIG. 1A and 1B in one embodiment, provides a six phase output Vout1 at the second end of the secondary windings and a six phase output voltage Vout2 at the second end of third windings.

In an exemplary system, an input voltage of 230 Volts rms AC voltage may be applied to the auto-transformer. This will generate a 230 Volts rms AC voltage at the output of the second end of secondary windings, with six phases, with each phase having a positive pulse and a negative pulse. The input voltage of 230 Volts rms AC voltage also generates a 307 Volts rms AC voltage at the output of the second end of third windings.

The six 230 Volts rms positive pulses are applied to the first input block and rectified by the first multi-phase rectifier 204 to provide +270 Volts DC at the first output block 210. The six negative 230 Volts rms pulses are also applied to the first input block 208 and rectified by the first multi-phase rectifier 204 to provide −270 Volts CC at the first output block 210.

The six 307 Volts rms positive pulses are applied to the second input block 212 and rectified by the second multi-phase rectifier 206 to provide +360 Volts DC at the second output block 214. The six negative 307 Volts rms pulses are applied to the second input block 212 and rectified by the second multi-phase rectifier 206 to provide −360 Volts DC at the second output block 214.

Although the exemplary embodiment has been described with reference to a six phase (12 pulse) auto-transformer and a 12 pulse rectifier, the disclosure is not limited to this specific example and can be modified suitably to construct auto-transformer rectifier systems to support auto-transformers with different number of output phases. For example, the auto-transformer rectifier system may be adapted for use with various embodiments of multi-phase transformers described in this disclosure.

Figure 3A:
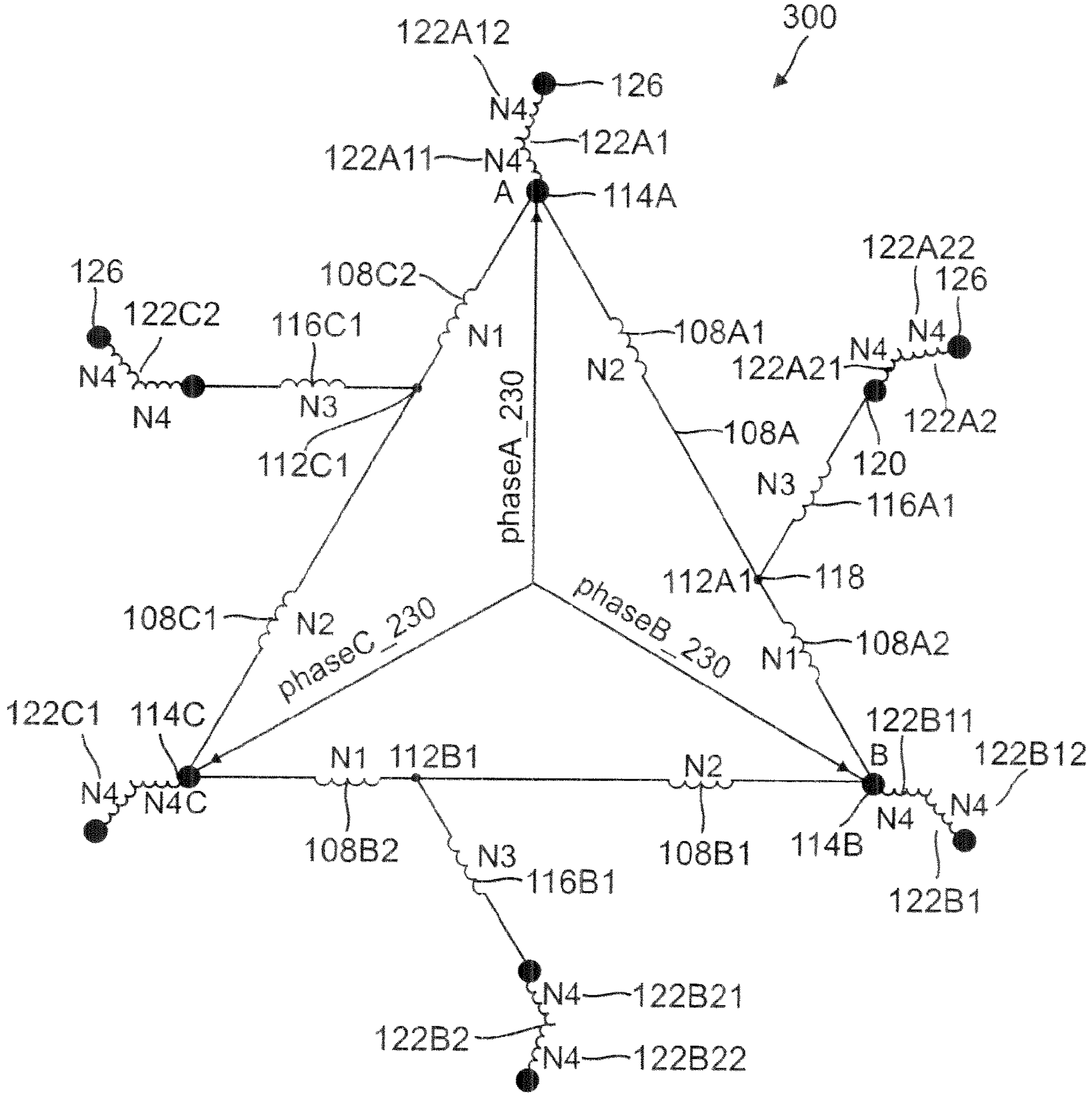
FIG. 3A is a winding diagram for an alternate multi-phase auto-transformer.
Figure 3B:
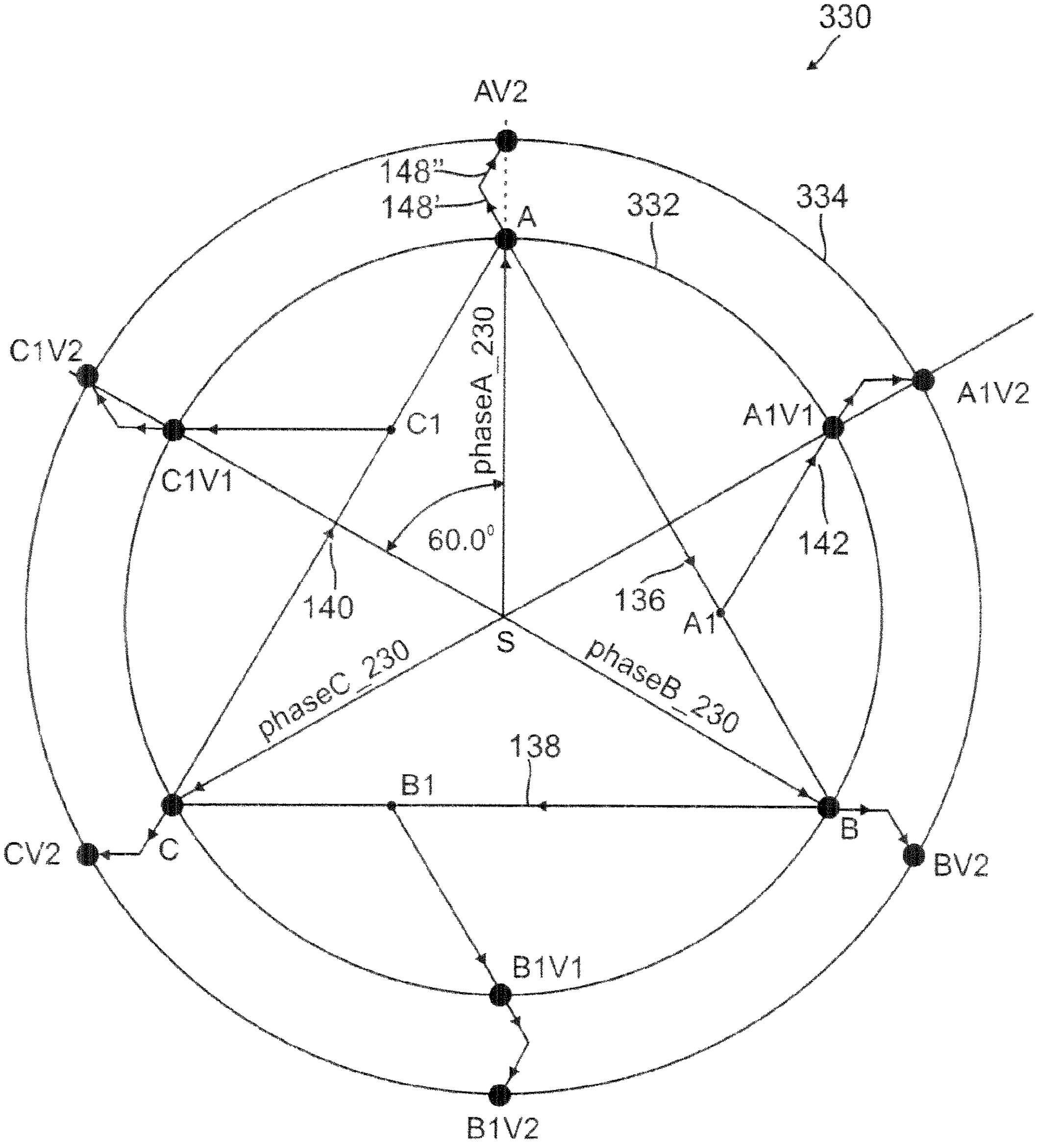
FIG. 3B is a phasor diagram for the multi-phase auto-transformer of FIG. 3A.

Another embodiment of a multi-phase transformer 300 is described with reference to FIGS. 3A and 3B. Transformer 300 is another exemplary six phase or twelve pulse multi-phase transformer. The multi-phase transformer 300 described with reference to FIGS. 3A and 3B is substantially similar to the multi-phase transformer 100 described with reference to FIGS. 1A and 1B except that the third group of windings 106 include a plurality of third windings 122A1-122C2, with each third winding 122A1-122C2 including at least two sub-windings connected in series. Similarities and differences between auto-transformer 100 and auto-transformer 300 will be described in more detail below.

FIG. 3A is a winding diagram for an exemplary multiphase transformer 300. The transformer 300 includes a first group of windings 102, a second group of windings 104 and a third group of windings 106. The first group of windings 102 and the second group of windings 104 of auto-transformer 200 are constructed and coupled similar to the auto-transformer 100 described with reference to FIGS. 1A and 1B, with same reference numerals describing the same elements.

The third group of windings 106 includes a plurality of third windings 122A1-122C2, with ends of the third windings 122A1-122C2 defining a first end 124 and a second end 126. Each of the third winding 122A1-122C2 includes at least two sub-windings connected in series. For example, third winding 122A1 includes a first sub-winding 122A11 and second sub-winding 122A12 connected in series at one end. The other end of first sub-winding 122A11 corresponds to the first end 124 of the third winding 122A1 and the other end of second sub-winding 122A12 corresponds to the second end 126 of the third winding 122A1.

Each of the third winding 122A1-122C2 may be magnetically coupled to a primary winding 108A-108C. For example, the first sub-winding 122A11 may be magnetically coupled to a primary winding 108A-108C and the second sub-winding 122A12 may be magnetically coupled to a primary winding 108A-108C. The second sub-winding 122A12 may be magnetically coupled to a primary winding 108A-108C different than the primary winding that the first sub-winding 122A11 may be magnetically coupled to.

The first end 124 of each of the third winding 122A1-122C2 may be coupled to a secondary winding 116A-116C or to a primary winding 108A-108C with the third group of windings 106 configured with respect to the first group of windings 102 and the second group of windings 104 such that the output voltage Vout2 at the second end 126 of the third windings 122A1-122C2 may be higher than the output voltage Vout1 at the second end 120 of the secondary windings 116A1-116C1 and the exterior junction 114A-114C of the primary windings 108A-108C respectively.

In one embodiment, the first end 118 of the secondary winding 116A1-116C1 may be coupled to the interior junction of the primary winding 108A-108C. For example, the first end 118 of the secondary winding 116A1 may be coupled to interior junction 112A1 of primary winding 108A.

In one embodiment, the first end 124 of some of the third windings 122A1-122C2 may be coupled to the second end 120 of the secondary windings 116A1-116C1. For example, the first end 124 of the third winding 122A2 may be coupled to the second end 120 of secondary winding 116A1.

In one embodiment, the phase angle difference of the output voltage Vout2 at two adjacent second ends 126 of third windings 122A1-122C2 are substantially same.

In one embodiment, the output voltage Vout2 at the second end 126 of the third windings 122A1-122C2 are substantially equal and the output voltage Vout1 at the second end 120 of secondary windings 116A1-116C1 and at the exterior junction 114A-114C the primary windings 108A-108C are substantially equal.

In one embodiment, the output voltage Vout2 may be greater than output voltage Vout1.

FIG. 3A also shows exemplary number of turns for various windings and sub windings, with some of the windings or sub windings having substantially same number of turns. For example, the sub-primary windings 108A1, 108B1 and 108C1 have substantially same number of turns N2. The sub-primary windings 108A2, 108B2 and 108C2 have substantially same number of turns N1. Similarly, the secondary windings 116A1, 116B1 and 116C1 have substantially same number of turns N3. For example, the first sub-windings 122A21 and 122B21 of third windings 122A2 and 122B2 have substantially same number of turns N4.

Now referring to FIG. 3B, an exemplary phasor diagram 330 tar the multiphase transformer 300 of FIG. 3A is disclosed.

The phasor diagram 330 includes a first circle 332 and a second circle 334, both having a common center S. The sides AB, BC and CA of triangle ABC represent the primary windings 108A-108C respectively. The phasor diagram details within the first circle 332 is similar to the phasor diagram 130 described with reference to FIG. 1B. Only differences between phasor diagram 330 and phasor diagram 130 as it relates to the third windings will be discussed now.

For example, the line A-A' represents the first sub-winding 122A11 of third winding 122A1. Similarly the line A'-AV2 represents the second sub-winding 122A12 of third winding 122A1. The arrow 148' represents the vector of induced voltage in the first sub-winding 122A11 and the arrow 148" represents the vector of induced voltage in the second sub-winding 122A12. Other third windings 122A2-122C2 are similarly represented in the phasor diagram 330.

The lines SA, SB and SC represent the input AC voltage Vin may be applied to the exterior junctions A, B and C of the primary windings. As it is evident from the phasor diagram, a three phase input voltage Vin depicted as phaseA_230, phaseB_230 and phaseC_230 is applied, with each phase separated by 120 degrees.

As previously described, the lines in a phasor diagrams are vector lines depicting the vector of the induced voltage. For example, the vector of induced voltage in primary windings AB, BC and C are depicted by the arrows 136, 138 and 140.

In one embodiment, the vector of induced voltage in the secondary windings are such that they are either in phase or 180 degrees out of phase with the vector of induced voltage in a primary winding to which they are magnetically coupled. In one embodiment, the vector of induced voltage in the secondary windings are such that the phase angle difference of the output voltage at two adjacent second ends the secondary windings are substantially same.

In one embodiment, the vector of induced voltage in the third windings and sub-windings are such that they are either in phase or 180 degrees out of phase with the vector of induced voltage in a primary winding to which they are magnetically coupled. In one embodiment, the vector of induced voltage in the third windings and sub-windings are such that the phase angle difference of the output voltage at two adjacent second ends of the third windings are substantially same.

The phasor diagram 330 shows an exemplary vector of induced voltage in the primary windings, secondary windings and the third windings.

In one embodiment, the vector of induced voltage in a sub-winding of a third winding is different than the vector of induced voltage in another sub-winding of the third winding. For example, the vector of induced voltage in sub-winding 122A11 is different than the vector of induced voltage in sub-winding 122A12 of third winding 122A1.

In one embodiment, for the third winding coupled to a second winding, (for example, third winding 112A2 coupled to second winding 116A1) the vector of induced voltage in the first sub-winding (example, 122A21) may be in-phase with the vector of induced voltage in the second winding and the vector of induced voltage in the second sub-winding (example, 122A22) may be 180 degrees out phase with the vector of induced voltage in a primary winding other than the primary winding to which the corresponding secondary winding may be coupled and that may be different than the primary winding that may be in-phase with the second winding (example, primary winding 108B).

In one embodiment, for the third winding coupled to an external junction of a primary winding (example, third winding 122A1), the vector of induced voltage in the first sub-winding (example, 122A11) may be 180 degrees out of phase with the vector of induced voltage in a primary winding coupled to the external junction (example, 108A) and the vector of induced voltage in the second sub-winding (example, 122A12) may be in phase with the vector of induced voltage in a primary winding coupled to the external junction that may be different than the primary winding that may be 180 degrees out of phase with the first sub-winding (example, primary winding 108C).

Figure 4A:
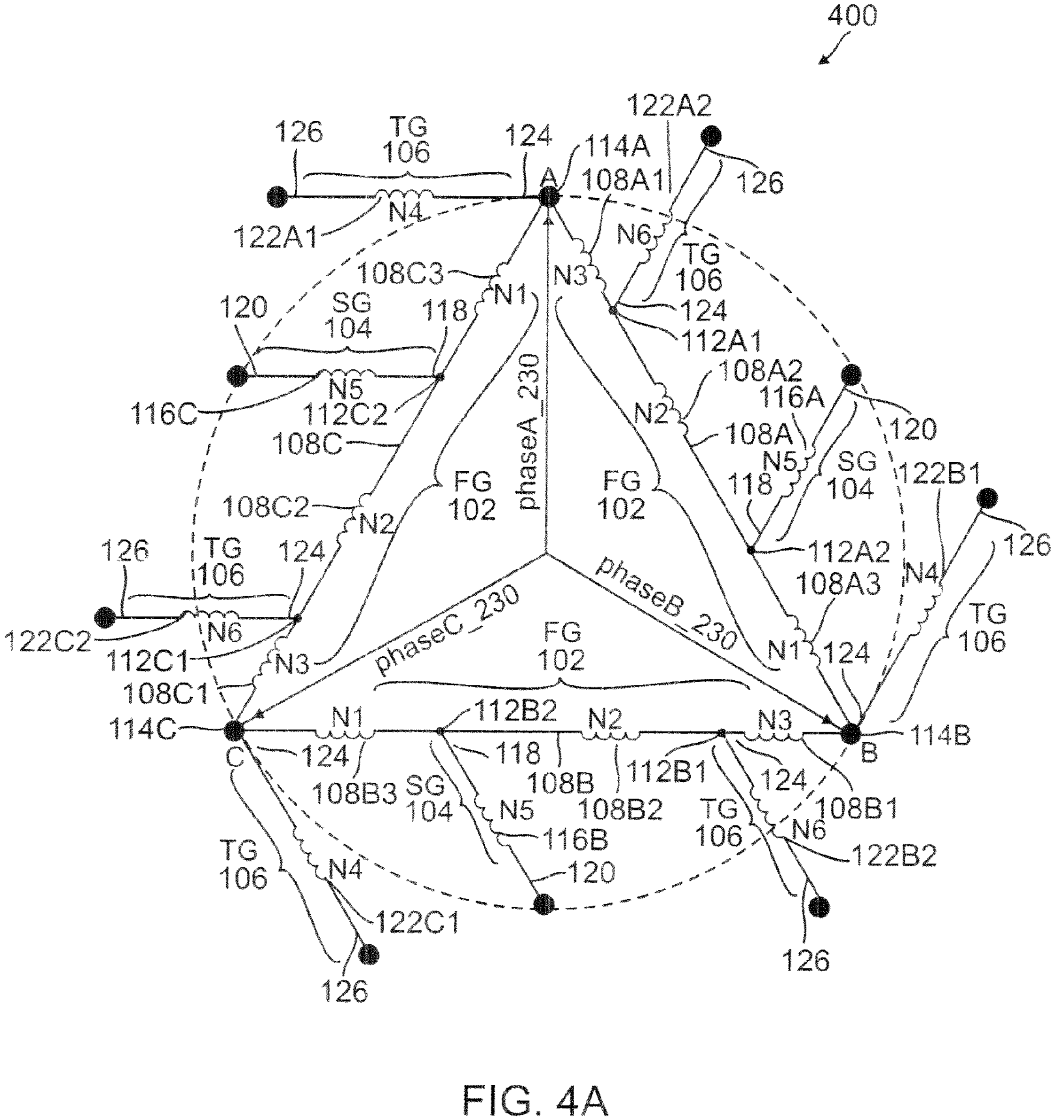
FIG. 4A is a winding diagram for an alternate multi-phase auto-transformer.
Figure 4B:
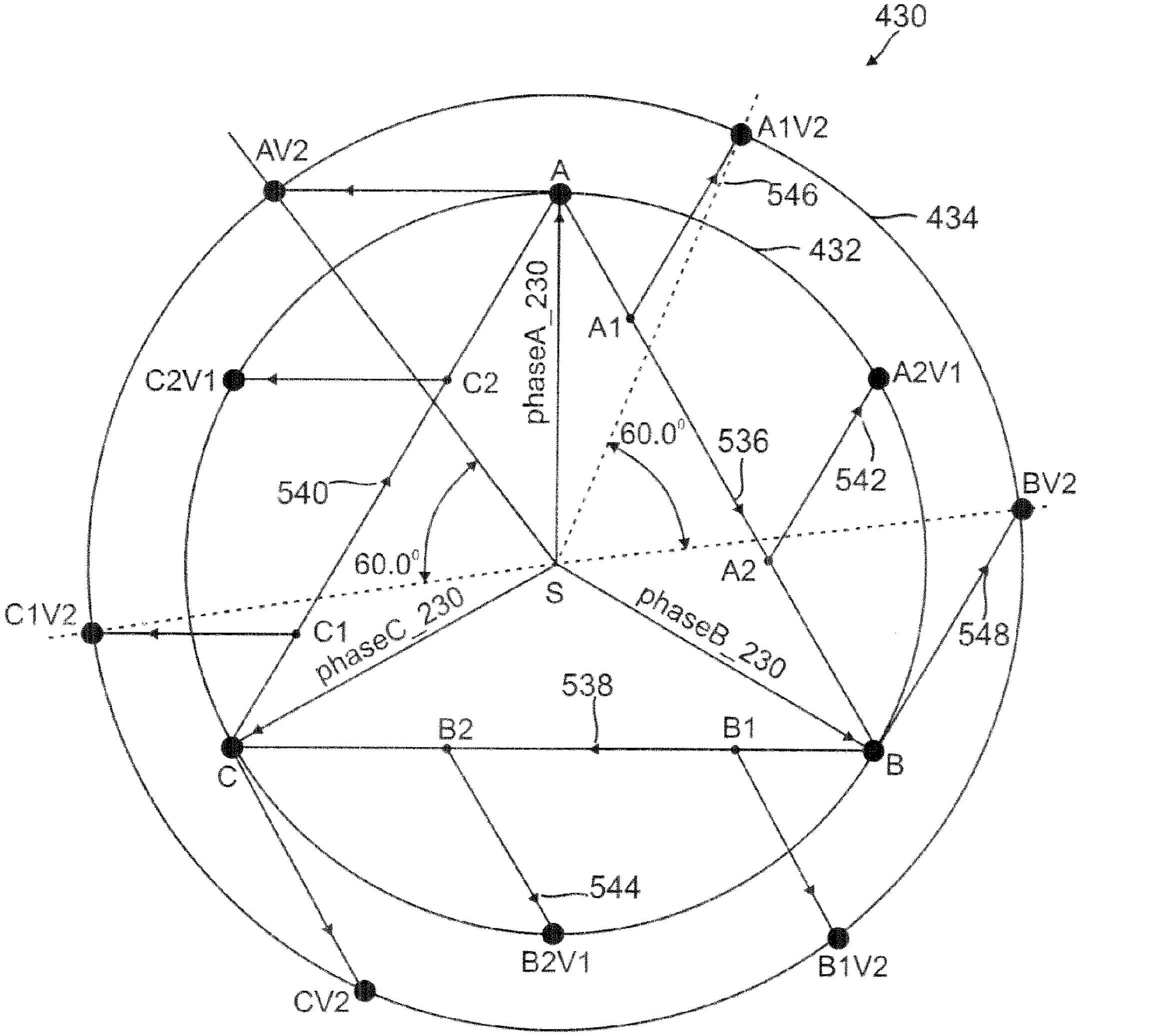
FIG. 4B is a phasor diagram for the multi-phase auto-transformer of FIG. 4A.

Another embodiment of a multi-phase transformer 400 is described with reference to FIGS. 4A and 4B. Transformer 400 is another exemplary six phase or twelve pulse multi-phase transformer. The multi-phase transformer 400 described with reference to FIGS. 4A and 4B is similar to the multi-phase transformer 100 described with reference to FIGS. 1A and 1B and multi-phase transformer 300 described with reference to FIGS. 3A and 3B in that all have a primary group of windings 102, secondary group of windings 104 and third group of windings 106. One of the differences is that some of the third windings of the third group of windings are coupled to an interior junction of the primary windings of primary group of windings 102.

Referring to FIG. 4A, in this specific embodiment, each of the primary windings 108A-108C include a plurality of sub primary windings 108A1-108A3, 108B1-108B3, 108C1-108C3 that are coupled in series, with junction of two sub primary windings defining an interior junction. For example, for the primary winding 108A, the junction of sub primary windings 108A1 and 108A2 define an interior junction 112A1 and the junction of sub primary windings 108A2 and 108A3 define an interior junction 112A2. Similarly, primary winding 108B includes interior junction 112B1 and 112B2. And, primary winding 108C includes interior junction 112C1 and 112C2. Each ends of the primary windings 108A-108C are coupled to the ends of the other primary winding 108A-108C to form a delta configuration with the junction of two primary windings defining an exterior junction 114A-114C. Each of the primary windings 108A-108C are configured to receive one phase of a multi-phase input voltage at the exterior junction 114A-114C.

The second group of windings 104 includes a plurality of secondary windings 116A-116C. Each secondary winding 116A-116C has a first end 118 and a second end 120. Each secondary winding 116A-116C may be magnetically coupled to one of the primary windings 108A-108C. The first end 118 of each secondary winding 116A-116C may be coupled to one of the primary windings 108A-108C.

The third group of windings 106 includes a plurality of third windings 122A1, 122A2, 122B1, 122B2, 122C1 and 122C2. Each third winding 122A1-122C2 has a first end 124 and a second end 126. Each third winding 122A1-122C2 may be magnetically coupled to one of the primary windings 108A-108C.

The first end 124 of each of the third winding 122A1-122C2 may be coupled to a primary winding 108A-108C, with the third group of windings 106 configured with respect to the first group of windings 102 and the second group of windings 104 such that the output voltage Vout2 at the second end 126 of the third windings 122A-122F may be higher than the cutout voltage Vout1 at the second end 120A-120F of the secondary windings 116A-116C and the exterior junction 114A-114C of the primary windings 108A-108C.

In one embodiment, the first end of a secondary winding may be coupled to the interior junction of primary winding. For example, the first end 118 of the secondary winding 116A may be coupled to the interior junction 112A2 of primary winding 108A. The first end 118 of the secondary winding 116B may be coupled to the interior junction 112B2 of the primary winding 108B. The first end 118 of the secondary winding 116C may be coupled to the interior junction 112C2 of primary winding 108C.

In one embodiment, the first end of a third winding may be coupled to an interior junction of a primary winding or to the exterior junction of primary windings. For example, the first end 124 of third winding 122A2 may be coupled to the interior junction 112A1 of the primary winding 108A, the first end 124 of the third winding 122B2 may be coupled to the interior junction 112B1 of the primary winding 108B, the first end 124 of the third winding 122C2 may be coupled to the interior junction 112C1 of the primary winding 108C. Also, the first end 124 of the third winding 122A1 may be coupled to the exterior junction 114A of primary windings 108A and 108C; the first end 124 of the third winding 122B1 may be coupled to the exterior junction 114B of primary windings 108A and 108B; the first end 124 of the third winding 122C1 may be coupled to the exterior junction 114C of primary windings 108B and 108C.

In one embodiment, the phase angle difference of the output voltage Vout2 at two adjacent second ends of third windings are substantially same. For example, the phase angle difference of the output voltage Vout2 at second end 126 of two adjacent third windings 122A1-122A2, 122A2-122B1, 122B1-122B2, 122B2-122C1, 122C1-122C2 and 122C2-122A1 are substantially same.

In one embodiment, the output voltage Vout2 at the second end of the third windings are substantially equal. For example, the output voltage Vout2 at the second end 126 of the third windings 122A1-122C2 are substantially same.

In one embodiment, the output voltage Vout1 at the second end of secondary windings 116A-116C and at the exterior junction of the primary windings 108A-108C are substantially equal. For example, the output voltage Vout1 at the second end 120 of secondary windings 116A-116C and at the exterior junction 114A-114C of primary windings 108A-108C are substantially equal.

In one embodiment, the output voltage Vout2 may be greater than output voltage Vout1.

FIG. 4A also shows exemplary number of turns for various windings and sub windings, with some of the windings or sub windings having substantially same number of turns. For example, the sub-primary windings 108A1, 108B1 and 108C1 have substantially same number of turns N3. The sub-primary windings 108A2, 108B2 and 108C2 have substantially same number of turns N2. Similarly, the secondary windings 116A, 116B and 116C have substantially same number of turns N5. For example, the third windings 122A2 and 122B2 have substantially same number of turns N6.

Now referring to FIG. 4B, an exemplary phasor diagram 430 for the multi-phase transformer 400 of FIG. 4A is disclosed.

The phasor diagram 430 includes a first circle 432 and a second circle 434, both having a common center S. The points A, B and C represent the exterior junction 114A-114C of the primary windings. The sides AB, BC and CA of triangle ABC represent the primary windings 108A-108C respectively. Points A1-A2, B1-B2 and C1-C2 correspond to the interior junctions 112A1-112A2, 112B1-112B2 and 112C1-112C2 respectively of the primary windings 108A-108C.

Lines A-A1, A1-A2 and A2-B represent sub-primary windings 108A1-108A3 respectively. Similarly, Lines B-B1, B1-B2 and B2-C represent sub-primary windings 108B1-108B3 respectively. Similarly, lines C-C1, C1-C2 and C2-A represent sub-primary windings 108C1-108C3 respectively.

Points A2V1, B2V1 and C2V1 represent the second end 120 of the secondary windings 116A, 116B and 116C respectively. Similarly, points AV2, A1V2, BV2, B1V2, CV2 and C1V2 represent the second end 126 of the third windings 122A1-122A2, 122B1-122B2 and 122C1-122C2 respectively.

For example, lines A2-A2V1, B2-B2V1 and C2-C2V1 represent the secondary windings 116A-116C respectively.

For example, lines A-AV2, A1-A1V2 represent third windings 122A1-122A2 respectively.

As previously discussed, the length of lines in a phasor diagram represent the number of turns for the windings. For example, the length of line A-A1 represent number of turns N3 for sub-primary winding 108A1. Similarly, the length of line A2-A2V1 represent number of turns N5 for secondary winding 116A. And the length of line A1-A1V2 represent the number of turns N6 for third winding 122A2.

The lines SA, SB and SC represent the input AC voltage Vin applied to the exterior junctions A, B and C of the primary windings 108A-108C. As it is evident from the phasor diagram, a three phase input voltage Vin depicted as phaseA_230, phaseB_230 and phaseC_230 is applied, with each phase separated by about 120 degrees.

As previously described, the lines in a phasor diagrams are vector lines depicting the vector of the induced voltage. For example, the vector of induced voltage in primary windings AB, BC and CA are depicted by the arrows 536, 538 and 540. Similarly, the arrows on lines representing the secondary windings and the third windings represent the vector of induced voltage. For example, arrows 542 and 544 represent the vector of induced voltage in the secondary winding 116A and 116B respectively. The rows 546 and 548 represent the vector of inducted voltage in the third winding 122A2 and 122B1.

In one embodiment, the vector of induced voltage in the secondary windings are such that they are either in phase or 180 degrees out of phase with the vector of induced voltage in a primary winding to which they are magnetically coupled. In one embodiment, the vector of induced voltage in the secondary windings are such that the phase angle difference of the output voltage at two adjacent second ends of the secondary windings are substantially same.

In one embodiment, the vector of induced voltage in the third windings are such that they are either in phase or 180 degrees out of phase with the vector of induced voltage in a primary winding to which they are magnetically coupled. In one embodiment, the vector of induced voltage in the third windings are such that the phase angle difference of the output voltage at two adjacent second ends of the third windings are substantially same.

The phasor diagram 430 shows an exemplary vector if induced voltage in the primary windings, secondary windings and the third windings.

In one embodiment, the vector of induced voltage in each of the plurality of secondary windings is in-phase with the vector of induced voltage in a primary winding other than the primary winding to which the secondary winding is coupled. For example, the vector of induced voltage for secondary winding 116A coupled to primary winding 108A is in-phase with the vector of induced voltage in the primary winding 108C.

In one embodiment, the vector of induced voltage in a third winding coupled to an interior junction of the primary winding and an exterior junction of the primary winding is in-phase with the induced voltage in the secondary winding that is coupled to the same primary winding as the third winding that is coupled to the interior junction of the primary winding.

For example, the vector of induced voltage in third winding 122A2 is the same as the vector of induced voltage in secondary winding 116A and the vector of induced voltage in third winding 122B1.

Figure 5A:
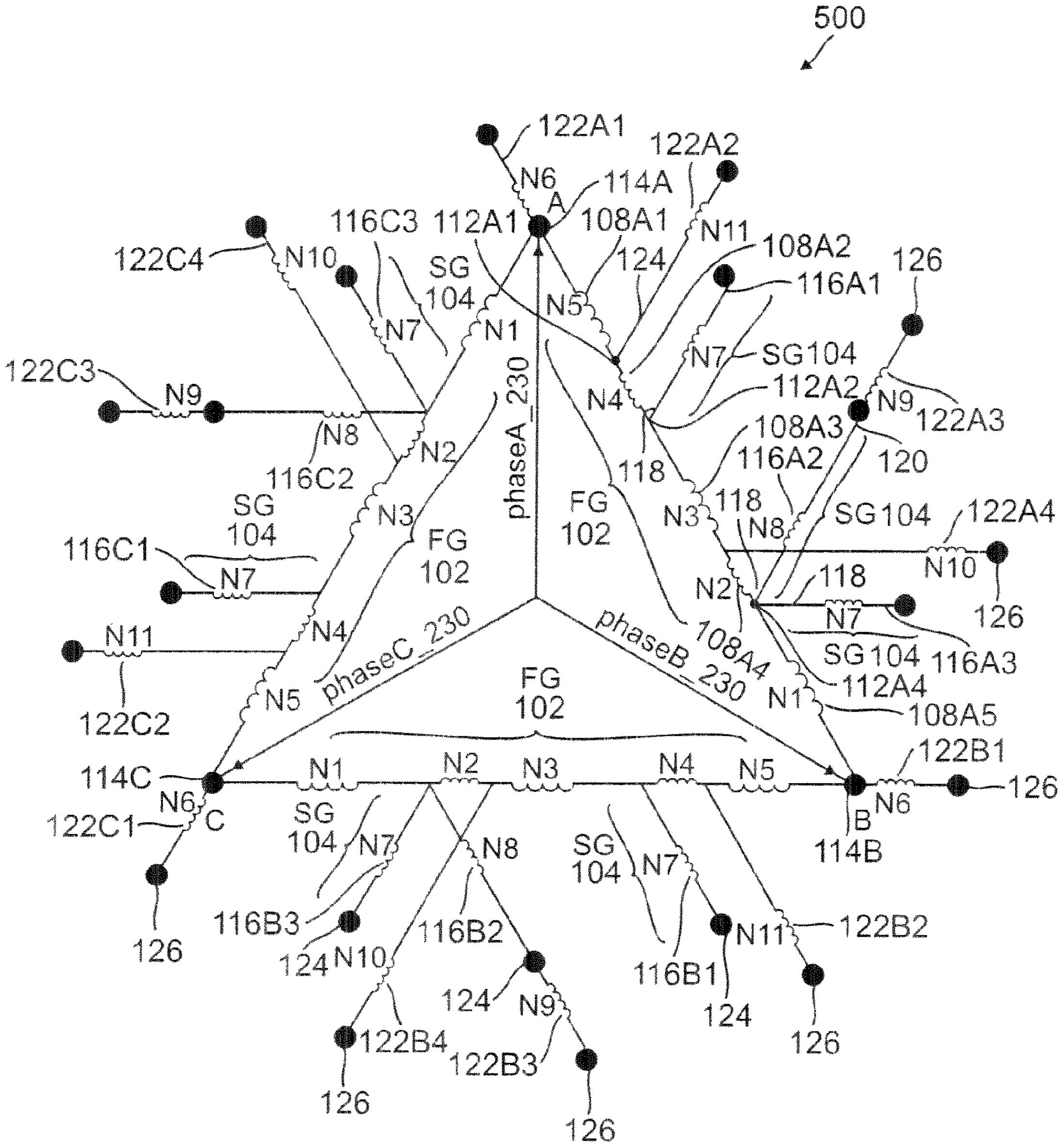
FIG. 5A is a winding diagram for an alternate multi-phase auto-transformer.
Figure 5B:
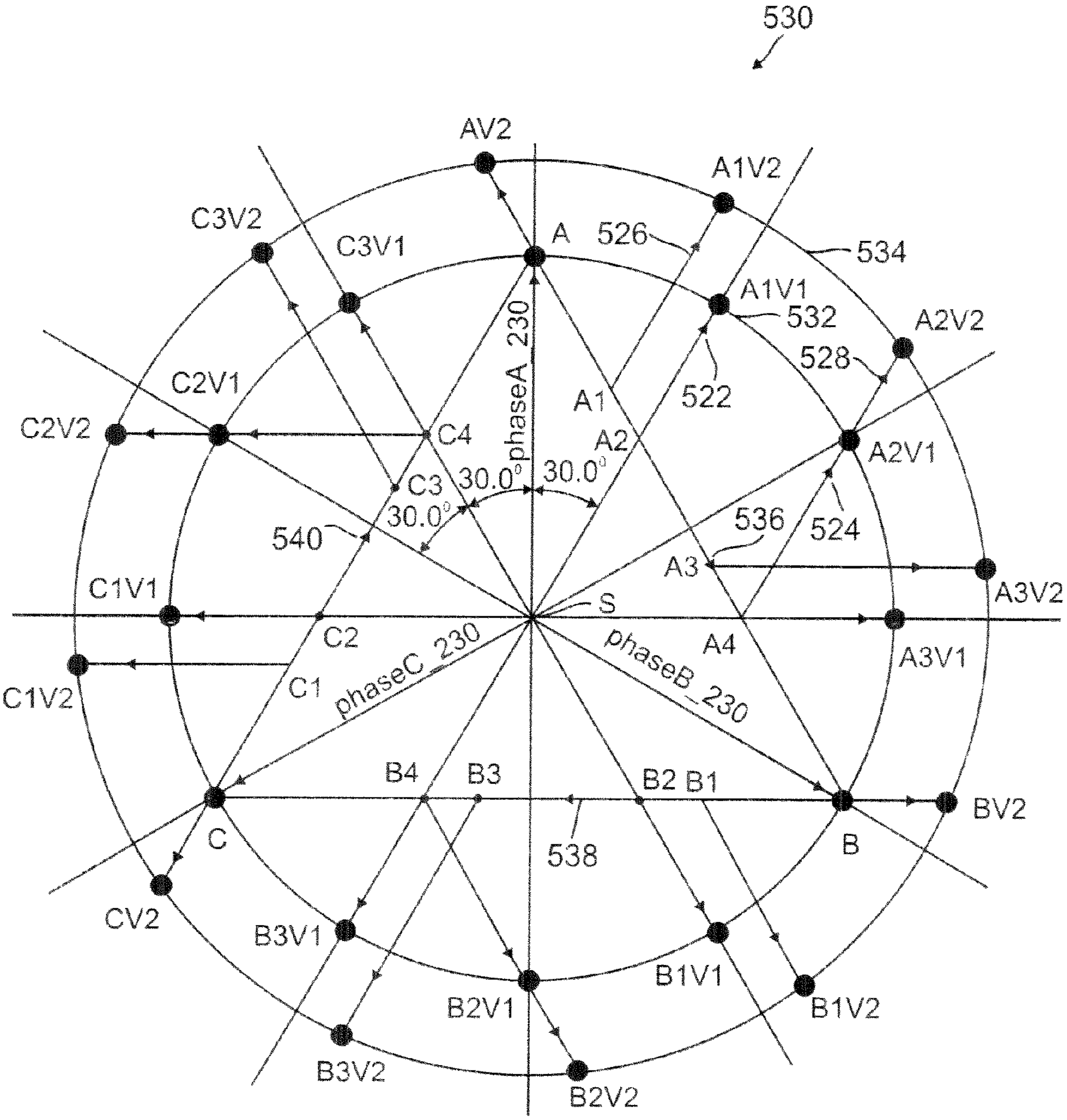
FIG. 5B is a phasor diagram for the multi-phase auto-transformer of FIG. 5A.

Another embodiment of a multi-phase transformer is described with reference to FIGS. 5A and 5B. Transformer 500 is an exemplary twelve phase or twenty four pulse multi-phase transformer. The multi-phase transformer 500 described with reference to FIGS. 5A and 5B is similar to the multi-phase transformer 400 described with reference to FIGS. 4A and 4B in that multi-phase transformer 500 has a primary group of windings 102, secondary group of windings 104 and third group of windings 106. One of the differences is that some of the third windings of the third group of windings are coupled to an interior junction of the primary windings of primary group of windings 102 and some of the third group of windings are coupled to the second end of the second windings.

Referring to FIG. 5A, in this specific embodiment, each of the primary windings 108A-108C include a plurality of sub primary windings 108A1-108A5, 108B1-108B5, 108C1-108C5 that are coupled in series. For example, for the primary winding 108A, the junction of sub primary windings 108A1 and 108A2 coupled in series define an interior junction 112A1 and the junction or sub primary windings 108A2 and 108A3 coupled in series define an interior junction 112A2. Each ends of the primary windings 108A-108C are coupled to the ends of the other primary winding 108A-108C to form a delta configuration with exterior junctions 114A-114C. Each of the primary windings 108A-108C are configured to receive one phase of a multi-phase input voltage at the exterior junction 114A-114C.

The second group of windings 104 includes a plurality of secondary windings 116A1-116A3, 116B1-116B3 and 116C1-116C3. Each secondary winding 116A1-116C3 has a first end 118 and a second end 120. Each secondary winding 116A1-116C3 may be magnetically coupled to one of the primary windings 108A-108C. The first end 118 of each secondary winding 116A1-116C3 may be coupled to one of the primary windings 108A-108C. For example, the first end 118 of secondary winding 116A1 may be coupled to interior junction 112A2 of primary winding 108A.

In one embodiment, two of the secondary windings are coupled to the same interior junction of the primary winding. For example, the first end 118 of secondary winding 116A2 and the first end 118 of secondary winding 116A3 are coupled to interior junction 112A4 of primary winding 108A.

The third group of windings 106 includes a plurality of third windings. For example, plurality of third windings 122A1-122A4, 122B1-122B4 and 122C1-122C4. Each third winding 122A1-122C4 has a first end 124 and a second end 126. Each third winding 122A1-122C4 may be magnetically coupled to one of the primary windings 108A-108C.

The first end 124 of some of the third windings 122A1-122C4 are coupled to a primary winding 108A-108C and the first end 124 of some of the third windings 122A1-122C4 are coupled to some of the secondary windings 116A1-116C3 with the third group of windings 106 configured with respect to the first group of windings 102 and the second group of windings 104 such that the output voltage Vout2 at the second end 126 of the third winding 122A1-122C4 may be higher than the output voltage Vout1 at the second end 120 of the secondary windings 116A1-116C3 and the exterior junction 114A-114C of the primary windings 108A-108C.

In one embodiment, some of the first end of a third winding may be coupled to an interior junction of primary winding. For example, the first end 124 of third winding 122A2 may be coupled to the interior junction 112A1 of the primary winding 108A. Similarly the first end 124 of the third winding 122A4 may be coupled to the interior junction 112A3 of the primary winding 108A.

In one embodiment, some of the first end of third winding may be coupled to the second end 120 of secondary winding. For example, the first end 124 of third winding 122A3 may be coupled to the second end 120 of secondary winding 116A2.

In one embodiment, the phase angle difference of the output voltage Vout2 at two adjacent second ends of third windings are substantially same. For example, the phase angle difference of the output voltage Vout2 at second end 126 of two adjacent third windings 122A1-122A2 are substantially same. Similarly the phase angle difference of the output voltage Vout2 at second end 126 of two adjacent third windings, for example, 122A4-122B1 are substantially same.

In one embodiment, the output voltage Vout2 at the second end of the third windings are substantially equal. For example, the output voltage Vout2 at the second end 126 of the third windings 122A1-122A4, 122B1-122B4 and 122C1-122C4 are substantially same.

In one embodiment, the output voltage Vout1 at the second end of secondary windings and at the exterior junction of the primary windings are the same. For example, the output voltage Vout1 as the second end 120 of secondary windings 116A1-116A3, 116B1-116B3 and 116C1-116C3 and at the exterior junction 114A-114C of the primary windings 108A-108C are substantially equal.

In one embodiment, the output voltage Vout2 may be greater than output voltage Vout1.

FIG. 5A also shows exemplary number of turns for various windings and sub-windings, with some of the windings or sub-windings having substantially same number of turns. For example, the number of turns N1-N11 are shown. For example, sub-primary windings 108A1, 108B1 and 108C1 each have substantially same number of turns, for example, N5. Similarly, secondary windings 116A1 and 116A3 each have substantially same number of turns, for example, N7. Similarly, third windings 122A1 and 122A1 each have substantially same number of turns, for example, N6.

Now referring to FIG. 5B, an exemplary phasor diagram 530 for the multi-phase transformer 500 of FIG. 5A is disclosed.

The phasor diagram 530 includes a first circle 532 and a second circle 534, both having a common center S. The points A, B and C represent the exterior junction 114A-114C of the primary windings. The sides AB, BC and CA of triangle ABC represent the primary windings 108A-108C respectively. Points A1-A4, B1-B4 and C1-C4 correspond to the interior junctions 112A1-112A4, 112B1-112B4 and 112C1-112C4 respectively of the primary windings 108A-108C.

Lines A-A1, A1-A2, A2-A3, A3-A4 and A4-B represent sub-primary windings 108A1-108A5 respectively. Similarly, Lines B-B1, B1-B2, B2-B3, B3-B4 and B4-C represent sub-primary windings 108B1-108B5 respectively. Similarly, lines C-C1, C1-C2, C2-C3, C3-C4 and C4-A represent sub-primary windings 108A1-108A5 respectively.

Points A1V1-A3V1, B1V1-B3V1 and C1V1-C3V1 represent the second end 120 of the secondary windings 116A1-116A3, 116B1-166B3 and 116C1-116C3 respectively. Similarly points AV2-A3V2, BV2-B3V2 and CV2-C3V2 represent the second end 126 or the third windings 122A1-122A3, 122B1-122B3 and 122C1-122C3 respectively.

For example, lines A2-A1V1, A4-A2V1, A4-A3V1; B2-B1V1, B4-B2V1, B4-B3V1 and C2-C1V1, C4-C2V1, C4-C3V1 represent the secondary windings 116A1-116A3, 115B1-116B3 and 116C1-116C3 respectively.

Lines A-AV2, A1-A1V2, A2V1-A2V2, A3-3V2 represent third windings 122A1-122A4 respectively. Similarly, B-BV2, B1-B1V2, B2V1-B2V2, B3-B3V2 represent third windings 122B1-122B4 respectively. And, lines C-CV2, C1-C1V2, C2V1-C2V2, C3-C3V2 represent third windings 122C1-122C4 respectively.

As previously discussed, the length of lines in a phasor diagram represent the number of turns for the windings. For example, the length of line A-A1 represent number of turns N5 for sub-primary winding 108A1. Similarly, the length of line A2-A1V1 represent number of turns N7 for secondary winding 116A1. And, the length of line A1-A1V2 represent the number of turns N11 for third winding 122A2.

The lines SA, SB and SC represent the input AC voltage Vin applied to the exterior junctions A, B and C of the primary windings 108A-108C. As it is evident from the phasor diagram, a three phase input voltage Vin depicted as phaseA_230, phaseB_230 and phaseC_230 is applied, with each phase separated by about 120 degrees.

As previously described, the lines in a phasor diagrams are vector lines depicting the vector of the induced voltage. For example, the vector of induced voltage in primary windings AB, BC and CA are depicted by the arrows 536, 538 and 540. Similarly, the arrows on lines representing the secondary windings and the third windings represent the vector of induced voltage. For example, arrows 522 and 524 represent the vector of induced voltage in the secondary winding 116A1 and 116A2 respectively. The arrows 526 and 528 represent the vector or inducted voltage in the third winding 122A2 and 122A3.

In one embodiment, the vector of induced voltage in the secondary windings are such that they are either in phase or 180 degrees out of phase with the vector of induced voltage in a primary winding to which they are magnetically coupled. In one embodiment, the vector of induced voltage in the secondary windings are such that the phase angle difference of the output voltage at two adjacent second ends of the secondary windings are substantially same.

In one embodiment, the vector of induced voltage in the third windings are such that they are either in phase or 180 degrees out of phase with the vector of induced voltage in a primary winding to which they are magnetically coupled. In one embodiment, the vector of induced voltage in the third windings are such that the phase angle difference of the output voltage at two adjacent second ends of the third windings are substantially same.

The phasor diagram 530 shows an exemplary vector induced voltage in the secondary windings and the third windings.

Figure 6A:
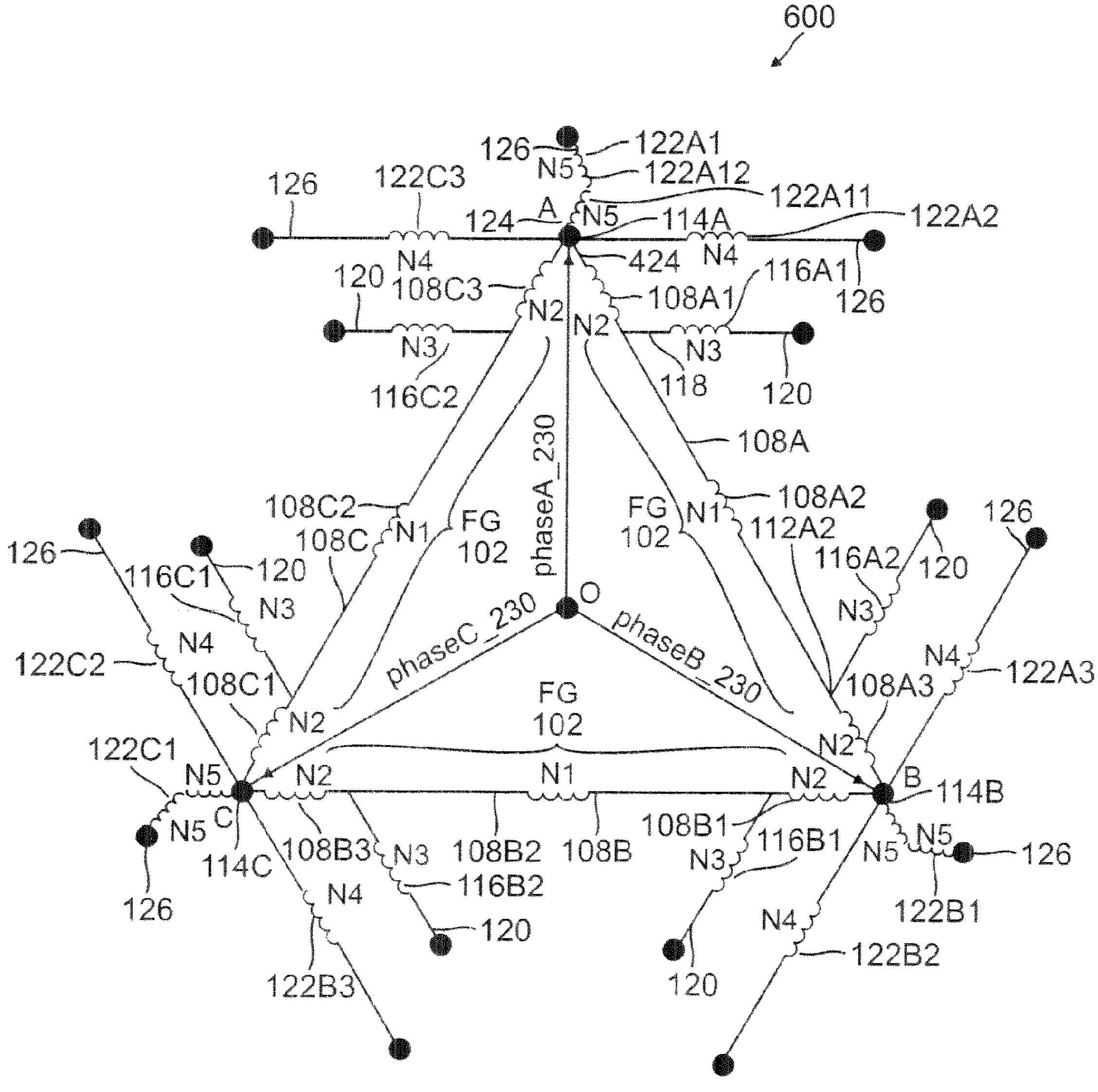
FIG. 6A is a winding diagram for an alternate multi-phase auto-transformer.
Figure 6B:
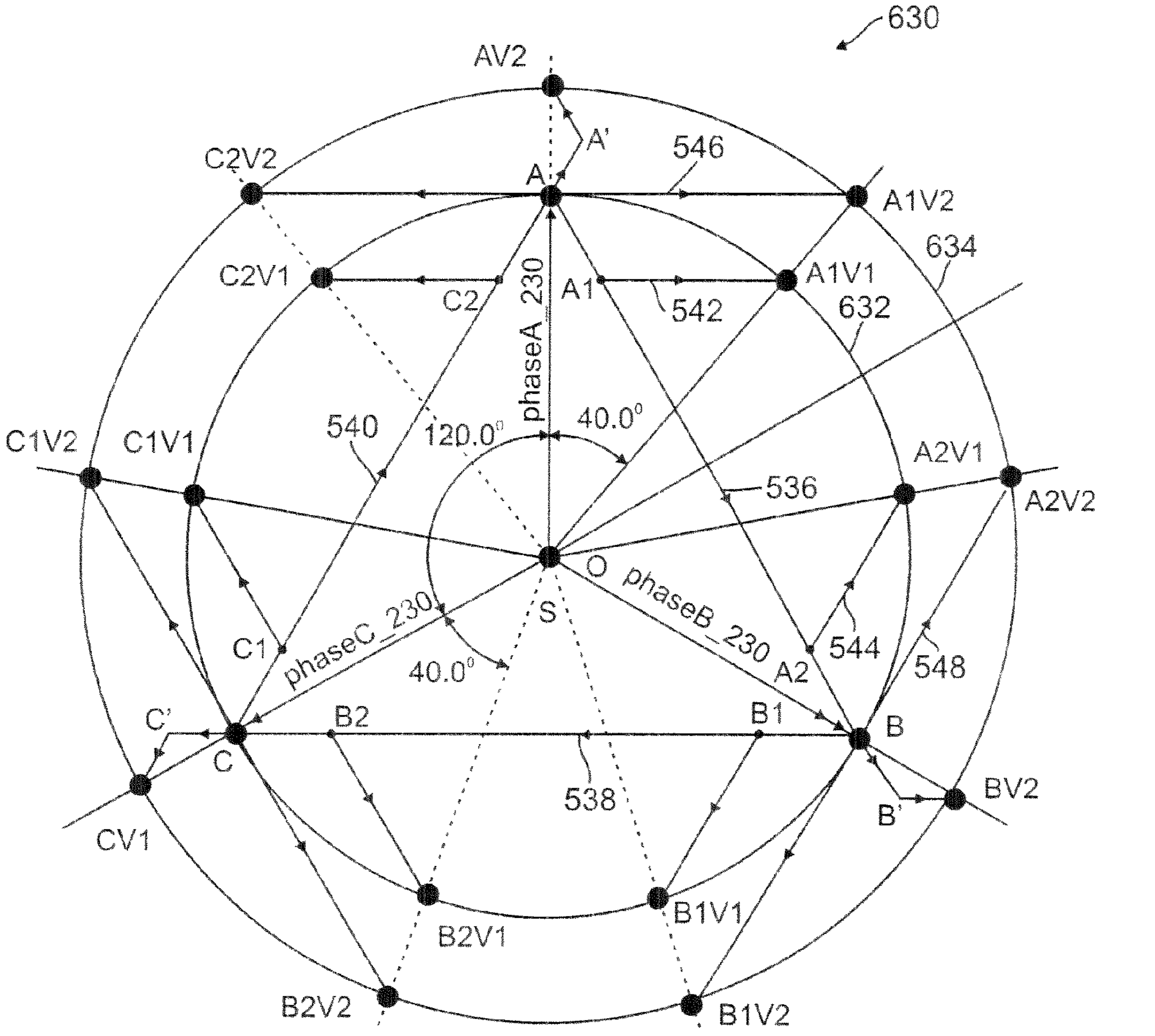
FIG. 6B is a phasor diagram for the multi-phase auto-transformer of FIG. 6A.

Another embodiment of a multi-phase transformer is described with reference to FIGS. 6A and 6B. Transformer 600 is an exemplary nine phase or eighteen pulse multi-phase transformer. The multi-phase transformer 600 described with reference to FIGS. 6A and 6B is similar to the multi-phase transformer 500 described with reference to FIGS. 5A and 5B in that multi-phase transformer 600 has a primary group of windings 102, secondary group of windings 104 and third group of windings 106. One of the differences is that some of the third windings of the third group of windings include at least two sub-windings connected in series. One other difference is that all the third windings are coupled only to an exterior junction.

Referring to FIG. 6A, in this specific embodiment, each of the primary windings 108A-108C include a plurality of sub primary windings 108A1-108A3, 108B1-108B3, 108C1-108C3 that are coupled in series. For example, for the primary winding 108A, the junction of sub primary windings 108A1 ant 108A2 coupled in series define an interior junction 112A1 and the junction of sub primary windings 108A2 and 108A3 coupled in series define an interior junction 112A2. Each ends of the primary windings 108A-108C are coupled to the ends of the other primary winding 108A-108C to form a delta configuration with exterior junctions 114A-114C. Each of the primary windings 108A-108C are configured to receive one phase of a multi-phase input voltage at the exterior junction 114A-114C.

The second group of windings 104 includes a plurality of secondary windings 116A1-116A2, 116B1-116B2 and 116C1-116C2. Each secondary winding 116A1-116C2 has a first end 118 and a second end 120. Each secondary winding 116A1-116C2 may be magnetically coupled to one the primary windings 108A-108C. The first end 118 of each secondary winding 116A1-116C2 may be coupled to one of the primary windings 108A-108C. For example, the first end 118 of secondary winding 116A1 may be coupled interior junction 112A1 of primary winding 108A.

The third group of windings 106 includes a plurality of third windings. For example, plurality of third windings 122A1-122A3, 122B1-122B3 and 122C1-122C3. Each third winding 122A1-122C3 has a first end 124 and a second end 126. Each third winding 122A1-122C3 may be magnetically coupled to one of the primary windings 108A-108C.

Some of the third windings include at least two sub-windings connected in series. For example, third windings 122A1, 122B1 and 122C1 have at least two sub-windings. For example, third winding 122A1 has a first sub-winding 122A11 and a second sub-winding 122A12 connected in series at one end. The other end of first sub-winding 122A11 corresponds to the first end 124 of third winding 122A1. The other end of second sub-winding 122A12 corresponds to the second end 126 of third winding 122A1.

The first end 124 of all of the third windings 122A1-122C3 are coupled to a primary winding 108A-108C. In some embodiments, the first end 124 of the third windings 122A1-122C3 are coupled to one of the exterior junctions 114A-114C. For example, the first end 124 of the third windings 122A1, 122A2 and 122C3 are coupled to exterior junction 114A.

In one embodiment, the phase angle difference of the output voltage Vout2 at two adjacent second ends of third windings are substantially same. For example, the phase angle difference of the output voltage Vout2 at second end 126 of two adjacent third windings 122A1-122A2 are substantially same. Similarly the phase angle difference of the output voltage Vout2 at second end 126 of two adjacent third windings, for example, 122A3-122B1 are substantially same.

In one embodiment, the output voltage Vout2 at the second end of the third windings are substantially equal. For example, the output voltage Vout2 at the second end 126 of the third windings 122A1-122A3, 122B1-122B3 and 122C1-122C3 are substantially same.

In one embodiment, the output voltage Vout1 at the second end of secondary windings and at the exterior junction of the primary windings are the same. For example, the output voltage Vout1 at the second end 120 of secondary windings 116A1-116A2, 116B1-116B2 and 116C1-116C2 and at the exterior junction 114A-114C of the primary windings 108A-108C are substantially equal.

In one embodiment, the output voltage Vout2 may be greater than output voltage Vout1.

FIG. 6A also shows exemplary number of turns for various windings and sub-windings, with some of the windings or sub-winding having substantially same number of turns. For example, the number of turns N1-N5 are shown. For example, sub-primary windings 108A1, 108B1 and 108C1 each have substantially same number of turns, for example, N5. Similarly, secondary windings 116A1 and 116A2 each have substantially same number of turns, for example, N3. Similarly, third windings 122A2 and 122A3 each have substantially same number of turns, for example, N4. Similarly, first sub-winding 122A11 and the second sub-winding 122A12 each have substantially same number of turns, for example, N5.

Now referring to FIG. 6B, an exemplary phasor diagram 630 for the multi-phase transformer 600 at FIG. 6A is disclosed.

The phasor diagram 630 includes a first circle 632 and a second circle 634, both having a common center S. The points A, B and C represent the exterior junction 114A-114C of the primary windings. The sides AB, BC and CA or triangle ABC represent the primary windings 108A-108C respectively. Points A1-A2, B1-B2 and C1-C2 correspond to the interior junctions 112A1-112A2, 112B1-112B2 and 112C1-112C2 respectively of the primary windings 108A-108C.

Lines A-A1, A1-A2, and A2-B represent sub-primary windings 108A1-108A3 respectively. Similarly, Lines B-B1, B1-B2, B2-C represent sub-primary windings 108B1-108B3 respectively. Similarly, lines C-C1, C1-C2 and C2-A represent sub-primary windings 108C1-108C3 respectively.

Points A1V1-A2V1, B1V1-B2V1 ant C1V1-C2V1 represent the second end 120 of the secondary windings 116A1-116A2, 116B1-166B2 and 116C1-116C2 respectively. Similarly points AV2, A1V2 and A2V2; BV2, B1V2 and B2V2; and CV2, C1V2 and C2V2 represent the second end 126 of the third windings 122A1-122A3, 122B1-122B3 and 122C1-122C3 respectively.

For example, lines A1-A1V1, A2-A2V1; B1-B1V1, B2-B2V1 and C1-C1V1, C2-C2V1 represent the secondary windings 116A1-116A2, 115B1-116B2 and 116C1-116C2 respectively.

Lines A-A1V2, B-A2V2, B-B1V2, C-B2V2, C-C1V2 and A-C2V2 represent third windings 122A2, 122A3, 122B2, 122B3, 122C2 and 122C3 respectively. As previously discussed, some of the third windings include at least two sub-windings connected in series, for example, third winding 122A1. The line A-A', B-B' and C-C' represent the first sub-windings 122A11, 122B11 and 122C11 of third windings 122A1, 122B1 and 122C1 respectively. Similarly, the line A'-AV2, B'-BV2 and C'-CV2 represent the second sub-windings 122A12, 122B12 and 122C12 of third windings 122A1, 122B1 and 122C1.

As previously discussed, the length of lines in a phasor diagram represent the number of turns for the windings. For example, the length of line A-A1 represent number of turns N2 for sub-primary winding 108A1. Similarly, the length of line A1-A11 represent number of turns N3 for secondary winding 116A1. And, the length of line A-A1V2 represent the number of turns N4 for third winding 122A2.

The lines SA, SB and SC represent the input AC voltage Vin applied to the exterior junctions A, B and C of the primary windings 108A-108C. As it is evident from the phasor diagram, a three phase input voltage Vin depicted as phaseA_230, phaseB_230 and phaseC_230 is applied, with each phase separated by about 120 degrees.

As previously described, the lines in a phasor diagrams are vector lines depicting the vector of the induced voltage. For example, the vector of induced voltage in primary windings AB, BC and CA are depicted by the arrows 536, 538 and 540. Similarly, the arrows on lines representing the secondary windings and the third windings represent the vector of induced voltage. For example, arrows 542 and 544 represent the vector of induced voltage in the secondary winding 116A1 and 116A2 respectively. The arrows 546 and 548 represent the vector of inducted voltage in the third winding 122A2 and 122A3.

In one embodiment, the vector of induced voltage in the secondary windings are such that they are either in phase or 180 degrees out at phase with the vector of induced voltage in a primary winding to which they are magnetically coupled. In one embodiment, the vector of induced voltage in the secondary windings are such that the phase angle difference of the output voltage at two adjacent second ends of the secondary windings are substantially same.

In one embodiment, the vector of induced voltage in the third windings and the sub-windings of the third windings are such that they are either in phase or 180 degrees out of phase with the vector of induced voltage in a primary winding to which they are magnetically coupled. In one embodiment, the first sub-winding and second sub-winding of a third winding may be magnetically coupled to two different primary windings. In one embodiment, the vector of induced voltage in the third windings are such that the phase angle difference of the output voltage at two adjacent second ends of the third windings are substantially same.

The phasor diagram 630 shows an exemplary vector of induced voltage in the secondary windings and the third windings.

Figure 7A:
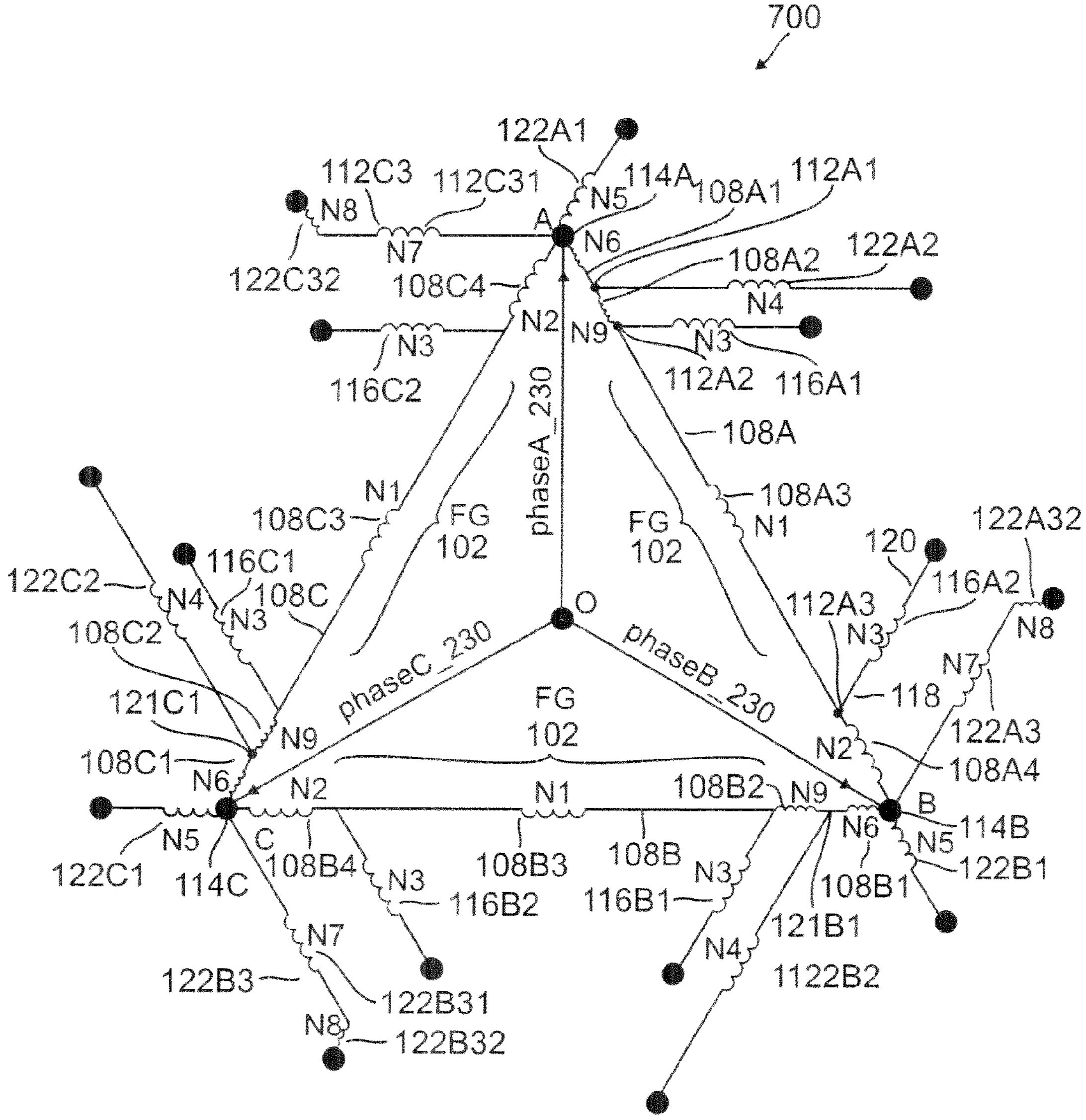
FIG. 7A is a winding diagram for an alternate multi-phase auto-transformer.
Figure 7B:
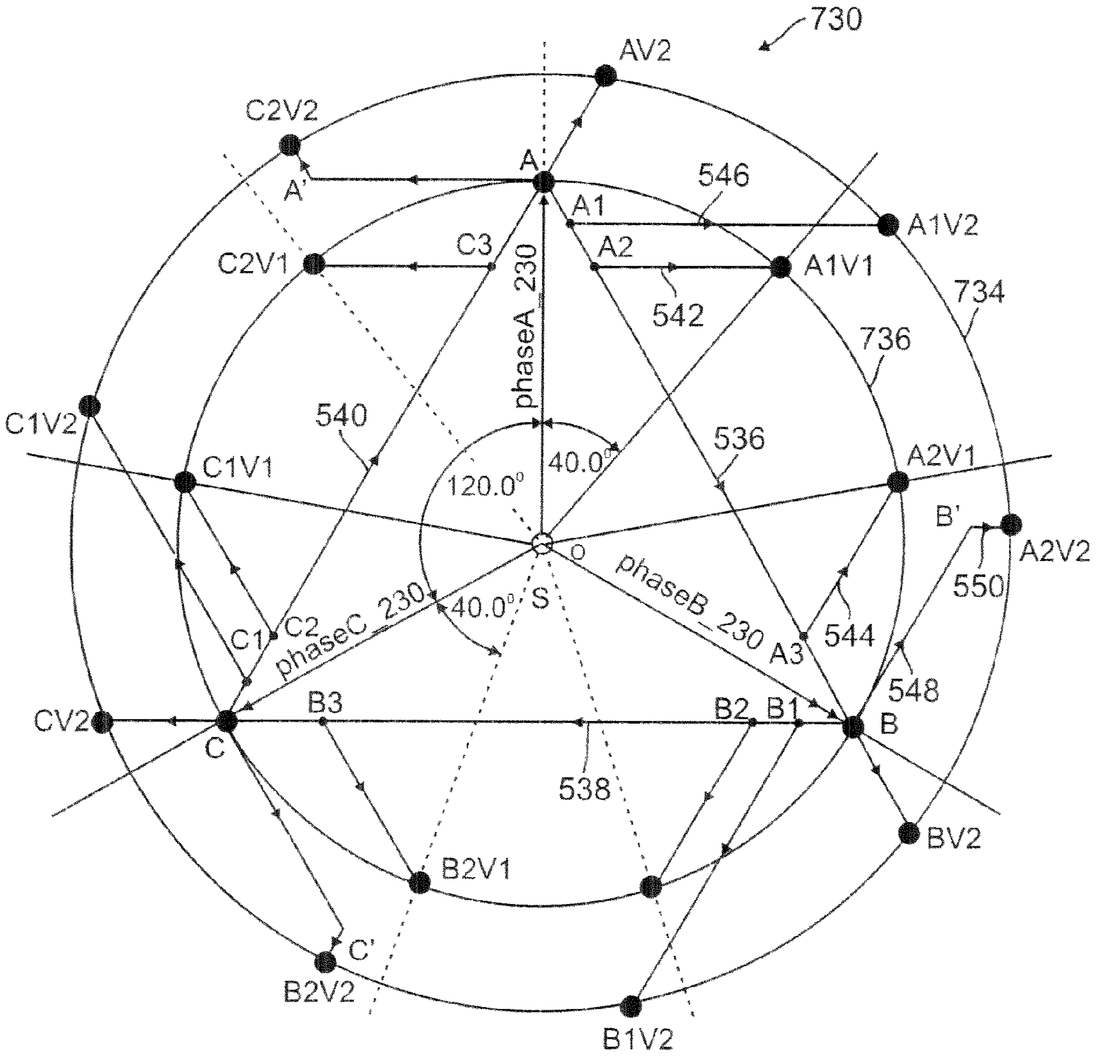
FIG. 7B is a phasor diagram for the multi-phase auto-transformer of FIG. 7A.

Another embodiment of a multi-phase transformer is described with reference to FIGS. 7A and 7B. Transformer 700 is an exemplary nine phase or eighteen pulse multi-phase transformer. The multi-phase transformer 700 described with reference to FIGS. 7A and 7B is similar to the multi-phase transformer 600 described with reference to FIGS. 6A and 6B in that multi-phase transformer 700 has a primary group of windings 102, secondary group of windings 104 and third group of windings 106. In addition, some of the third windings of the third group of windings include at least two sub-windings connected in series. One difference is that some of the third windings are coupled to interior junctions of the primary windings.

Referring to FIG. 7A, in this specific embodiment, each of the primary windings 108A-108C include a plurality of sub primary windings 108A1-108A4, 108B1-108B4, 108C1-108C4 that are coupled in series. For example, for the primary winding 108A, the junction of sub primary windings 108A1 and 108A2 coupled in series define an interior junction 112A1 and the junction of sub primary windings 108A2 and 108A3 coupled in series define an interior junction 112A2. Each ends of the primary windings 108A-108C are coupled to the ends of the other primary winding 108A-108C to form a delta configuration with exterior junctions 114A-114C. Each of the primary windings 108A-108C are configured to receive one phase of a multi-phase input voltage at the exterior junction 114A-114C.

The second group of windings 104 includes a plurality of secondary windings 116A1-116A2, 116B1-116B2 and 116C1-116C2. Each secondary winding 116A1-116C2 has a first end 118 and a second end 120. Each secondary winding 116A1-116C2 may be magnetically coupled to one of the primary windings 108A-108C. The first end 118 of each secondary winding 116A1-116C2 may be coupled to one of the primary windings 108A-108C. For example, the first end 118 of secondary winding 116A1 may be coupled to interior junction 112A2 of primary winding 108A.

The third group of windings 106 includes a plurality of third windings. For example, plurality of third windings 122A1-122A3, 122B1-122B3 and 122C1-122C3. Each third winding 122A1-122C3 has a first end 124 and a second end 126. Each third winding 122A1-122C3 may be magnetically coupled to one of the primary windings 108A-108C.

Some of the third windings include at least two sub-windings connected in series. For example, third windings 122A3, 122B3 and 122C3 have at least two sub-windings. For example, third winding 122A3 has a first sub-winding 122A31 and a second sub-winding 122A32 connected in series at one end. The other end of first sub-winding 122A31 corresponds to the first end 124 of third winding 122A3. The other end of second sub-winding 122A32 corresponds to the second end 126 of third winding 122A3.

The first end 124 of all of the third windings 122A1-122C3 are coupled to a primary winding 108A-108C. In some embodiments, the first end 124 of the third windings without sub-windings and with sub-windings are coupled to one of the exterior junctions 114A-114C. For example, third windings 122A1 and 122B3 are coupled to one of the exterior junctions, for example, exterior junction 114A. In some embodiments, the first end 124 of the third windings are coupled to one of the interior junctions of the primary windings. For example, the first end 124 of the third windings 122A2, 122B2 and 122C2 are coupled to interior junctions 112A1, 112B1 and 112C1 respectively.

In one embodiment, the phase angle difference of the output voltage Vout2 at two adjacent second ends of third windings are substantially same. For example, the phase angle difference of the output voltage Vout2 at second end 126 of two adjacent third windings 122A1-122A2 are substantially same. Similarly the phase angle difference of the output voltage Vout2 at second end 126 of two adjacent third windings, for example, 122A-122B1 are substantially same.

In one embodiment, the output voltage Vout2 at the second end of the third windings are substantially equal. For example, the output voltage Vout2 at the second end 126 of the third windings 122A1-122A3, 122B1-122B3 and 122C1-122C3 are substantially same.

In one embodiment, the output voltage Vout1 at the second end of secondary windings and at the exterior junction of the primary windings are the same. For example, the output voltage Vout1 at the second end 120 of secondary windings 116A1-116A2, 116B1-116B2 and 116C1-116C2 and at the exterior junction 114A-114C of the primary windings 108A-108C are substantially equal.

In one embodiment, the output voltage Vout2 may be greater than output voltage Vout1.

FIG. 7A also shows exemplary number of turns for various windings and sub-windings, with some of the windings or sub-windings having substantially same number of turns. For example, the number of turns N1-N9 are shown. For example, sub-primary windings 108A1, 108B1 and 108C1 each have substantially same number of turns, for example, N6. Similarly, secondary windings 116A1 and 116A2 each have substantially same number of turns, for example, N3. Similarly, third windings 122A2, 122B2 and 122C2 each have substantially same number of turns, for example, N4. Similarly, first sub-winding 122A31 and first sub-winding 122B31 each have substantially same number of turns, for example, N7.

Now referring to FIG. 7B, an exemplary phasor diagram 730 for the multi-phase transformer 700 of FIG. 7A is disclosed.

The phasor diagram 730 includes a first circle 736 and a second circle 734, both having a common center S. The points A, B and C represent the exterior junction 114A-114C of the primary windings. The sides AB, BC and CA of triangle ABC represent the primary windings 108A-108C respectively. Points A1-A3, B1-B3 and C1-C3 correspond to the interior junctions 112A1-112A3, 112B1-112B3 and 112C1-112C3 respectively of the primary windings 108A-108C.

Lines A-A1, A1-A2, A2-A3 and A3-B represent sub-primary windings 108A1-108A4 respectively. Similarly, Lines B-B1, B1-B2, B2-B3 and B3-C represent sub-primary windings 108B1-108B4 respectively. Similarly, lines C-C1, C1-C2, C2-C3 and C3-A represent sub-primary windings 108C1-108C4 respectively.

Points A1V1-A2V1, B1V1-B2V1 and C1V1-C2V1 represent the second end 120 of the secondary windings 116A1-116A2, 116B1-166B2 and 116C1-116C2 respectively. Similarly points AV2, A1V2 and A2V2; BV2, B1V2 and B1V2; and CV1, C1V2 and C2V2 represent the second end 126 of the third windings 122A1-122A3, 122B1-122B3 and 122C1-122C3 respectively.

For example, lines A2-A1V1, A3-A2V1; B2-B1V1, B3-B2V1 and C2-C1V1, C3-C2V1 represent the secondary windings 116A1-116A2, 116B1-116B2 and 116C1-116C2 respectively.

Lines A-AV2, A1-A1V2, B-BV2, B1-B1V2, C-CV2, C1-C1V2 represent third windings 122A1, 122A2, 122B1, 122B2, 122C1 and 122C2 respectively. As previously discussed, some of the third windings include at least two sub-windings connected in series, for example, third winding 122A3. The line A-A', B-B' and C-C' represent the first sub-windings 122C31, 122A31 and 122B31 of third windings 122C1, 122A1 and 122B1 respectively. Similarly, the line A'-C2V2, B'-A2V2 and C'-B2V2 represent the second sub-windings 122C32, 122A32 and 122B32 of third windings 122C1, 122A1 and 122B1.

As previously discussed, the length or lines in a phasor diagram represent the number of turns for the windings. For example, the length of line A-A1 represent number of turns N6 for sub-primary winding 108A1. Similarly, the length of line A2-A1V1 represent number of turns N3 for secondary winding 116A1. And, the length of line A1-A1V2 represent the number of turns N4 for third winding 122A2.

The lines SA, SB and SC represent the input AC voltage Vin applied tm the exterior junctions A, B and C of the primary windings 108A-108C. As it is evident from the phasor diagram, a three phase input voltage Vin depicted as phaseA_230, phaseB_230 and phaseC_230 is applied, with each phase separated by about 120 degrees.

As previously described, the lines in a phasor diagrams are vector lines depicting the vector of the induced voltage. For example, the vector of induced voltage in primary windings AB, BC and CA are depicted by the arrows 536, 538 and 540. Similarly, the arrows on lines representing the secondary windings and the third windings represent the vector of induced voltage. For example, arrows 542 and 544 represent the vector of induced voltage in the secondary winding 116A1 and 116A2 respectively. The arrows 546 and 548 represent the vector of inducted voltage in the third winding 122A2 and the first sub-winding 122A31 of third winding 122A3.

In one embodiment, the vector of induced voltage in the secondary windings are such that they are either in phase or 180 degrees out of phase with the vector of induced voltage in a primary winding to which they are magnetically coupled. In one embodiment, the vector of induced voltage in the secondary windings are such that the phase angle difference of the output voltage at two adjacent second ends of the secondary windings are substantially same.

In one embodiment, the vector of induced voltage in the third windings and the sub-windings of the third windings are such that they are either in phase or 180 degrees out of phase with the vector of induced voltage in a primary winding to which they are magnetically coupled. In one embodiment, the first sub-winding and second sub-winding of a third winding may be magnetically coupled to two different primary windings. In one embodiment, the vector of induced voltage in the third windings are such that the phase angle difference of the output voltage at two adjacent second ends of the third windings are substantially same.

The phasor diagram 730 shows an exemplary vector of induced voltage in the secondary windings and the third windings of auto transformer 700.

Figure 8A:
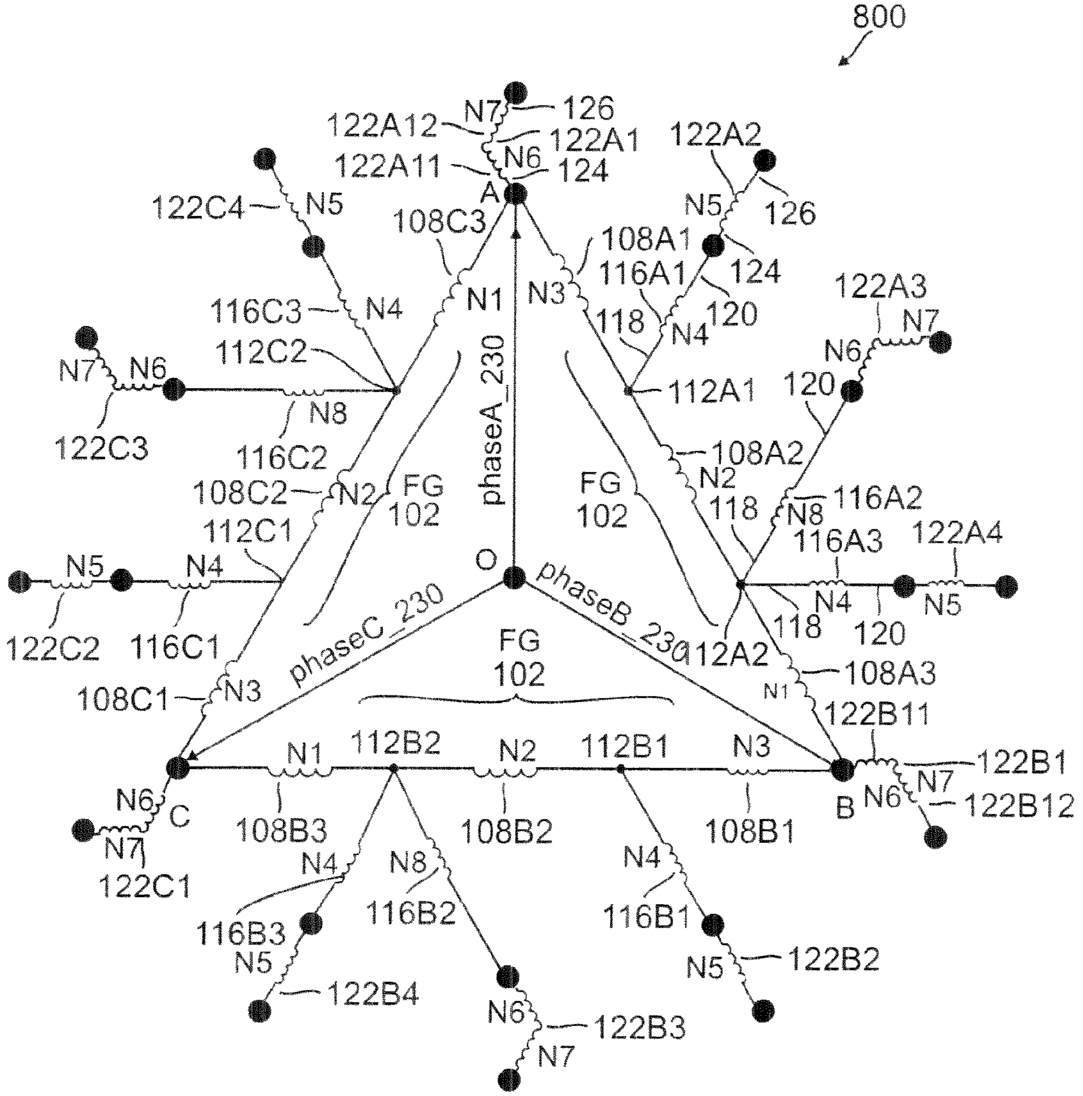
FIG. 8A is a winding diagram for an alternate multi-phase auto-transformer.
Figure 8B:
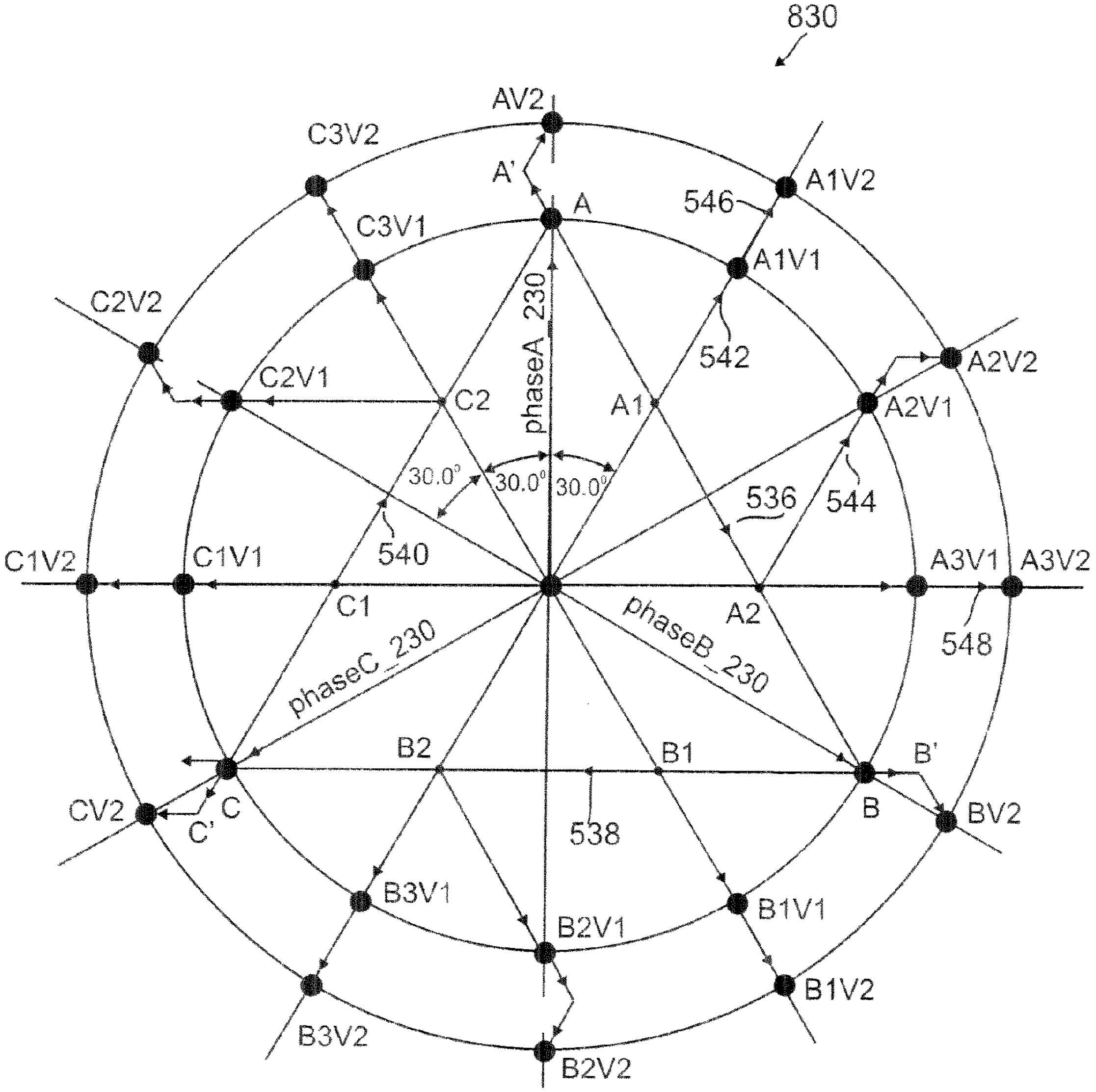
FIG. 8B is a phasor diagram for the multi-phase auto-transformer of FIG. 8A.

Another embodiment of a multi-phase transformer is described with reference to FIGS. 8A and 8B. Transformer 800 is another exemplary twelve phase or twenty four pulse multi-phase transformer. The multi-phase transformer 800 described with reference to FIGS. 8A and 8B is similar to the multi-phase transformer 600 described with reference to FIGS. 6A and 6B in that multi-phase transformer 800 has a primary group of windings 102, secondary group of windings 104 and third group of windings 106. One of the similarities is that some of the third windings of the third group of windings include at least two sub-windings connected in series. One other difference is that some of the third windings are also coupled to second end of secondary windings.

Referring to FIG. 8A, in this specific embodiment, each of the primary windings 108A-108C include a plurality of sub primary windings 108A1-108A3, 108B1-108B3, 108C1-108C3 that are coupled in series. For example, for the primary winding 108A, the junction of sub primary windings 108A1 and 108A2 coupled in series define an interior junction 112A1 and the junction of sub primary windings 108A2 and 108A3 coupled in series define an interior junction 112A2. Each ends of the primary windings 108A-108C are coupled to one ends of the other primary winding 108A-108C to form a delta configuration with exterior junctions 114A-114C. Each of the primary windings 108A-108C are configured to receive one phase of a multi-phase input voltage at the exterior junction 114A-114C.

The second group of windings 104 includes a plurality of secondary windings 116A1-116A3, 116B1-116B3 and 116C1-116C3. Each secondary winding 116A-116C3 has a first end 118 and a second end 120. Each secondary winding 116A1-116C3 may be magnetically coupled to one of the primary windings 108A-108C. The first end 118 of each secondary winding 116A1-116C3 may be coupled to one of the primary windings 108A-108C. For example, the first end 118 of secondary winding 116A1 may be coupled to interior junction 112A1 of primary winding 108A.

In one embodiment, two first ends 118 of secondary windings are coupled to the same interior junction of primary winding. For example, first ends 118 of secondary windings 116A2 and 116A3 are coupled to the same interior junction 112A2.

The third group of windings 106 includes a plurality of third windings. For example, plurality of third windings 122A1-122A4, 122B1-122B4 and 122C1-112C4.

Each third winding 122A1-122C4 has a first end 124 and a second end 126. Each third winding 122A1-122C4 may be magnetically coupled to one of the primary windings 108A-108C.

Some of the third windings include at least two sub-windings connected in series. For example, third windings 122A1, 122A3, 122B1, 122B3, 122C1 and 122C3 have at least two sub-windings. For example, third winding 122A1 has a first sub-winding 122A11 and a second sub-winding 122A12 connected in series at one end. The other end of first sub-winding 122A11 corresponds to the first end 124 of third winding 122A1. The other end of second sub-winding 122A12 corresponds to the second end 126 of third winding 122A1.

The first end 124 of some of the third windings 122A1-122C4 are coupled to a primary winding 108A-108C. In some embodiments, the first end 124 of some of the third windings 122A1-122C4 are coupled to one of the exterior junctions 114A-114C. For example, the first end 124 of the third windings 122A1, 122B1 and 122C1 are coupled to exterior junction 114A, 114B and 114C respectively.

In one embodiment, the phase angle difference of the output voltage Vout2 at two adjacent second ends of third windings are substantially same. For example, the phase angle difference of the output voltage Vout2 at second end 126 of two adjacent third windings 122A1-122A2 are substantially same. Similarly the phase angle difference of the output voltage Vout2 at second end 126 of two adjacent third windings, for example, 122A4-122B1 are substantially same.

In one embodiment, the output voltage Vout2 at the second end of the third windings are substantially equal. For example, output voltage Vout2 at the second end 126 of the third windings 122A1-122A4, 122B1-122B4 and 122C1-122C4 are substantially same.

In one embodiment, the output voltage Vout1 at the second end of secondary windings and at the exterior junction of the primary windings are the same. For example, the output voltage Vout1 at the second end 120 of secondary windings 116A1-116A3, 116B1-116B3 and 116C1-116C3 and at the exterior junction 114A-114C of the primary windings 108A-108C are substantially equal.

In one embodiment, the output voltage Vout2 may be greater than output voltage Vout1.

FIG. 8A also shows exemplary number of turns for various windings and sub-windings, with some of the windings or sub-windings having substantially same number of turns. For example, the number of turns N8 are shown. For example, sub-primary windings 108A1, 108B1 and 108C1 each have substantially same number of turns, for example, N3. Similarly, secondary windings 116A1 and 116A3 each have substantially same number of turns, for example, N4. Similarly, third windings 122A2 and 122A4 each have substantially same number of turns, for example, N5. Similarly, first sub-winding 122A11 and the first sub-winding 122B11 each have substantially same number of turns, for example, N6.

Now referring to FIG. 8B, an exemplary phasor diagram 830 for the multi-phase transformer 800 of FIG. 8A is disclosed.

The phasor diagram 830 includes a first circle 832 and a second circle 834, both having a common center S. The points A, B and C represent the exterior junction 114A-114C of the primary windings. The sides AB, BC and CA of triangle ABC represent the primary windings 108A-108C respectively. Points A1-A2, B1-B2 and C1-C2 correspond to the interior junctions 112A1-112A2, 112B1-112B2 and 112C1-112C2 respectively of the primary windings 108A-108C.

Lines A-A1, A1-A2, and A2-B represent sub-primary windings 108A1-108A3 respectively. Similarly, Lines B-B1, B1-B2, B2-C represent sub-primary windings 108B1-108B3 respectively. Similarly, lines C-C1, C1-C2, and C2-A represent sub-primary windings 108C1-108C3 respectively.

Points A1V1-A3V1, B1V1-B3V1 and C1V1-C3V1 represent the second end 120 of the secondary windings 116A1-116A3, 116B1-166B3 and 116C1-116C3 respectively. Similarly points AV2, A1V2, A2V2 and A3V2; BV2, B1V2, B2V2 and B3V2; and CV2, C1V2, C2V2 and C3V2 represent the second end 126 of the third windings 122A1-122A4, 122B1-122B4 and 122C1-122C4 respectively.

For example, lines A1-A1V1, A2-A2V1, A2-A3V1; B1-B1V1, B2-B2V1, B2-B3V1 and C1-C1V1, C2-C2V1, C2-C3V1 represent the secondary windings 116A1-116A3, 115B1-116B3 and 116C1-116C3 respectively.

Lines A1V1-A1V2, A3V1-A3V2, B1V1-B1V2, B3V1-B3V2, C1V1-C1V2 and C3V1-C3V2 represent third windings 122A2, 122A4, 122B2, 122B4, 122C2 and 122C4 respectively. As previously discussed, some of the third windings include at least two sub-windings connected in series, for example, third winding 122A1. For example, line A-A', B-B' and C-C' represent the first sub-windings 122A11, 122B11 and 122C11 of third windings 122A1, 122B1 and 122C1 respectively. Similarly, the line A'-AV2, B'-BV2 and C'-CV2 represent the second sub-windings 122A12, 122A12 and 122C12 of third windings 122A1, 122B1 and 122C1.

As previously discussed, the length of lines in a phasor diagram represent the number of turns for the windings. For example, the length of line A-A1 represent number of turns N3 for sub-primary winding 108A1. Similarly, the length of line A1-A1V1 represent number of turns N4 for secondary winding 116A1. And, the length of line A1V1-A1V2 represent the number of turns N5 for third winding 122A2.

The lines SA, SB and SC represent the input AC voltage Vin applied to the exterior junctions A, B and C of the primary windings 108A-108C. As it is evident from the phasor diagram, a three phase input voltage Vin depicted as phaseA_230, phaseB_230 and phase_230 is applied, with each phase separated by about 120 degrees.

As previously described, the lines in a phasor diagrams are vector lines depicting the vector of the induced voltage. For example, the vector of induced voltage in primary windings AB, BC and CA are depicted by the arrows 536, 538 and 540. Similarly, the arrows on lines representing the secondary windings and the third windings represent the vector of induced voltage. For example, arrows 542 and 544 represent the vector of induced voltage in the secondary winding 116A1 and 116A2 respectively. The arrows 546 and 548 represent the vector of inducted voltage in the third winding 122A2 and 122A4.

In one embodiment, the vector of induced voltage in the secondary windings are such that they are either in phase or 180 decrees out of phase with the vector of induced voltage in a primary winding to which they are magnetically coupled. In one embodiment, the vector of induced voltage in the secondary windings are such that the phase angle difference of the output voltage at two adjacent second ends of the secondary windings are substantially same.

In one embodiment, the vector of induced voltage in the third windings and the sub-windings of the third windings are such that they are either in phase or 180 degrees out of phase with the vector of induced voltage in a primary winding to which they are magnetically coupled. In one embodiment, the first sub-winding and second sub-winding of a third winding may be magnetically coupled to two different primary windings. In one embodiment, the vector induced voltage in the third windings are such that the phase angle difference of the output voltage at two adjacent second ends of the third windings are substantially same.

The phasor diagram 830 shows an exemplary vector of induced voltage in the secondary windings and the third windings.

Figure 9A:
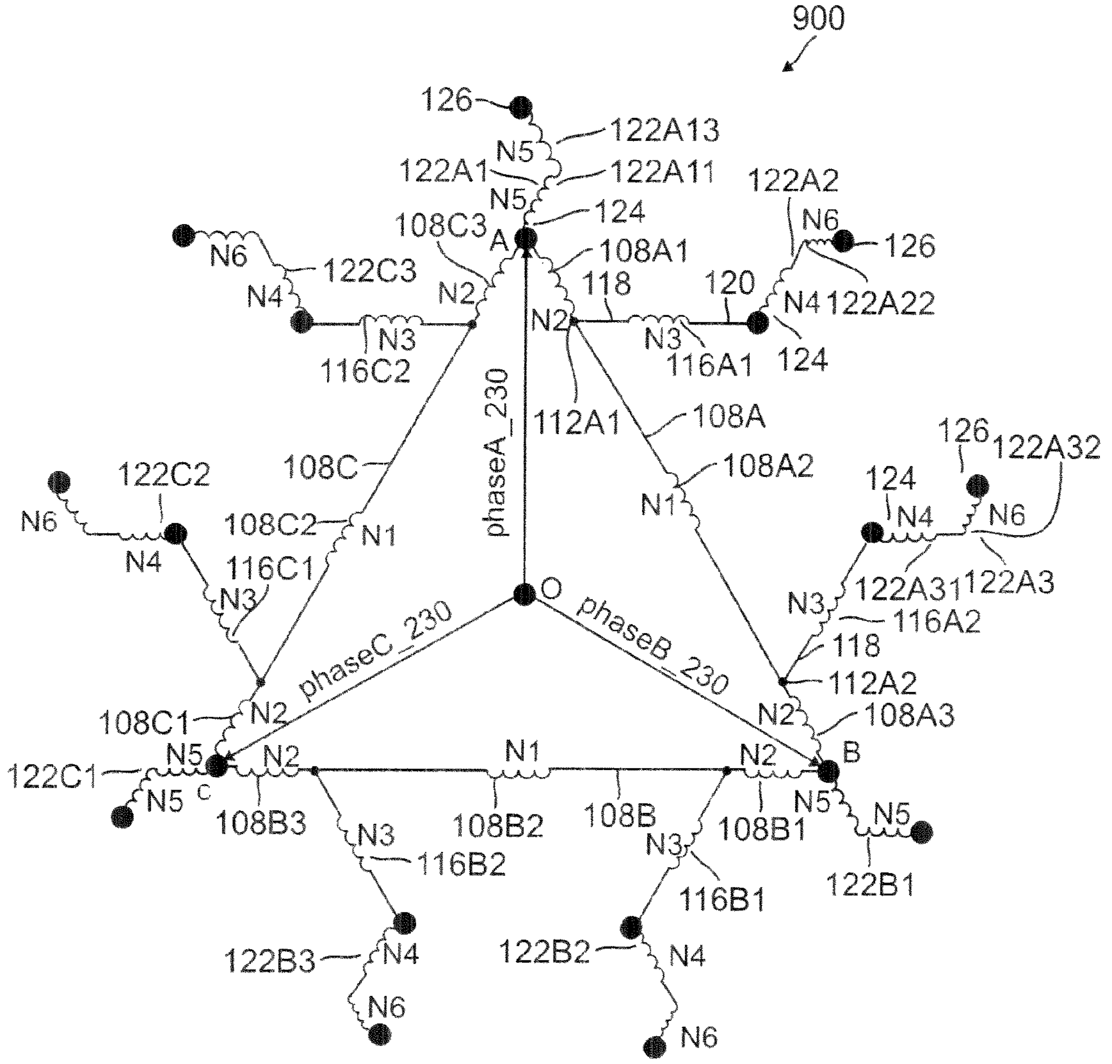
FIG. 9A is a winding diagram for an alternate multi-phase auto-transformer.
Figure 9B:
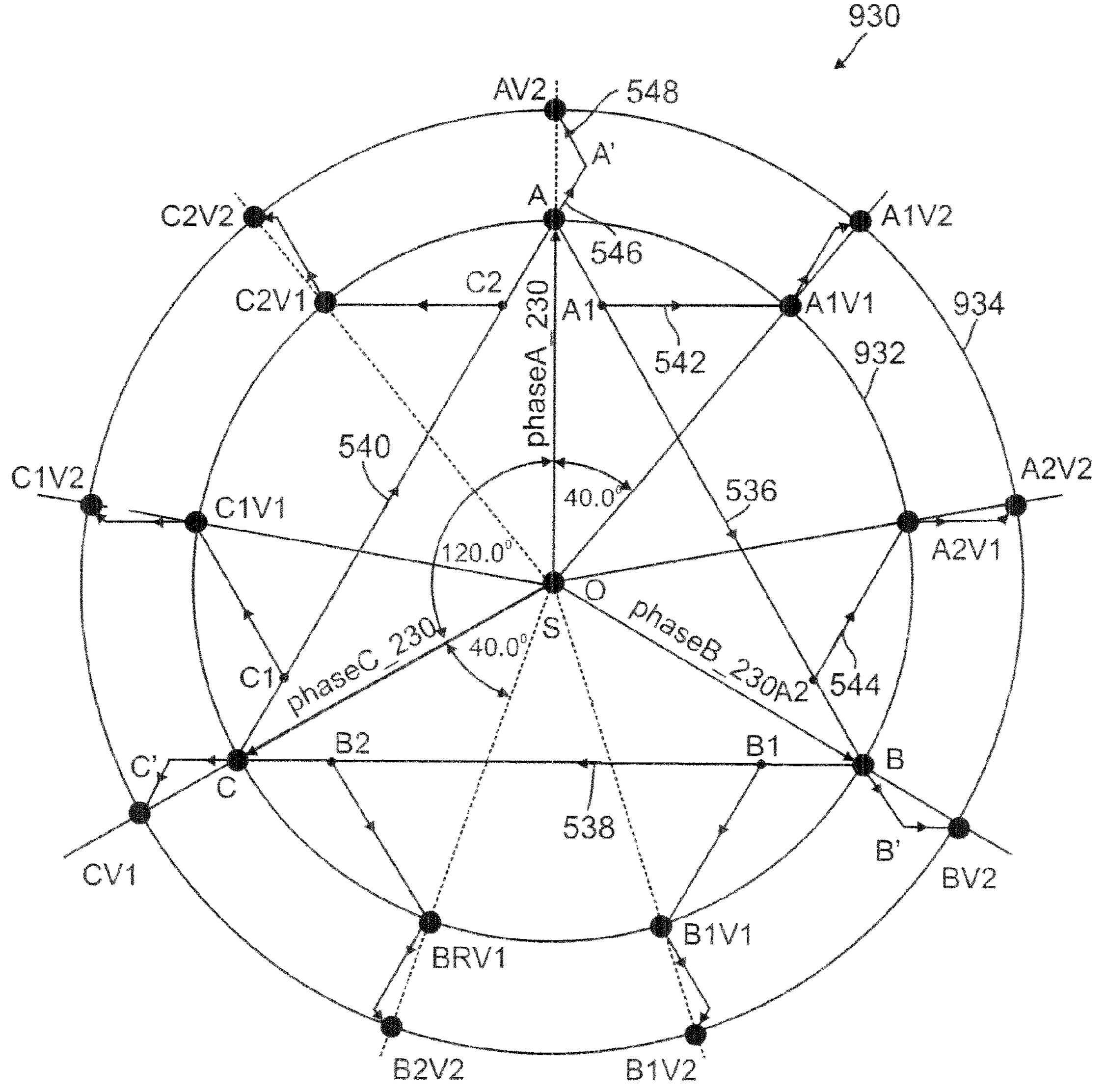
FIG. 9B is a phasor diagram for the multi-phase auto-transformer of FIG. 9A.

Another embodiment of a multi-phase transformer is described with reference to FIGS. 9A and 9B. The multi-phase transformer 900 described with reference to FIGS. 9A and 9B is similar to the multi-phase transformer 300 described with reference to FIGS. 3A and 3B in that multi-phase transformer 900 has a primary group of windings 102, secondary group of windings 104 and third group of windings 106. In addition, all of the third windings of the third group of windings include at least two sub-windings connected in series.

Referring to FIG. 9A, in this specific embodiment, each of the primary windings 108A-108C include a plurality of sub primary windings 108A1-108A3, 108B1-108B3, 108C1-108C3 that are coupled in series. For example, for the primary winding 108A, the junction of sub primary windings 108A1 and 108A2 coupled in series define an interior junction 112A1 and the junction of sub primary windings 108A2 and 108A3 coupled in series define an interior junction 112A2. Each ends of the primary windings 108A-103C are coupled to the ends of the other primary winding 108A-108C to form a delta configuration with exterior junctions 114A-114C. Each of the primary windings 108A-108C are configured to receive one phase of a multi-phase input voltage at the exterior junction 114A-114C.

The second group of windings 104 includes a plurality of secondary windings 116A1-116A2, 116B1-116B2 and 116C1-116C2. Each secondary winding 116A1-116C2 has a first end 118 and a second end 120. Each secondary winding 116A1-116C2 may be magnetically coupled to one of the primary windings 108A-108C. The first end 118 of each secondary winding 116A1-116C2 may be coupled to one of the primary windings 108A-108C. For example, the first end 118 of secondary winding 116A1 may be coupled to interior junction 112A1 of primary winding 108A.

The third group of windings 106 includes a plurality of third windings. For example, plurality of third windings 122A1-122A3, 122B1-122B3 and 122C1-122C3. Each third winding 122A1-122C4 has a first end 124 and a second end 126. Each third winding 122A1-122C4 may be magnetically coupled to one of the primary windings 108A-108C.

In one embodiment, all of the third windings include at least two sub-windings connected in series. For example, third windings 122A1, 122B1 and 122C1 have at least two sub-windings. For example, third winding 122A1 has a first sub-winding 122A11 and a second sub-winding 122A12 connected in series at one end. The other end of first sub-winding 122A11 corresponds to the first end 124 of third winding 122A1. The other end of second sub-winding 122A12 corresponds to the second end 126 of third winding 122A1.

In one embodiment, the first end 124 of some of the third windings 122A1-122C3 are coupled to a primary winding 108A-108C. For example, some of the first end 124 of the third windings 122A1-122C3 are coupled to one of the exterior junctions 114A-114C. For example, the first end 124 of the third windings 122A1, 122B1 and 122C1 are coupled to exterior junction 114A-114C respectively.

In one embodiment, the first end 124 of some of the third windings 122A1-122C3 are coupled to the second end 120 of the secondary windings 116A1-116C2. For example, the first end 124 of the third windings 122A2, 122A3, 122B2, 122B3, 122C2 and 122C3 are coupled to second end 120 of secondary winding 116A1, 116A2, 116B1, 116B2, 116C1 and 11612 respectively.

In one embodiment, the phase angle difference of the output voltage Vout2 at two adjacent second ends of third windings are substantially same. For example, the phase angle difference of the output voltage Vout2 at second end 126 of two adjacent third windings 122A1-122A2 are substantially same. Similarly the phase angle difference of the output voltage Vout2 at second end 126 of two adjacent third windings, for example, 122A3-122B1 are substantially same.

In one embodiment, the output voltage Vout2 at the second end of the third windings are substantially equal. For example, the output voltage Vout2 at the second end 126 of the third windings 122A1-122A3, 122B1-122B3 and 122C1-122C3 are substantially same.

In one embodiment, the output voltage Vout1 at the second end of secondary windings and at the exterior junction of the primary windings are the same. For example, the output voltage Vout1 at the second end 120 of secondary windings 116A1-116A2, 116B1-116B2 and 116C1-116C2 and at the exterior junction 114A-114C of the primary windings 108A-108C are substantially equal.

In one embodiment, the output voltage Vout2 may be greater than output voltage Vout1.

FIG. 9A also shows exemplary number of turns for various windings and sub-windings, with some of the windings or sub-windings having substantially same number of turns. For example, the number of turns N1-N6 are shown. For example, sub-primary windings 108A1, 108B1 and 108C1 each have substantially same number of turns, for example, N2. Similarly, secondary windings 116A1 and 116A2 each have substantially same number of turns, for example, N3. Similarly, first sub-winding 122A11 and the second sub-winding 122A12 each have substantially same number of turns, for example, N5.

Now referring to FIG. 9B, an exemplary phasor diagram 930 for the multi-phase transformer 900 of FIG. 9A is disclosed.

The phasor diagram 930 includes a first circle 632 and a second circle 634, both having a common center S. The points A, B and C represent the exterior junction 114A-114C of the primary windings. The sides AB, BC and CA of triangle ABC represent the primary windings 108A-108C respectively. Points A1-A2, B1-B2 C1-C2 correspond to the interior junctions 112A1-112A2, 112B1-112B2 and 112C1-112C2 respectively of the primary windings 108A-108C.

Lines A-A1, A1-A2, and A2-B represent sub-primary windings 108A1-108A3 respectively. Similarly, Lines B-B1, B1-B2, B2-C represent sub-primary windings 108B1-108B3 respectively. Similarly, lines C-C1, C1-C2, and C2-A represent sub-primary windings 108C1-108C3 respectively.

Points A1V1-A2V1, B1V1-B2V1 and C1V1-C2V1 represent the second end 120 of the secondary windings 116A1-116A2, 116B1-166B2 and 116C1-116C2 respectively. Similarly points AV2, A1V2 and A2V2; BV2, B1V2 and B2V2; and CV2, C1V2 and C2V2 represent the second end 126 of the third windings 122A1-122A3, 122B1-122B3 and 122C1-122C3 respectively.

For example, lines A1-A1V1, A2-A2V1; B1-B1V1, B2-B2V1 and C1-C1V1, C2-C2V1 represent the secondary windings 116A1-116A2, 115B1-116B2 and 116C1-116C2 respectively.

As previously discussed, all of the third windings include at least two sub-windings connected in series, for example, third winding 122A1. For example, the lines A-A', B-B' and C-C' represent the first sub-windings 122A11, 122B11 and 122C11 of third windings 112A1, 122B1 and 122C1 respectively. Similarly, the line A'-AV2, B'-BV2 and C'-CV2 represent the second sub-windings 121A12, 122B12 and 122C12 of third windings 122A1, 122B1 and 122C1.

As previously discussed, the length of lines in a phasor diagram represent the number of turns for the windings. For example, the length of line A-A1 represent number of turns N2 for sub-primary winding 108A1. Similarly, the length of line A1-A1V1 represent number of turns N3 for secondary winding 116A1. And, the length of line A-A' represent the number of turns N5 for third sub-winding 122A11.

The lines SA, SB and SC represent the input AC voltage Vin applied to the exterior junctions A, B and C of the primary windings 108A-108C. As it is evident from the phasor diagram, a three phase input voltage Vin depicted as phaseA_230, phaseB_230 and phaseC_280 is applied, with each phase separated by about 120 degrees.

As previously described, the lines in a phasor diagrams are vector lines depicting the vector of the induced voltage. For example, the vector of induced voltage in primary windings AB, BC and CA are depicted by the arrows 536, 538 and 540. Similarly, the arrows on lines representing the secondary windings and the third windings represent the vector of induced voltage. For example, arrows 542 and 544 represent the vector of induced voltage in the secondary winding 116A1 and 116A2 respectively. The arrows 546 and 548 represent the vector of inducted voltage in the third sub-winding 122A11 and 122A12.

In one embodiment, the vector of induced voltage in the secondary windings are such that they are either in phase or 180 degrees out of phase with the vector of induced voltage in a primary winding to which they are magnetically coupled. In one embodiment, the vector of induced voltage in the secondary windings are such that the phase angle difference of the output voltage at two adjacent second ends of the secondary windings are substantially same.

In one embodiment, the vector of induced voltage in the third windings and the sub-windings of the third windings are such that they are either in phase or 180 degrees out of phase with the vector of induced voltage in a primary winding to which they are magnetically coupled. In one embodiment, the first sub-winding and second sub-winding of a third winding may be magnetically coupled to two different primary windings. In one embodiment, the vector of induced voltage in the third windings are such that the phase angle difference of the output voltage to adjacent second ends of the third windings are substantially same.

The phasor diagram 930 shows an exemplary vector of induced voltage in the secondary windings and the third windings.

In one embodiment, for a third winding coupled to a second winding (for example, third winding 122A3 coupled to second winding 116A2), the vector of induced voltage in the first sub-winding (122A31) may be 180 degrees out of phase with the vector of induced voltage in a primary winding other than the primary winding to which the corresponding secondary winding is coupled and that is different than the primary winding that is in-phase with the corresponding second winding (primary winding 108B) and the vector of induced voltage in the second sub-winding (122A32) is in phase with the vector of induced voltage in a primary winding other than the primary winding to which the corresponding secondary winding may be coupled and that may be different than the primary winding that may be in-phase with the second winding (primary winding 108C).

In one embodiment, for the third winding coupled to an external junction of a primary winding (example, third winding 122A1), the vector of induced voltage in the first sub-winding (122A11) may be in phase with the vector of induced voltage in a primary winding coupled to the external junction (primary winding 108A) and the vector of induced voltage in the second sub-winding (122A12) may be 180 degrees out of phase with the vector of induced voltage in a primary winding coupled to the external junction that is different than the primary winding that may be in phase with the first sub-winding (primary winding 108A).

Figure 10A:
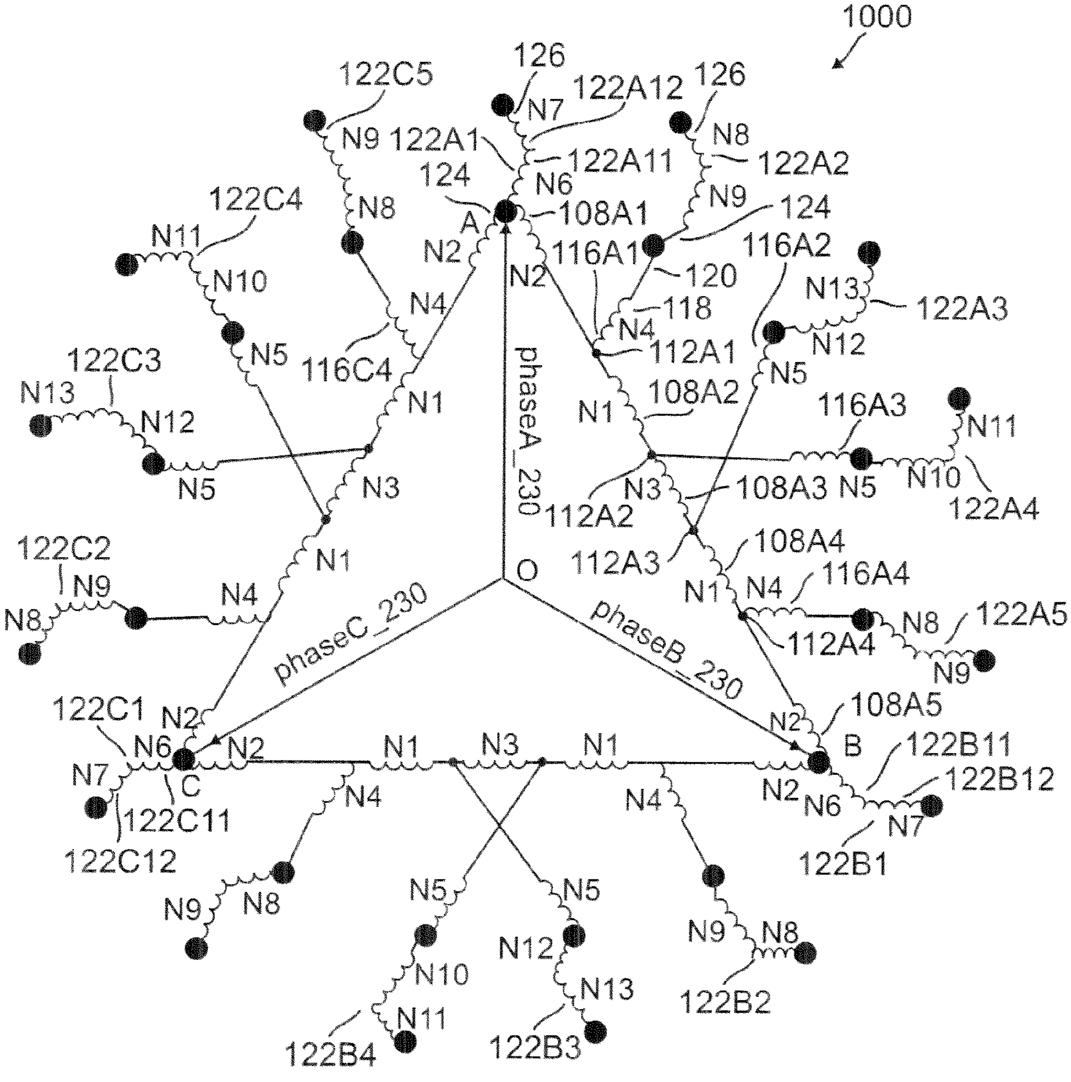
FIG. 10A is a winding diagram for an alternate multi-phase auto-transformer.
Figure 10B:
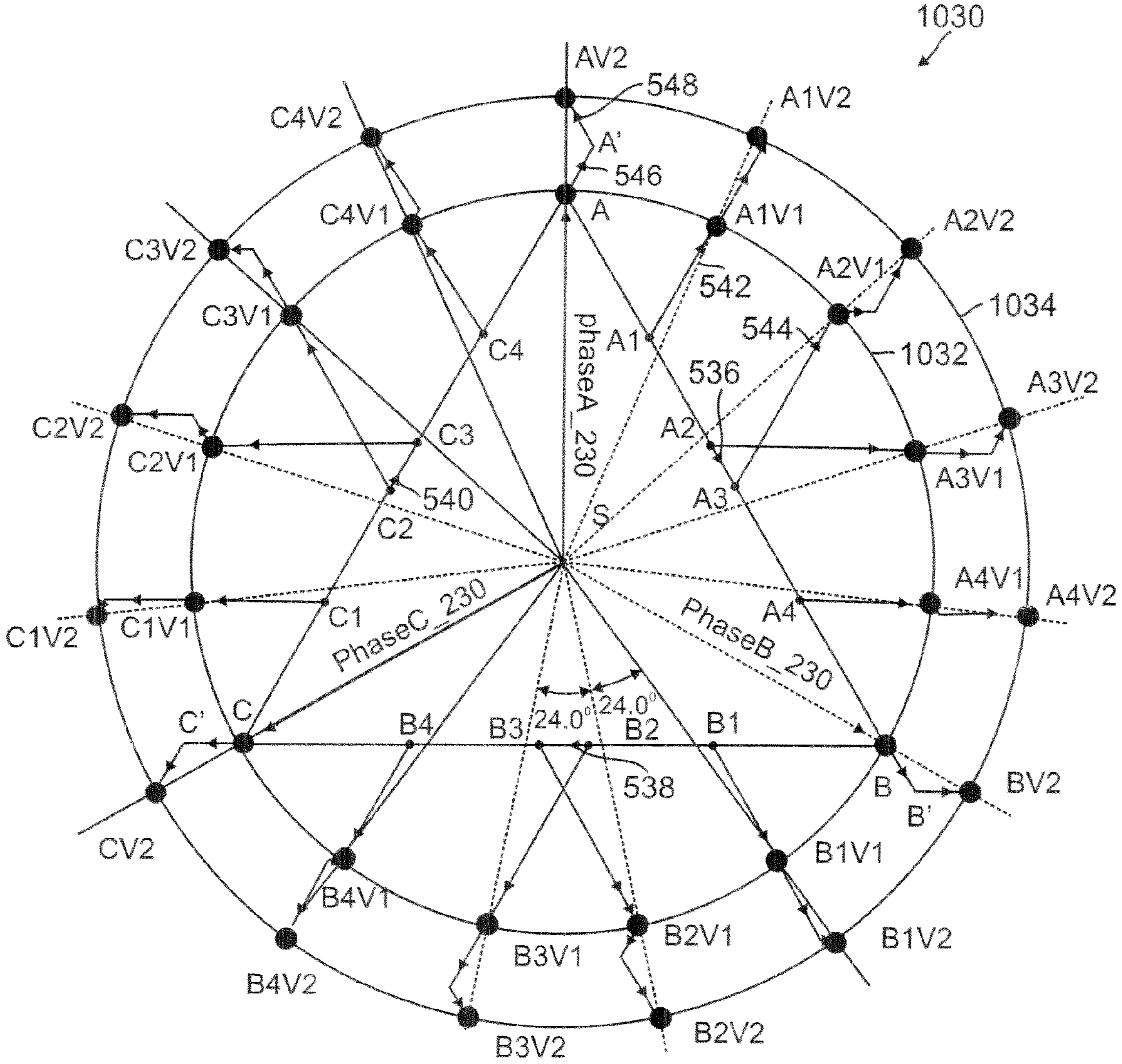
FIG. 10B is a phasor diagram for the multi-phase auto-transformer of FIG. 10A.

Another embodiment of a multi-phase transformer is described with reference to FIGS. 10A and 10B. Transformer 1000 is an exemplary fifteen phase or thirty pulse multi-phase transformer. The multi-phase transformer 1000 described with reference to FIGS. 10A and 10B is similar to the multi-phase transformer 900 described with reference to FIGS. 9A an 9B in that multi-phase transformer 1000 has a primary group of windings 102, secondary group of windings 104 and third group of windings 105. In addition, all of the third windings of the third group of windings include at least two sub-windings connected in series.

Referring to FIG. 10A, in this specific embodiment, each of the primary windings 108A-108C include a plurality of sub primary windings 108A1-108A5, 108B1-108B5, 108C1-108C5 that are coupled in series. For example, for the primary winding 108A, the junction of sub primary windings 108A1 and 108A2 coupled in series define an interior junction 112A1 and the junction of sub primary windings 108A2 and 108A3 coupled in series define an interior junction 112A2. Each ends of the primary windings 108A-108C are coupled to the ends of the other primary winding 108A-108C to form a delta configuration with exterior junctions 114A-114C. Each of the primary windings 108A-108C are configured to receive one phase of a multi-phase input voltage at the exterior junction 114A-114C.

The second group of windings 104 includes a plurality of secondary windings 116A1-116A4, 116B1-116B4 and 116C1-116C4. Each secondary winding 116A1-116C4 has a first end 118 and a second end 120. Each secondary winding 116A1-116C4 may be magnetically coupled to one of the primary windings 108A-108C. The first end 118 of each secondary winding 116A1-116C4 may be coupled to one of the primary windings 108A-108C. For example, the first end 118 of secondary wincing 116A1 may be coupled to interior junction 112A1 of primary winding 108A.

The third group of windings 106 includes a plurality of third windings. For example, plurality of third windings 122A1-122A5, 122B1-122B5 and 122C1-122C5. Each third winding 122A1-122C5 has a first end 124 and a second end 126. Each third winding 122A1-122C5 may be magnetically coupled to one of the primary windings 108A-108C.

In one embodiment, all of the third windings include at least two sub-windings connected in series. For example, third windings 122A1, 122B1 and 122C1 have at least two sub-windings. For example, third winding 122A1 has a first sub-winding 122A11 and a second sub-winding 122A12 connected in series at one end. The other end of first sub-winding 122A11 corresponds to the first end 124 of third winding 122A1. The other end of second sub-winding 122A12 corresponds to the second end 126 of third winding 122A1.

In one embodiment, the first end 124 of some of the third windings 122A1-122C5 are coupled to a primary winding 108A-108C. For example, some of the first end 124 of the third windings 122A1-122C5 are coupled to one of the exterior junctions 114A-114C. For example, the first end 124 of the third windings 122A1, 122B1 and 122C1 are coupled to exterior junction 114A-114C respectively.

In one embodiment, the first end 124 of some of the third windings 122A1-122C5 are coupled to the second end 120 of the secondary windings 116A1-116C4. For example, the first end 124 of the third windings 122A2, 122A3, 122A4 and 122A5 are coupled to second end 120 of secondary winding 116A1, 116A2, 116A3 and 116A4 respectively.

In one embodiment, the phase angle difference of the output voltage Vout2 at two adjacent second ends of third windings are substantially same. For example, The phase angle difference of the output voltage Vout2 at second end 126 of two adjacent third winding 122A1-122A2 are substantially same. Similarly the phase angle difference of the output voltage Vout2 at second end 126 of two adjacent third windings, for example, 122A3-122B1 are substantially same.

In one embodiment, the output voltage Vout2 at the second end of the third windings are substantially equal. For example, the output voltage Vout2 at the second end 126 of the third windings 122A1-122A5, 122B1-122B5 and 122C1-122C5 are substantially same.

In one embodiment, the output voltage Vout1 at the second end of secondary windings and at the exterior junction of the primary windings are the same. For example, the output voltage Vout1 at the second end 120 of secondary windings 116A1-116A4, 116B1-116B4 and 116C1-116C4 and at the exterior junction 114A-114C of the primary windings 108A-108C are substantially equal.

In one embodiment, the output voltage Vout2 may be greater than output voltage Vout1.

FIG. 10A also shows exemplary number of turns for various windings and sub-windings, with some of the windings or sub-windings having substantially same number of turns. For example, the number of turns N1-N13 a shown. For example, sub-primary windings 108A1, 108B1 and 108C1 each have substantially same number of turns, for example, N2. Similarly, secondary windings 116A1 and 116A4 each have substantially same number of turns, for example, N4. Similarly, first sub-winding 122A11 and the first sub-winding 122B11 each have substantially same number of turns, for example, N6.

Now referring to FIG. 10B, an exemplary phasor diagram 1030 for the multi-phase transformer 1000 of FIG. 10A is disclosed.

The phasor diagram 1030 includes a first circle 1032 and a second circle 1034, both having a common center S. The points A, B and C represent the exterior junction 114A-114C of the primary windings. The sides AB, BC and CA of triangle ABC represent the primary windings 108A-108C respectively. Points A1-A4, B1-B4 and C1-C4 correspond to the interior junctions 112A1-112A4, 112B1-112B4 and 112C1-112C4 respectively of the primary windings 108A-108C.

Lines A-A1, A1-A2, A2-A3, A3-A4 and A4-B represent sub-primary windings 108A1-108A5 respectively. Similarly, Lines B-B1, B1-B2, B2-B3, B3-B4 and B4-C represent sub-primary windings 108B1-108B5 respectively. Similarly, lines C-C1, C1-C2, C2-C3, C3-C4 and C4-A represent sub-primary windings 108C1-108C5 respectively.

Points A1V1-A4V1, B1V1-B4V1 and C1V1-C4V1 represent the second end 120 of the secondary windings 116A1-116A4, 116B1-166B4 and 116C1-116C4 respectively. Similarly points AV2, A1V2-A4V2; BV2, B1V2-B4V2; and CV2, C1V2-C4V2 represent the second end 126 of the third windings 122A1-122A4, 122B1-122B4 and 122C1-122C4 respectively.

For example, lines Al-A1V1, A2-A3V1, A3-A A4-A4V1; B1-B1V1, B2-B3V1, B3-B2V1, B4-B4V1 and C1-C1V1, C2-C3V1, C3-C2V1, C4-C4V1 represent the secondary windings 116A1-116A4, 115B1-116B4 and 116C1-116C4 respectively.

As previously discussed, all of the third windings include at least two sub-windings corrected in series, for example, third winding 122A1. For example, the lines A-A', B-B' and C-C' represent the first sub-windings 122A11, 122B11 and 122C11 of third windings 122A1, 122B1 and 122C1 respectively. Similarly, the line A'-AV2, B'-BV2 and C'-CV2 represent the second sub-windings 122A12, 122B12 and 122C12 of third windings 122A1, 122B1 and 122C1.

As previously discussed, the length of lines in a phasor diagram represent the number of turns for the windings. For example, the length of line A-A1 represent number of turns N2 for sub-primary winding 108A1. Similarly, the length of line A1-A1V1 represent number of turns N4 for secondary winding 116A1. And, the length of line A-A' represent the number of turns N for third sub-winding 122A11.

The lines SA, SB and SC represent the input AC voltage Vin applied to the exterior junctions A, B and C of the primary windings 108A-108C. As it is evident from the phasor diagram, a three phase input voltage Vin depicted as phaseA_230, phaseB_230 and phaseC_230 is applied, with each phase separated by about 120 degrees.

As previously described, the lines in a phasor diagrams are vector lines depicting the vector of the induced voltage. For example, the vector of induced voltage in primary windings AB, BC and CA are depicted by the arrows 536, 538 and 540. Similarly, the arrows on lines representing the secondary windings and the third windings represent the vector of induced voltage. For example, arrows 542 and 544 represent the vector of induced voltage in the secondary winding 116A1 and 116A2 respectively. The arrows 546 and 548 represent the vector of inducted voltage in the third sub-winding 122A11 and 122A12.

In one embodiment, the vector of induced voltage in the secondary windings are such that they are either in phase or 180 degrees out of phase with the vector of induced voltage in a primary winding to which they are magnetically coupled. In one embodiment, the vector of induced voltage in the secondary windings are such that the phase angle difference of the output voltage at two adjacent second ends of the secondary windings are substantially same.

In one embodiment, the vector of induced voltage in the third windings and the sub-windings of the third windings are such that they are either in phase or 180 degrees out of phase with the vector of induced voltage in a primary winding to which they are magnetically coupled. In one embodiment, the first sub-winding and second sub-winding of a third winding may be magnetically coupled to two different primary windings. In one embodiment, the vector of induced voltage in the third windings are such that the phase angle difference of the output voltage at two adjacent second ends of the third windings are substantially same.

The phasor diagram 1030 shows an exemplary vector of induced voltage in the secondary windings and the third windings.

Figure 11A:
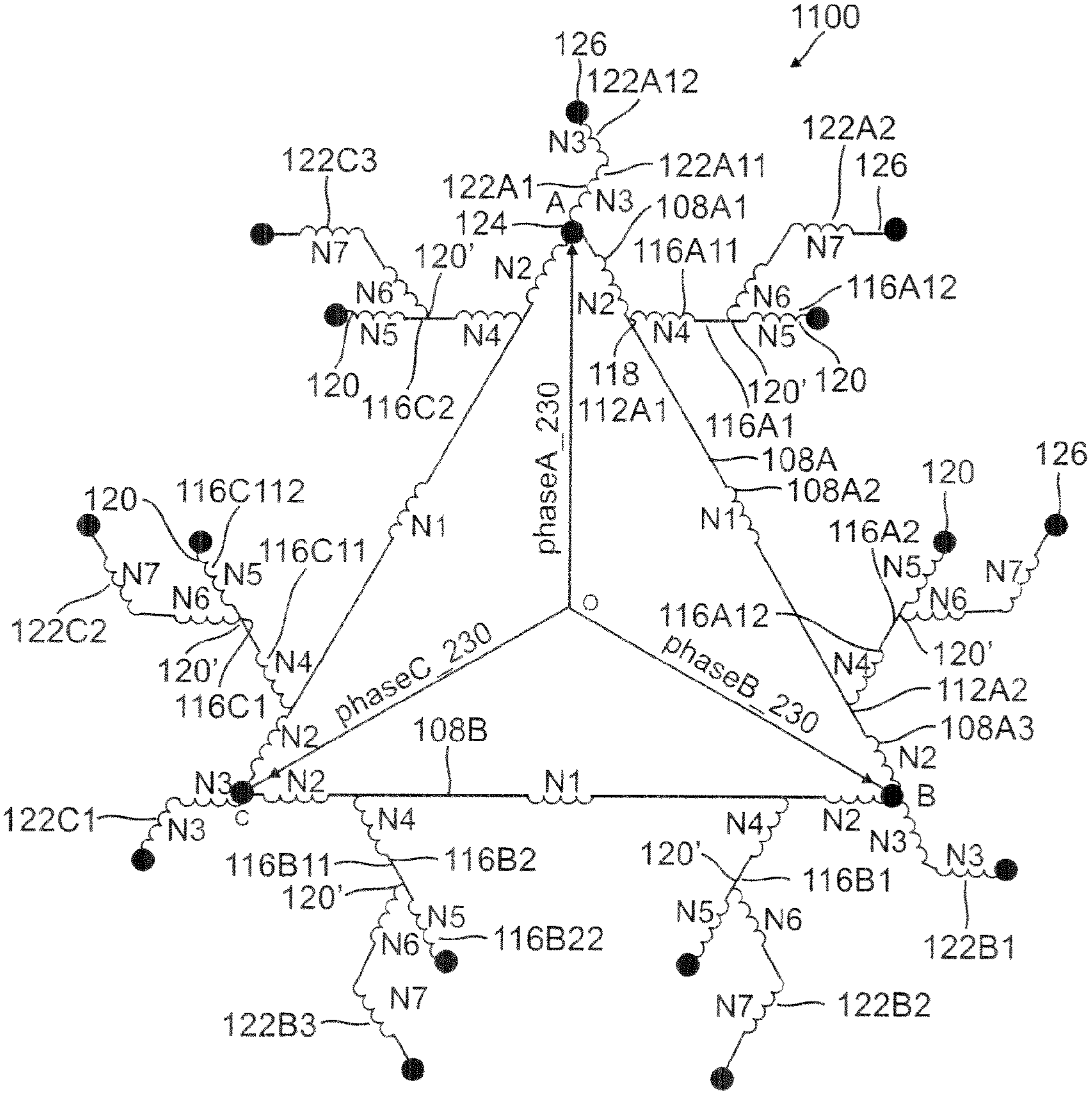
FIG. 11A is a winding diagram for an alternate multi-phase auto-transformer.
Figure 11B:
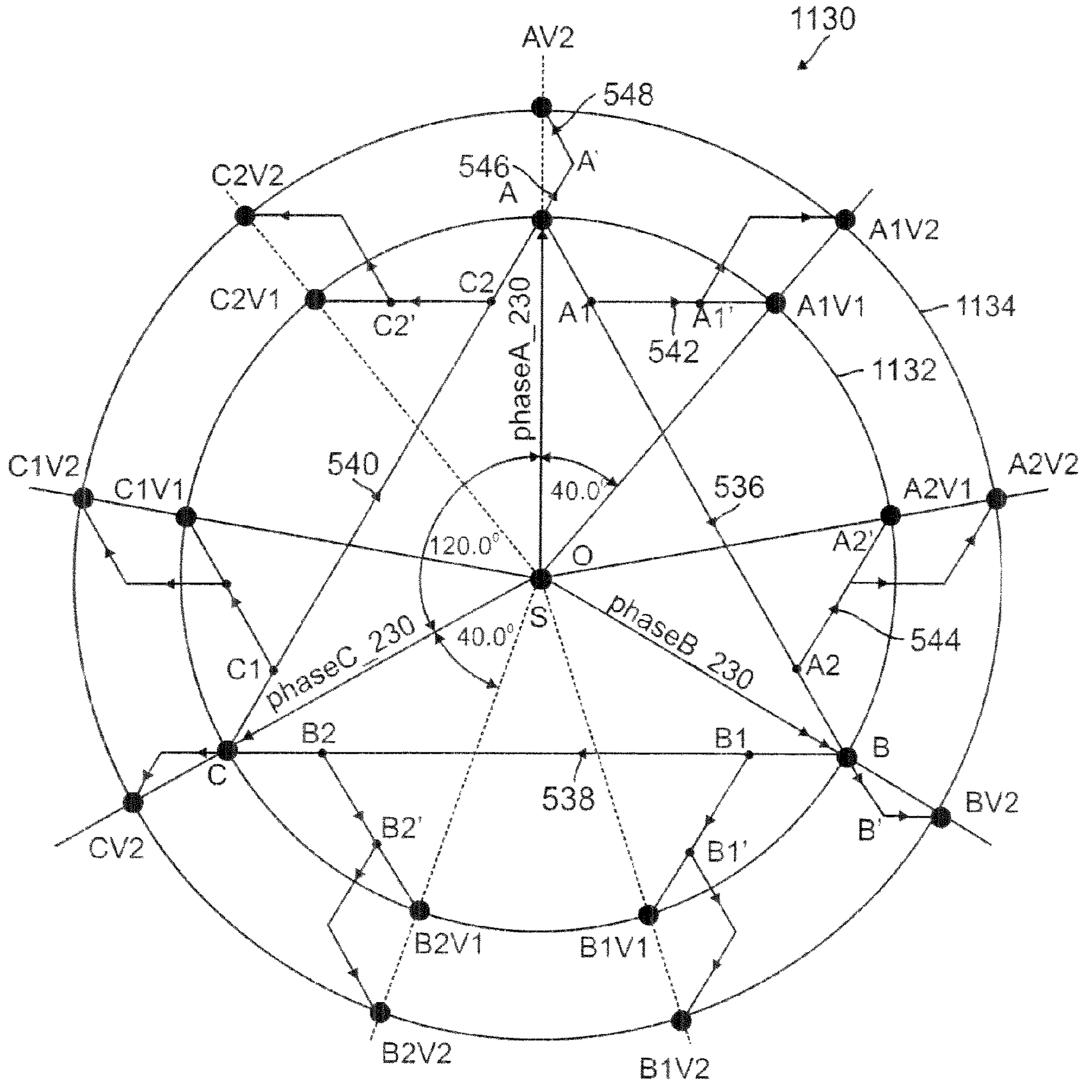
FIG. 11B is a phasor diagram for the multi-phase auto-transformer of FIG. 11A.

Another embodiment of a multi-phase transformer is described with reference to FIGS. 11A and 11B. Transformer 1100 is another exemplary nine phase or eighteen can pulse multi-phase transformer. The multi-phase transformer 1100 described with reference to FIGS. 11A and 11B is similar to the multi-phase transformer 900 described with reference to FIGS. 9A and 9B in that multi-phase transformer 900 has a primary group of windings 101, secondary group of windings 104 and third group of windings 106. In addition, all of the third windings of the third group of windings include at least two sub-windings connected in series. One of the differences is that the secondary windings include a plurality of sub-windings connected in series. The junction of two sub-windings of the secondary windings defines a sub-junction of the secondary winding. Also, some of the third windings are coupled to a sub-junction of the secondary windings.

Referring to FIG. 11A, in this specific embodiment, each of the primary windings 108A-108C include a plurality of sub primary windings 108A1-108A3, 108B1-108B3, 108C1-108C3 that are coupled in series. For example, for the primary winding 108A, the junction of sub primary windings 108A1 and 108A2 coupled in series define an interior junction 112A1 and the junction of sub primary windings 108A2 and 108A3 coupled in series define an interior junction 112A2. Each ends of the primary windings 108A-108C are coupled to the ends of the other primary winding 108A-108C to form a delta configuration with exterior junctions 114A-114C. Each of the primary windings 108A-108C are configured to receive one phase of a multi-phase input voltage at the exterior junction 114A-114C.

The second group of windings 104 includes a plurality of secondary windings 116A1-116A2, 116B1-116B2 and 116C1-116C2. Each secondary winding 116A1-116C2 has a first end 118 and a second end 120. Each secondary winding includes at least a first sub-winding and a second sub-winding connected in series at a sub-junction.

For example, the secondary winding 116A1 includes a first sub-winding 116A11 and a second sub-winding 116A12 and coupled an series at one end to define a sub-junction 120'. The other end of first sub-winding 116A11 corresponds to the first end 118 of secondary winding 116A1. The other end of second sub-winding 116A12 corresponds to the second end 120 of secondary winding 116A1.

Each secondary winding 116A1-116C2 may be magnetically coupled to one of the primary windings 108A-108C. In one embodiment, each of the sub-winding for example, first sub-winding and second sub-winding may be magnetically coupled to different primary windings. The first end 118 of each secondary winding 116A1-116C2 may be coupled to one of the primary windings 108A-108B. For example, the first end 118 of secondary winding 116A1 may be coupled to interior junction 112A1 of primary winding 108A.

The third group of windings 106 includes a plurality of third windings. For example, plurality of third windings 122A1-122A3, 122B1-122B3 and 122C1-122C3. Each third winding 122A1-122C4 has a first end 124 and a second end 126. Each third winding 122A1-122C4 may be magnetically coupled to one of the primary windings 108A-108C.

In one embodiment, all of the third windings include at least two sub-windings connected an series. For example, third windings 122A1, 122B1 and 122C1 have at least two sub-windings. For example, third winding 122A1 has a first sub-winding 122A11 and a second sub-winding 122A12 connected in series at one end. The other end of first sub-winding corresponds to the first end 124 of third winding 122A1. The other end of second sub-winding 122A12 corresponds to the second end 126 of third winding 122A1.

In one embodiment, the first end 124 of some of the third windings 122A1-122C3 are coupled to a primary winding 108A-108C. For example, some of the first end 124 of the third windings 122A1-122C3 are coupled to one of the exterior junctions 114A-114C. For example, the first end 124 of the third windings 122A1, 122B1 and 122C1 are coupled to exterior junction 114A-114C respectively.

In one embodiment, the first end 124 of some of the third windings 122A1-122C3 are coupled to the sub-junction 120' of the secondary windings 116A1-116C2. For example, the first end 124 of the third windings 122A2, 122A3, 122B2, 122B3, 122C2 and 122C3 are coupled to sub-junction 120' of secondary winding 116A1, 116A2, 116B1, 116B2, 116C1 and 116C2 respectively.

In one embodiment, the phase angle difference of the output voltage Vout2 at two adjacent second ends of third windings are substantially same. For example, the phase angle difference of the output voltage Vout2 at second end 126 of two adjacent third windings 122A1-122A2 are substantially same. Similarly the phase angle difference of the output voltage Vout2 at second end 126 of two adjacent third windings, for example, 122A3-122B1 are substantially same.

In one embodiment, the output voltage Vout2 at the second end of the third windings are substantially equal. For example, the output voltage Vout2 at the second end 126 of the third windings 122A1-122A3, 122B1-122B3 and 122C1-122C1 are substantially same.

In one embodiment, the output voltage Vout1 at the second end of secondary windings and at the exterior junction of the primary windings are the same. For example, the output voltage Vout1 at the second end 120 of secondary windings 116A1-116A2, 116B1-116B2 and 116C1-116C2 and at the exterior junction 114A-114C of the primary windings 108A-108C are substantially equal.

In one embodiment, the output voltage Vout2 may be greater than output voltage Vout1.

FIG. 11A also shows exemplary number of turns for various windings and sub-windings, with some of the windings or sub-windings having substantially same number of turns. For example, the number of turns N1-N7 are shown. For example, sub-primary windings 108A1, 108B1 and 108C1 each have substantially same number of turns, for example, N2. Similarly, sub-winding 116A11 of secondary winding 116A1 and sub-winding 116A21 of secondary winding 116A2 each have substantially same number of turns, or example, N4. Similarly, first sub-winding 122A11 and the second sub-winding 122A12 each have substantially same number of turns, for example, N3.

Now referring to FIG. 11B, an exemplary phasor diagram 1130 for the multi-phase transformer 1100 of FIG. 11A is disclosed.

The phasor diagram 1130 includes a first circle 1132 and a second circle 1134, both having a common center S. The paints A, B and C represent the exterior junction 114A-114C of the primary windings. The sides AB, BC and CA of triangle ABC represent the primary windings 108A-108C respectively. Points A1-A2, B1-B2 and C1-C2 correspond to the interior junctions 112A1-112A2, 122B1-112B2 and 112C1-112C2 respectively of the primary windings 108A-108C.

Lines A-A1, A1-A2, and A1-B represent sub-primary windings 108A1-108A3 respectively. Similarly, Lines B-B1, B1-B2, B2-C represent sub-primary windings 108B1-108B3 respectively. Similarly, lines C-C1, C1-C2, and C2-A represent sub-primary windings 108C1-108C3 respectively.

Points A1V1-A2V1, B1V1-B2V1 and C1V1-C2V1 represent the second end 120 of the secondary windings 116A1-116A2, 116B1-166B2 and 116C1-116C2 respectively. Similarly points AV2, A1V2 and A2V2; BV2, B1V2 and B2V2; and CV2, C1V2 and C2V2 represent the second end 126 of the third windings 122A1-122A3, 122B1-122B3 and 122C1-122C3 respectively.

As previously discussed, all of the secondary windings include at least two sub-windings connected in series, for example, secondary winding 116A1. For example, the lines A1-A1', B1-B1' and C1-C1' represent the first sub-windings 116A11, 116B11 and 116C11 of secondary windings 116A1, 116B1 and 116C1 respectively. Similarly, the line A1'-A1V1, B1'-B1V1 and C1'-C1V1 represent the second sub-windings 116A12, 116B12 and 116C12 of secondary windings 116A1, 116B1 and 116C1.

As previously discussed, all of the third windings include at least two sub-windings connected in series, for example, third winding 122A1. For example, the lines A-A', B-B' and C-C' represent the first sub-windings 122A11, 122B11 and 122C11 of third windings 122A1, 122B1 and 122C1 respectively. Similarly, the line A'-AV2, B'-BV2 and C'-CV2 represent the second sub-windings 122A12, 122B12 and 122C12 of third windings 122A1, 122B1 and 122C1.

As previously discussed, the length of lines in a phasor diagram represent the number of turns for the windings. For example, the length of line A-A1 represent number of turns N2 for sub-primary winding 108A1. Similarly, the length of line A1-A1' represent number of turns N4 for sub-winding 116A11 of secondary winding 116A1. And, the length of line A-A' represent the number of turns N5 for third sub-winding 122A11 of third winding 122A1.

The lines SA, SB and SC represent the input AC voltage Vin applied to the exterior junctions A, B and C of the primary windings 108A-108C. As it is evident from the phasor diagram, a three phase input voltage Vin depicted as phaseA_230, phaseB_230 and phased_230 is applied, with each phase separated by about 120 degrees.

As previously described, the lines in a phasor diagrams are vector lines depicting the vector of the induced voltage. For example, the vector of induced voltage in primary windings AB, BC and CA are depicted by the arrows 536, 538 and 540. Similarly, the arrows on lines representing the secondary windings and the third windings represent the vector of induced voltage. For example, arrows 542 and 544 represent the vector of induced voltage on the sub-winding 116A11 and 122A12 of secondary winding 116A1 and 116A2 respectively. The arrows 546 and 548 represent the vector of inducted voltage in the sub-winding 122A11 and 122A12 of third windings 122A1.

In one embodiment, the vector of induced voltage in the secondary windings are such that they are either in phase or 180 degrees out of phase with the vector of induced voltage in a primary winding to which they are magnetically coupled. In one embodiment, the vector of induced voltage in the secondary windings are such that the phase angle difference of the output voltage at two adjacent second ends of the secondary windings are substantially same.

In one embodiment, the vector of induced voltage in the third windings and the sub-windings of the third windings are such that they are either in phase or 180 degrees out of phase with the vector of induced voltage in a primary winding or which they are magnetically coupled. In one embodiment, the first sub-winding and second sub-winding of a third winding may be magnetically coupled to two different primary windings. In one embodiment, the vector of induced voltage in the third windings are such that the phase angle difference of the output voltage at two adjacent second ends of the third windings are substantially same.

The phasor diagram 1130 shows an exemplary vector of induced voltage in the secondary windings and the third windings.

Figure 12A:
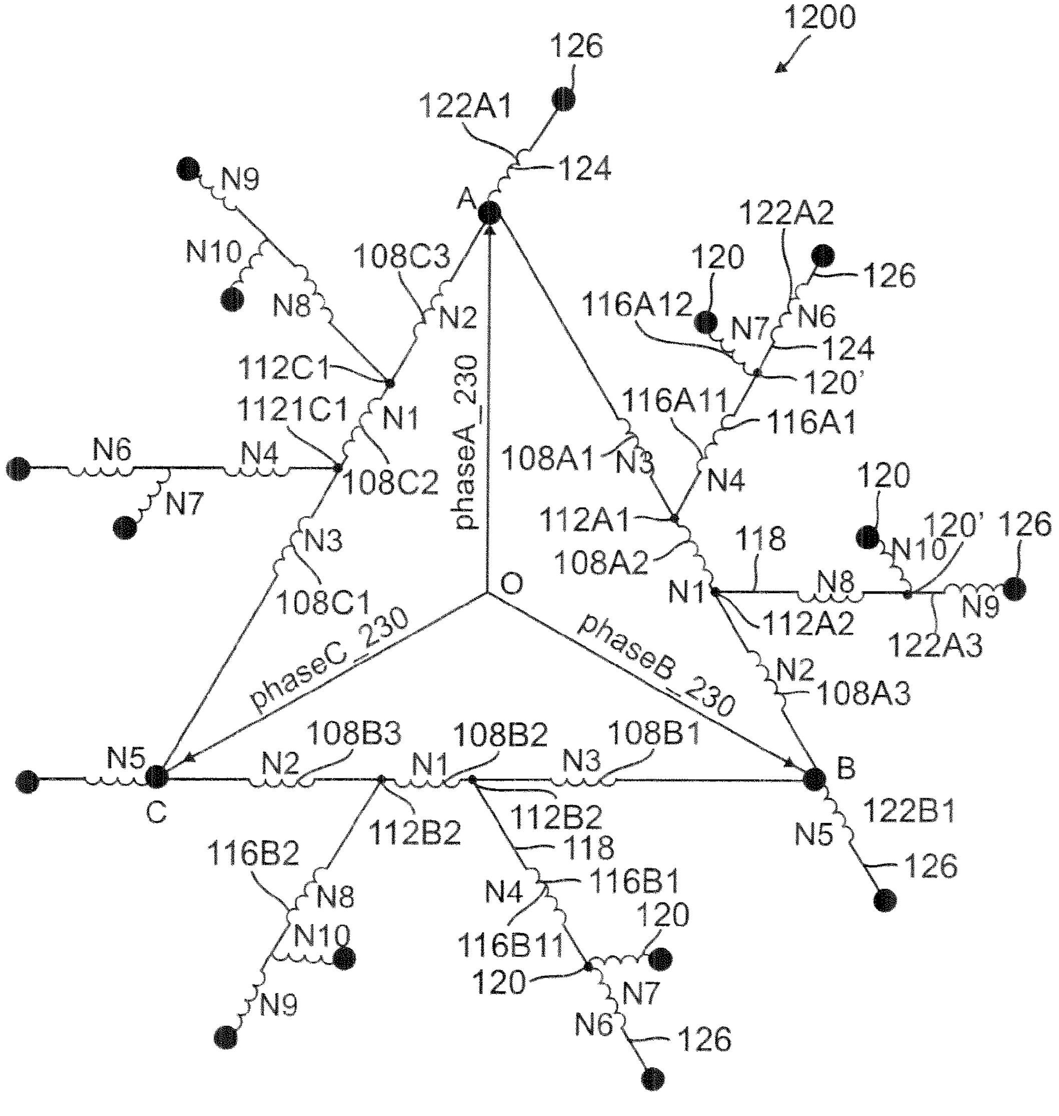
FIG. 12A is a winding diagram for an alternate multi-phase auto-transformer.
Figure 12B:
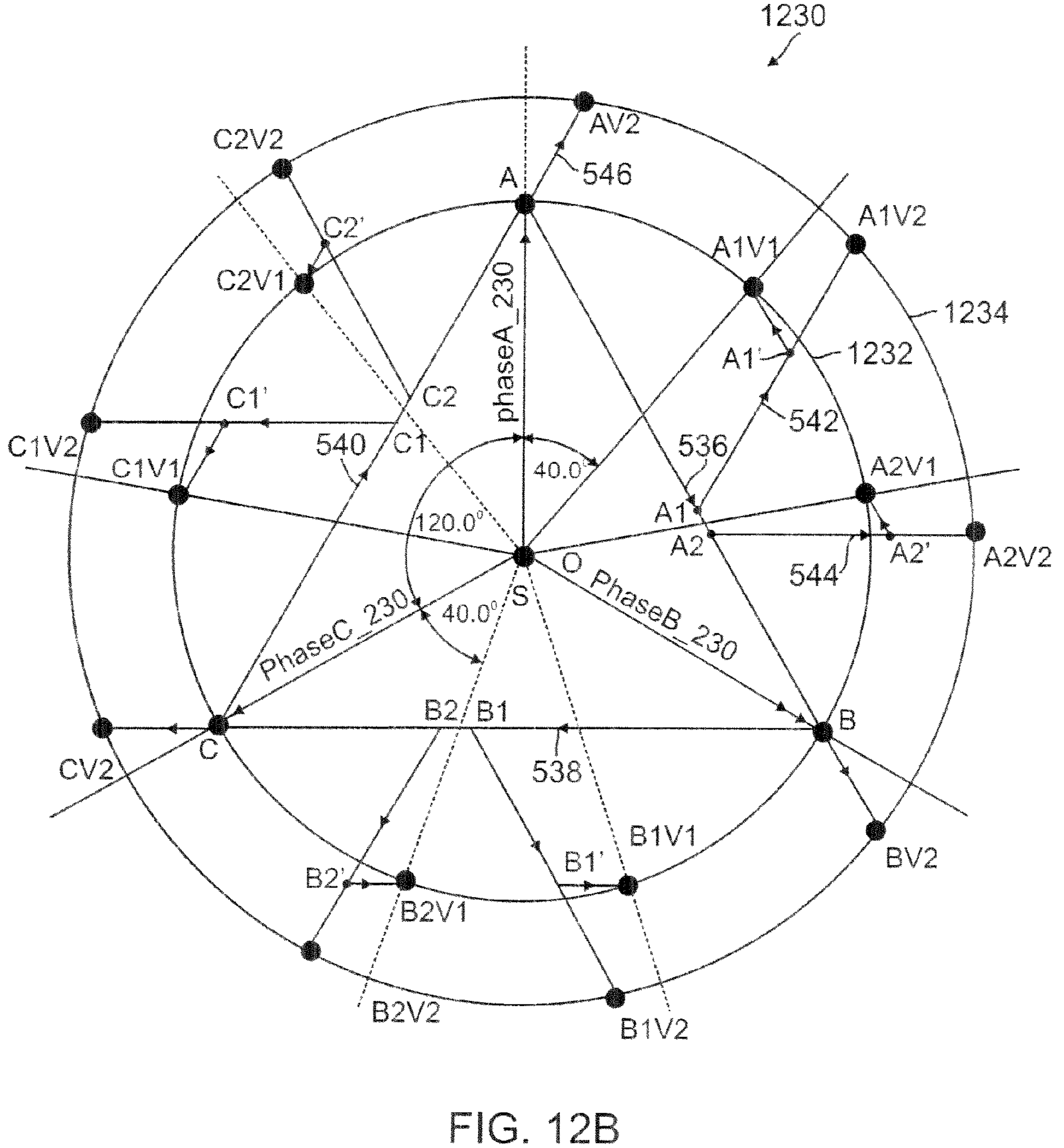
FIG. 12B is a phasor diagram for the multi-phase auto-transformer of FIG. 12A.

Another embodiment of a multi-phase transformer is described with reference to FIGS. 12A and 12B. Transformer 1200 is another exemplary nine phase or eighteen pulse multi-phase transformer. The multi-phase transformer 1200 described with reference to FIGS. 12A and 12B is similar to the multi-phase transformer 1100 described with reference to FIGS. 11A and 11B in that multi-phase transformer 1100 has a primary group of windings 102, secondary group of windings 104 and third group of windings 106. In addition, all of the secondary windings of the second group of windings include at least two sub-windings connected in series. Also, some of the third windings are coupled to a sub-junction of the secondary windings. One of the differences is that the third windings do not include a plurality of sub-windings connected in series.

Referring to FIG. 12A, in this specific embodiment, each of the primary windings 108A-108C include a plurality of sub primary windings 108A1-108A3, 108B1-108B3, 108C1-108C3 that are coupled in series. For example, for the primary wording 108A, the junction of sub primary windings 108A1 and 10812 coupled in series define an interior junction 112A1 and the junction of sub primary windings 108A2 and 108A3 coupled in series define an interior junction 112A2. Each ends of the primary windings 108A-108C are coupled to the ends of the other primary winding 108A-108C to form a delta configuration with exterior junctions 114A-114C. Each of the primary windings 108A-108C are configured to receive one phase of a multi-phase input voltage at the exterior junction 114A-114C.

The second group of windings 104 includes a plurality of secondary windings 116A1-116A2, 116B1-116B2 and 116C1-116C2. Each secondary winding 116A1-116C2 has a first end 118 and a second end 120. Each secondary winding includes at least a first sub-winding and a second sub-winding connected in series at a sub-junction.

For example, the secondary winding 116A1 includes a first sub-winding 116A11 and a second sub-winding 116A12 and coupled in series at one end to define a sub-junction 120'. The other end of first sub-winding 116A11 corresponds to the first end 118 of secondary winding 116A1. The other end of second sub-winding 116A12 corresponds to the second end 120 of secondary winding 116A1.

Each secondary winding 116A1-116C2 may be magnetically coupled to one of the primary windings 108A-108C. In one embodiment, each of the sub-winding for example, first sub-winding and second sub-winding may be magnetically coupled to different primary windings. The first end 118 of each secondary winding 116A1-116C2 may be coupled to one of the primary windings 108A-108C. For example, the first end 118 of secondary winding 116A1 may be coupled to interior junction 112A1 of primary winding 108A.

The third group of windings 106 includes a plurality of third windings. For example, plurality of third windings 122A1-122A3, 122B1-122B3 and 122C1-122C3. Each third winding 122A2-122C4 has a first end 124 and a second end 126. Each third winding 122A1-122C4 may be magnetically coupled to one of the primary windings 108A-108C.

In one embodiment, the first end 124 of some of the third windings 122A1-122C3 are coupled to a primary winding 108A-108C. For example, some of the first end 124 of the third windings 122A1-122C3 are coupled to one of the exterior junctions 114A-114C. For example, the first end 124 of the third windings 122A1, 122B1 and 122C1 are coupled to exterior junction 114A-114C respectively.

In one embodiment, the first end 124 of some of the third windings 122A1-122C3 are coupled to the sub-junction 120' of the secondary windings 116A1-116C2. For example, the first end 124 of the third windings 122A2, 122A3, 122B2, 122B3, 122C2 and 122C3 are coupled to sub-junction 120' of secondary winding 116A1, 116A2, 116B1, 116B2, 116C1 and 116C2 respectively.

In one embodiment, the phase angle difference of the output voltage Vout2 at two adjacent second ends of third windings are substantially same. For example, the phase angle difference of the output voltage Vout2 at second end 126 of two adjacent third windings 122A1-122A2 are substantially same. Similarly the phase angle difference of the output voltage Vout2 at second end 126 of two adjacent third windings, for example, 122A3-122B1 are substantially same.

In one embodiment, the output voltage Vout2 at the second end of the third windings are substantially equal. For example, the output voltage Vout2 at the second end 126 of the third windings 122A1-122A3, 122B1-122B3 and 122C1-122C3 are substantially same.

In one embodiment, the output voltage Vout1 at the second end of secondary windings and at the exterior junction of the primary windings are the same. For example, the output voltage Vout1 at the second end 120 of secondary windings 116A1-116A2, 116B1-116B2 and 116C1-116C2 and at the exterior junction 114A-114C of the primary windings 108A-108C are substantially equal.

In one embodiment, the output voltage Vout2 may be greater than output voltage Vout1.

FIG. 12A also shows exemplary number of turns for various windings and sub-windings, with some of the windings or sub-windings having substantially same number of turns. For example, the number of turns N1-N10 are shown. For example, sub-primary windings 108A1, 108B1 and 108C1 each have substantially same number of turns, for example, N3. Similarly, sub-winding 116A11 of secondary winding 116A1 and sub-winding 116B11 of secondary winding 11631 each have substantially same number of turns, for example, N4. Similarly, third winding 122A1 and third winding 122B1 each have substantially same number of turns, for example, N5.

Now referring to FIG. 12B, an exemplary phasor diagram 1230 for the multi-phase transformer 1200 of FIG. 12A is disclosed.

The phasor diagram 1230 includes a first circle 1232 and a second circle 1234, both haying a common center S. The points A, B and C represent the exterior junction 114A-114C of the primary windings. The sides AB, BC and CA of triangle ABC represent the primary windings 108A-108C respectively. Points A1-A2, B1-B2 and C1-C2 correspond to the interior junctions 112A1-112A2, 112B2-112B2 and 112C1-112C2 respectively of the primary windings 108A-108C.

Lines A-A1, A1-A2, and A2-B represent sub-primary windings 108A1-108A3 respectively. Similarly, Lines B-B1 B1-B2, B2-C represent sub-primary windings 108B1-108B3 respectively. Similarly, lines C-C1, C1-C2, and C2-A represent sub-primary windings 108C1-108C3 respectively.

Points A1V1-A2V1, B1V1-B2V1 and C1V1-C2V1 represent the second end 120 of the secondary windings 116A1-116A2, 116B1-166B2 and 116C1-116C2 respectively. Similarly points AV2, A1V2 and A2V2; BV2, B1V2 and B2V2; and CV2, C1V2 and C2V2 represent the second end 126 of the third windings 122A1-122A3, 122B1-122B3 and 122C1-122C3 respectively.

As previously discussed, all of the secondary windings include at least two sub-windings connected in series, for example, secondary winding 116A1. For example, the lines A1-A1', B1-B1' and C1-C1' represent the first sub-windings 116A11, 116B11 and 116C11 of secondary windings 116A1, 116B1 and 116C1 respectively. Similarly, the line A1'-A1V1, B1'-B1V1 and C1'-C1V1 represent the second sub-windings 116A12, 116B12 and 116C12 of secondary windings 116A1, 116B1 and 116C1.

The third windings are also represented in the phasor diagram. For example, the lines A-AV2, B-BV2 and C-CV2 represent the third windings 122A1, 122B1 and 122C1 respectively. Similarly, the line A1'-A1V2, B1'-B1V2 and C1'-CV2 represent the third windings 122A2, 122B2 and 122C2 respectively.

As previously discussed, the length of lines in a phasor diagram represent the number of turns for the windings. For example, the length of line A-A1 represent number of turns N3 for sub-primary winding 108A1. Similarly, the length of line A1-A1' represent number of turns N4 for sub-winding 116A11 of secondary winding 116A1. And, the length of line A-AV2 represent the number of turns N5 for third winding 122A1.

The lines SA, SB and SC represent the input AC voltage Vin applied to the exterior junctions A, B and C of the primary windings 108A-108C. As it is evident from the phasor diagram, a three phase input voltage Vin depicted as phaseA_230, phaseB_230 and phaseC_230 is applied, with each phase separated by about 120 degrees.

As previously described, the lines in a phasor diagrams are vector lines depicting the vector of the induced voltage. For example, the vector of induced voltage in primary windings AB, BC and CA are depicted by the arrows 536, 538 and 540. Similarly, the arrows on lines representing the secondary windings and the third windings represent the vector of induced voltage. For example, arrows 542 and 544 represent the vector of induced voltage in the sub-winding 116A11 and 116A21 of secondary wind 116A1 and 116A2 respectively. The arrow 546 represents the vector of inducted voltage in the third winding 122A1.

In one embodiment, the vector of induced voltage in the secondary windings and the sub-windings of the secondary windings are such that they are either in phase or 180 degrees out of phase with the vector of induced voltage in a primary winding to which they are magnetically coupled. In one embodiment, the vector of induced voltage in the secondary windings are such that the phase angle difference of the output voltage at two adjacent second ends of the secondary windings are substantially same. In one embodiment, the first sub-winding and second sub-winding of a secondary winding may be magnetically coupled to two different primary windings.

In one embodiment, the vector of induced voltage in the third windings are such that they are either in phase or 180 degrees out of phase with the vector of induced voltage in a primary winding to which they are magnetically coupled. In one embodiment, the vector of induced voltage in the third windings are such that the phase angle difference of the output voltage at two adjacent second ends of the third windings are substantially same.

The phasor diagram 1230 shows an exemplary vector of induced voltage in the primary windings, secondary windings and the third windings.

Figure 13A:
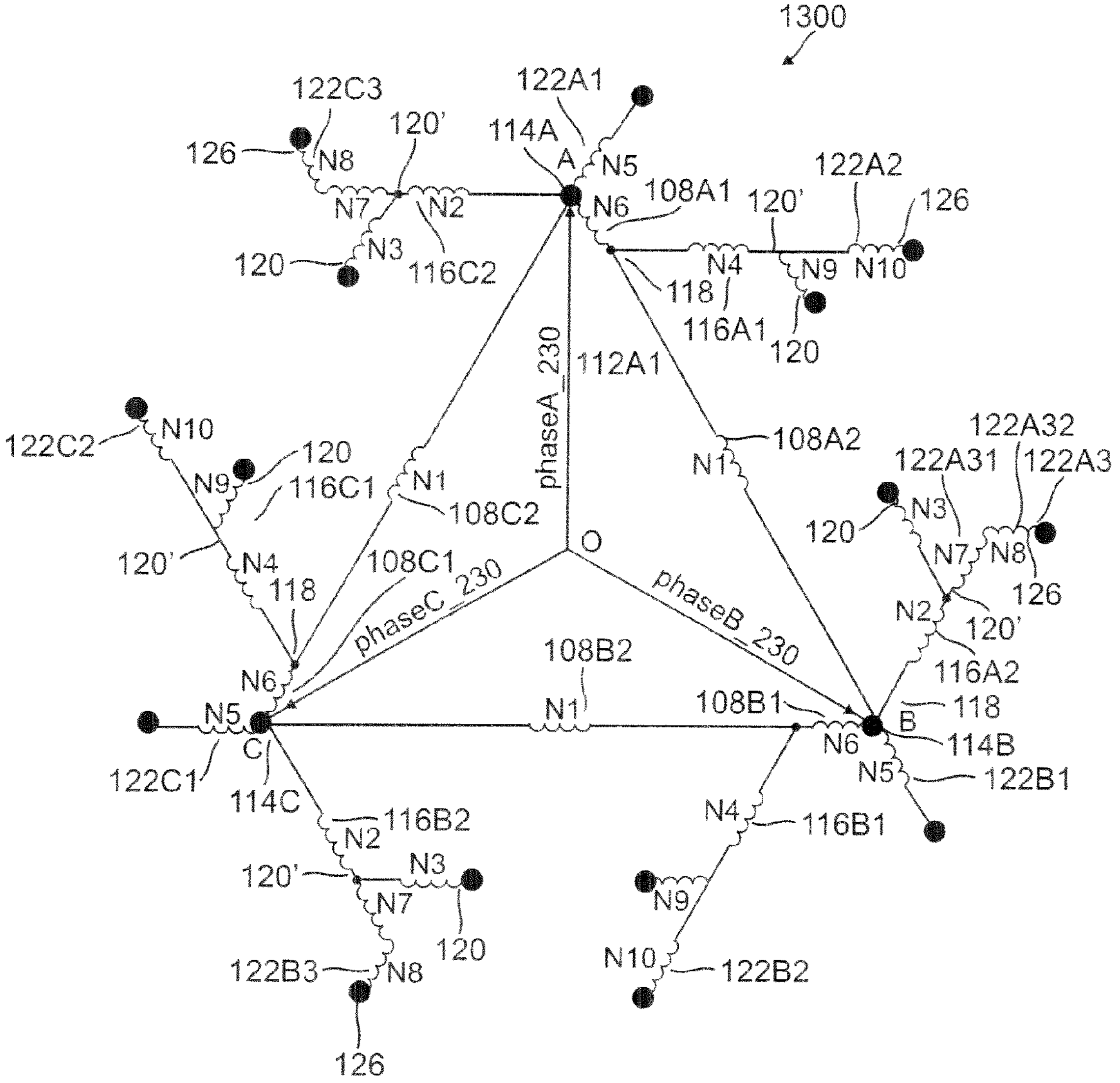
FIG. 13A is a winding diagram for an alternate multi-phase auto-transformer.
Figure 13B:
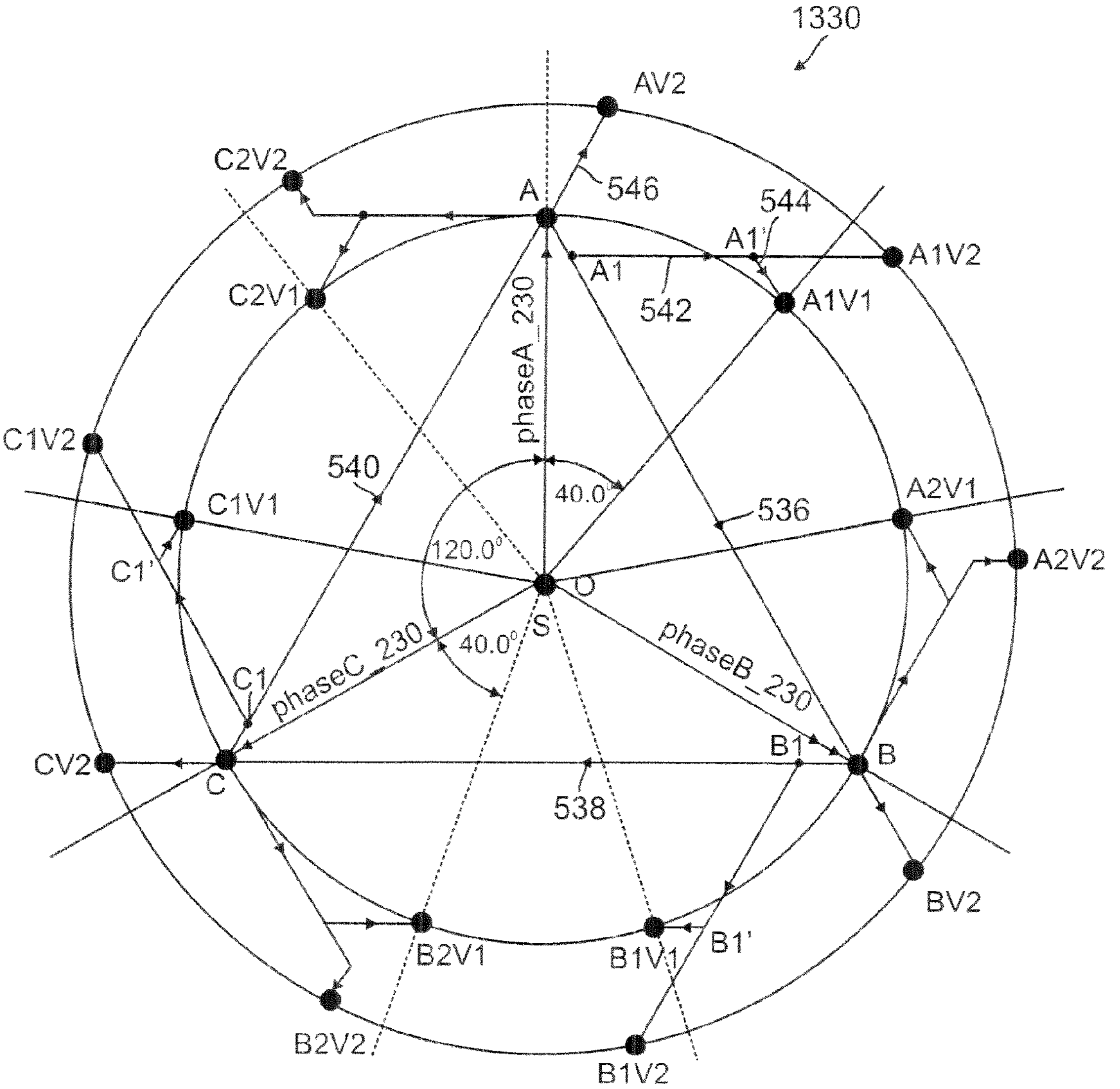
FIG. 13B is a phasor diagram for the multi-phase auto-transformer or FIG. 13A.

Another embodiment of a multi-phase transformer is described with reference to FIGS. 13A and 13B. Transformer 1300 is another exemplary nine phase or eighteen pulse multi-phase transformer. The multi-phase transformer 1300 described with reference to FIGS. 13A and 13B is similar to the multi-phase transformer 1200 described with reference to FIGS. 12A and 12B in that multi-phase transformer 1300 has a primary group of windings 102, secondary group of windings 104 and third group of windings 106. In addition, all of the secondary windings of the second group of windings include at least two sub-windings connected in series. Also, some of the third windings are coupled to a sub-junction of the secondary windings. One of the differences is that some of the third windings include a plurality of sub-windings connected in series.

Referring to FIG. 13A, in this specific embodiment, each of the primary windings 108A-108C include a plurality of sub primary windings 108A1-108A2, 108B1-108B2, 108C1-108C2 that are coupled in series. For example, for the primary winding 108A, the junction of sub primary windings 108A1 and 108A2 coupled in series define an interior junction 112A1 and the junction of sub primary windings 108B1 and 108B2 coupled in series define an interior junction 112B1. Each ends of the primary windings 108A-108C are coupled to the ends of the other primary winding 108A-108C to form a delta configuration with exterior junctions 114A-114C. Each of the primary windings 108A-108C are configured to receive one phase of a multi-phase input voltage at the exterior junction 114A-114C.

The second group of windings 104 includes a plurality of secondary windings 116A1-116A2, 116B1-116B2 and 116C1-116C2. Each secondary winding 116A1-116C2 has a first end 118 and a second end 120. Each secondary winding includes at least a first sub-winding and a second sub-winding connected in series at a sub-junction.

For example, the secondary winding 116A1 includes a first sub-winding 116A11 and a second sub-winding 116A12 and coupled in series at one end to define a sub-junction 120'. The other end of first sub-winding 116A11 corresponds to the first end 118 of secondary winding 116A1. The other end of second sub-winding 116A12 corresponds to the second end 120 of secondary winding 116A1.

Each secondary winding 116A1-116C2 may be magnetically coupled to one of the primary windings 108A-108C. In one embodiment, each of the sub-winding for example, first sub-winding and second sub-winding may be magnetically coupled to different primary windings. The first end 118 of each secondary winding 116A1-116C2 may be coupled to one of the primary windings 108A-108C. For example, the first end 118 of secondary winding 116A1 may be coupled to interior junction 112A1 of primary winding 108A. The first end 118 of secondary winding 116A2 may be coupled to exterior junction 114B.

The third group of windings 106 includes a plurality of third windings. For example, plurality of third windings 122A1-122A3, 122B1-122B3 and 122C1-122C3. Each third winding 122A1-122C4 has a first end 124 and a second end 126. Each third winding 122A1-122C4 may be magnetically coupled to one of the primary windings 108A-108C.

In one embodiment, some of the third windings include at least two sub-windings connected in series. For example, third windings 122A3, 122B3 and 122C3 have at least two sub-windings. For example, third winding 122A3 has a first sub-winding 122A31 and a second sub-winding 122A32 connected in series at one end. The other end of first sub-winding 122A31 corresponds to the first end 124 of third winding 122A3. The other end of second sub-winding 122A32 corresponds to the second end 126 of third winding 122A3.

In one embodiment, the first end 124 of some of the third windings 122A1-122C3 are coupled to a primary winding 108A-108C. For example, some of the first end 124 of the third windings 122A1-122C3 are coupled to one of the exterior junctions 114A-114C. For example, the first end 124 of the third windings 122A1, 122B1 and 122C1 are coupled to exterior junction 114A-114C respectively.

In one embodiment, the first end 124 of some of the third windings 122A1-122C3 are coupled to the sub-junction 120' of the secondary windings 116A1-116C2. For example, the first end 124 of the third windings 122A3, 122B3 and 122C3 are coupled to sub-junction 120' of secondary winding 116A2, 116B2 and 116C2 respectively.

In one embodiment, the phase angle difference of the output voltage Vout2 at two adjacent second ends of third windings are substantially same. For example, the phase angle difference of the output voltage Vout2 at second end 126 of two adjacent third windings 122A1-122A2 are substantially same. Similarly the phase angle difference of the output voltage Vout2 at second end 126 of two adjacent third windings, for example, 122A3-122B1 are substantially same.

In one embodiment, the output voltage Vout2 at the second end of the third windings are substantially equal. For example, the output voltage Vout2 at the second end 126 of the third windings 122A1-122A3 122B1-122B3 and 122C1-122C3 are substantially same, In one embodiment, the output voltage Vout1 at the second end of secondary windings and at the exterior junction of the primary windings are the same. For example, the output voltage Vout1 at the second end 120 of secondary windings 116A1-116A2, 116B1-116B2 and 116C1-116C2 and at the exterior junction 114A-114C of the primary windings 108A-108C are substantially equal.

In one embodiment, the output voltage Vout2 may be greater than output voltage Vout1.

FIG. 13A also shows exemplary number of turns for various windings and sub-windings, with some of the windings or sub-winding having substantially same number of turns. For example, the number of turns N1-N10 are shown. For example, sub-primary windings 108A1, 108B1 and 108C1 each have substantially same number of turns, for example, N6. Similarly, sub-winding 116A11 of secondary winding 116A1 and sub-winding 116B11 of secondary winding 116B1 each have substantially same number of turns, for example, N4. Similarly, third winding 122A1 and third winding 122B1 each have substantially same number of turns, for example, N5.

Now referring to FIG. 13B, an exemplary phasor diagram 1330 for the multi-phase transformer 1300 of FIG. 13A is disclosed.

The phasor diagram 1330 includes a first circle 1332 and a second circle 1334, both having a common center S. The points A, B and C represent the exterior junction 114A-114C of the primary windings. The sides AB, BC and CA of triangle ABC represent the primary windings 108A-108C respectively. Points A1, B1 and C1 correspond to the interior junctions 112A1, 112B1 and 112C1 respectively of the primary windings 108A-108C.

Lines A-A1 and A1-B represent sub-primary windings 108A1-108A2 respectively. Similarly, Lines B-B1, B1-C represent sub-primary windings 108B1-108B2 respectively. Similarly, lines C-C1 and C1-A represent sub-primary windings 108C1-108C2 respectively.

Points A1V1-A2V1, B1V1-B2V1 and C1V1-C2V1 represent the second end 120 of the secondary windings 116A1-116A2, 116B1-166B2 and 116C1-116C2 respectively. Similarly points AV2, A1V2 and A2V2; BV2, B1V2 and B2V2; and CV2, C1V2 and C2V2 represent the second end 126 of the third windings 122A1-122A3, 122B1-122B3 and 122C1-122C3 respectively.

As previously discussed, all of the secondary windings include at least two sub-windings connected in series, for example, secondary winding 116A1. For example, the lines A1-A1', B1-B1' and C1-C1' represent the first sub-windings 116A11, 116B11 and 116C11 of secondary windings 116A1, 116B1 and 116C1 respectively. Similarly, the line A1'-A1V1, B1'-B1V1 and C1'-C1V1 represent the second sub-windings 116A12, 116B12 and 116C12 of secondary windings 116A1, 116B1 and 116C1.

The third windings are also represented in the phasor diagram. For example, the lines A-AV2, B-BV2 and C-CV2 represent the third windings 122A1, 122B1 and 122C1 respectively. Similarly, the line A1'-A1V2, B1'-B1V2 and C1'-C1V2 represent the third windings 122A2, 122B2 and 122C2 respectively.

As previously discussed, the length of lines in a phasor diagram represent the number of turns for the windings. For example, the length of line A-A1 represent number of turns N6 for sub-primary winding 108A1. Similarly, the length of line A1-A1' represent number of turns N4 for sub-winding 116A11 of secondary winding 116A1. And, the length of line A-AV2 represent the number of turns N5 for third winding 122A1.

The lines SA, SB and SC represent the input AC voltage Vin applied to the exterior junctions A, B and C of the primary windings 108A-108C. As it is evident from the phasor diagram, a three phase input voltage Vin depicted as phaseA_230, phaseB_230 and phaseC_230 is applied, with each phase separated by about 120 degrees.

As previously described, the lines in a phasor diagrams are vector lines depicting the vector of the induced voltage. For example, the vector of induced voltage in primary windings AB, BC and CA are depicted by the arrows 536, 538 and 540. Similarly, the arrows on lines representing the secondary windings and the third windings represent the vector of induced voltage. For example, arrows 542 and 544 represent the vector of induced voltage in the sub-winding 116A11 and 116A21 of secondary winding 116A1 and 116A2 respectively. The arrow 546 represents the vector of inducted voltage in the third winding 122A1.

In one embodiment, the vector of induced voltage in the secondary windings and the sub-windings of the secondary windings are such that they are either in phase or 180 degrees out of phase with the vector of induced voltage in a primary winding to which they are magnetically coupled. In one embodiment, the vector of induced voltage in the secondary windings are such that the phase angle difference of the output voltage at two adjacent second ends of the secondary windings are substantially same. In one embodiment, the first sub-winding and second sub-winding of a secondary winding may be magnetically coupled to two different primary windings.

In one embodiment, the vector of induced voltage in the third windings and the sub-windings are such that they are either in phase or 180 degrees out of phase with the vector of induced voltage in a primary winding to which they are magnetically coupled. In one embodiment, the first sub-winding and second sub-winding of a third winding may be magnetically coupled to two different primary windings, In one embodiment, the vector of induced voltage in the third windings are such that the phase angle difference of the output voltage at two adjacent second ends of the third windings are substantially same.

The phasor diagram 1330 shows an exemplary vector of induced voltage in the primary windings, secondary windings and the third windings.

Figure 14A:
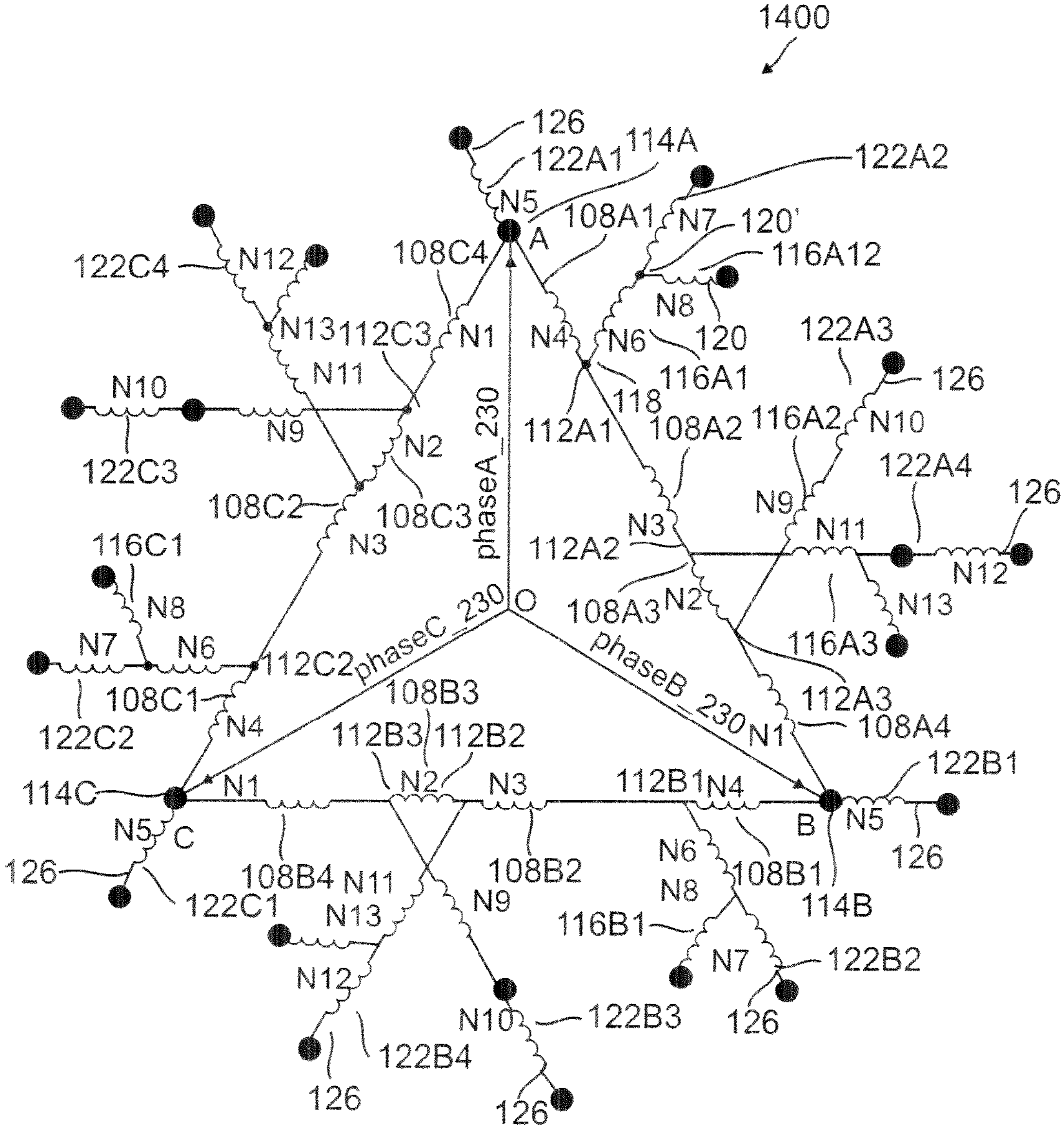
FIG. 14A is a winding diagram for an alternate multi-phase auto-transformer.
Figure 14B:
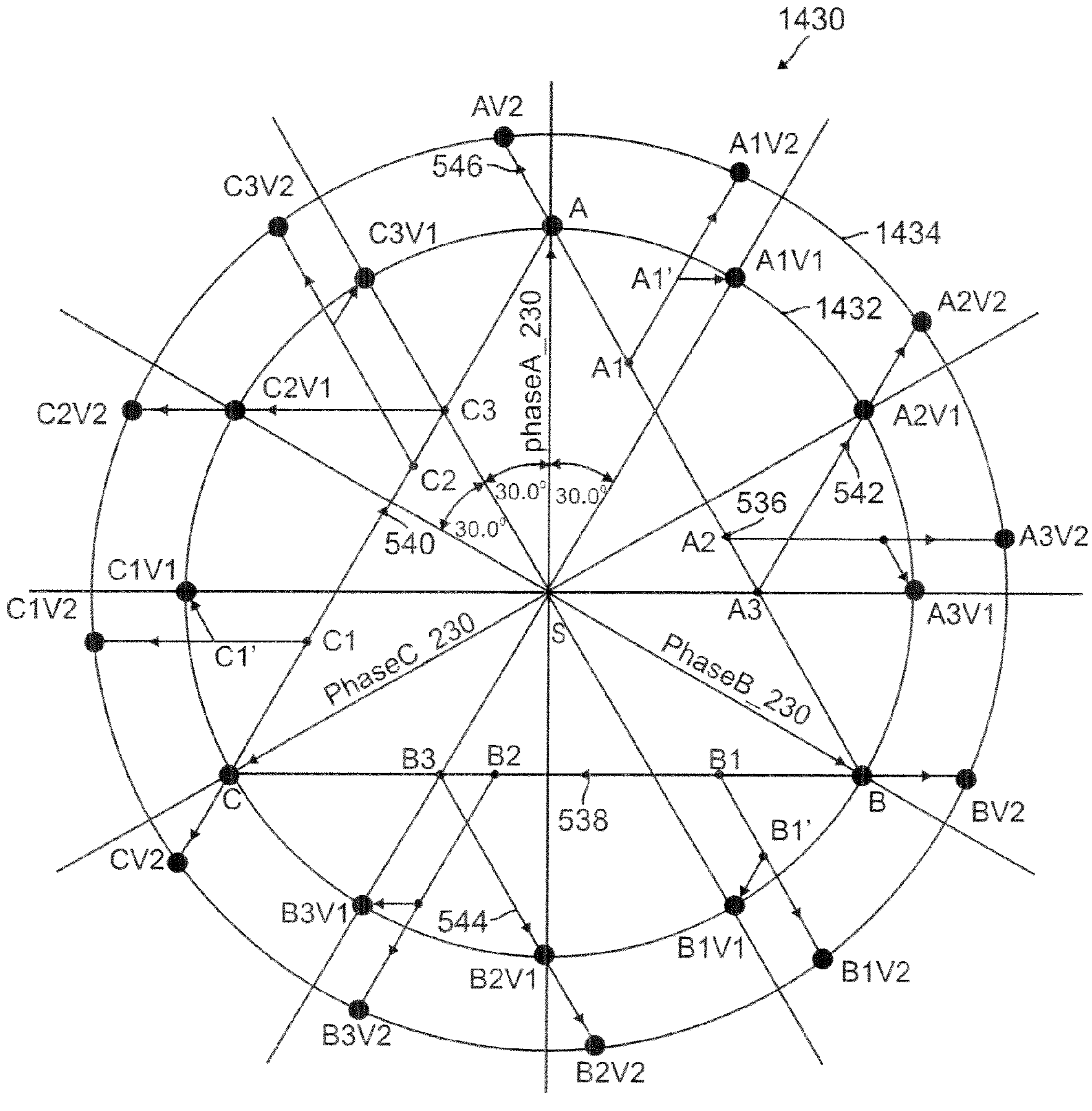
FIG. 14B is a phasor diagram for the multi-phase auto-transformer of FIG. 14A.

Another embodiment of a multi-phase transformer is described with reference to FIGS. 14A and 14B. Transformer 1400 is another exemplary twelve phase or twenty four pulse multi-phase transformer. The multi-phase transformer 1400 described with reference to FIGS. 14A and 14B is similar to the multi-phase transformer 1300 described with reference to FIGS. 13A and 13B in that multi-phase transformer 1400 has a primary group of windings 102, secondary group of windings 104 and third group of windings 106. In this embodiment, some of the secondary windings of the second group of windings include at least two sub-windings connected in series. Also, some of the third windings are coupled a sub-junction of the secondary windings.

Referring to FIG. 14A, in this specific embodiment, each of the primary windings 108A-108C include a plurality of sub primary windings 108A1-108A4, 108B1-108B4, 108C1-108C4 that are coupled in series. For example, for the primary winding 108A, the junction of sub primary windings 108A1 and 108A2 coupled in series define an interior junction 112A1 and the junction of sub primary windings 108B1 and 108B2 coupled in series define an interior junction 112B1. Each ends of the primary windings 108A-108C are coupled to the ends of the other primary winding 108A-108C to form a delta configuration with exterior junctions 114A-114C. Each of the primary windings 108A-108C are configured to receive one phase of a multiple-phase input voltage at the exterior junction 114A-114C.

The second group of windings 104 includes a plurality of secondary windings 116A1-116A2, 116B1-116B2 and 116C1-116C2. Each secondary winding 116A1-116C2 has a first end 118 and a second end 120. Some of the secondary windings includes at least a first sub-winding and a second sub-winding connected in series at a sub-junction.

For example, the secondary winding 116A1 includes a first sub-winding 116A11 and a second sub-winding 116A12 and coupled in series at one end to define a sub-junction 120'. The other end of first sub-winding 116A11 corresponds to the first end 118 of secondary winding 116A1. The other end of second sub-winding 116A12 corresponds to the second end 120 of secondary winding 116A1.

Each secondary winding 116A1-116C2 may be magnetically coupled to one of the primary windings 108A-108C. In one embodiment, each of the sub-winding for example, first sub-winding and second sub-winding may be magnetically coupled to different primary windings. The first end 118 of each secondary winding 116A1-116C2 may be coupled to one of the primary windings 108A-108C. For example, the first end 118 of secondary winding 116A1 may be coupled to interior junction 112A1 of primary winding 108A. The first end 118 of secondary winding 116A2 may be coupled to exterior junction 114B.

The third group of windings 106 includes a plurality of third windings. For example, plurality of third windings 122A1-122A4, 122B1-122B4 and 122C1-122C4. Each third winding 122A1-122C4 has a first end 124 and a second end 126. Each third winding 122A1-122C4 may be magnetically coupled to one of the primary windings 108A-108C.

In one embodiment, the first end 24 of some of the third windings 122A1-122C3 are coupled to a primary winding 108A-108C. For example, some of the first end 124 of the third windings 122A1-122C3 are coupled to one of the exterior junctions 114A-114C. For example, the first end 124 of the third windings 122A1, 122B1 and 122C1 are coupled to exterior junction 114A-114C respectively.

In one embodiment, the first end 124 of some of the third windings 122A1-122C4 are coupled to the sub-junction 120' of the secondary windings 116A1-116C3. For example, the first end 124 of the third windings 122A2, 122B2 and 122C2 are coupled to sub-junction 120' of secondary winding 116A1, 116B1 and 116C1 respectively.

In one embodiment, the phase angle difference of the output voltage Vout2 at two adjacent second ends of third windings are substantially same. For example, the phase angle difference of the output voltage Vout2 at second end 126 of two adjacent third windings 122A1-122A2 are substantially same. Similarly the phase angle difference of the output voltage Vout2 at second end 126 of two adjacent third windings, for example 122A4-122B1 are substantially same.

In one embodiment, the output voltage Vout2 at the second end of the third windings are substantially equal. For example, the output voltage Vout2 at the second end 126 of the third windings 122A1-122A4, 122B1-122B4 and 122C1-122C4 are substantially same.

In one embodiment, the output voltage Vout1 at the second end of secondary windings and at the exterior junction of the primary windings are the same. For example, the output voltage out at the second end 120 of secondary windings 116A1-116A3, 116B1-116B3 and 116C1-116C3 and at the exterior junction 114A-114C of the primary windings 108A-108C are substantially equal.

In one embodiment, the output voltage Vout2 may be greater than output voltage Vout1.

FIG. 14A also shows exemplary number of turns for various windings and sub-windings, with some of the windings or sub-windings having substantially same number of turns. For example, the number of turns N1-N13 are shown. For example, sub-primary windings 108A1, 108B1 and 108C1 each have substantially same number of turns, for example, N4. Similarly, sub-winding 116A11 of secondary winding 116A1 and sub-winding 116B11 of secondary winding 116B1 each have substantially same number of turns, for example, N6. Similarly, third winding 122A1 and third winding 122B1 each have substantially same number of turns, for example, N5.

Now referring to FIG. 14B, an exemplary phasor diagram 1430 for the multi-phase transformer 1400 of FIG. 14A is disclosed.

The phasor diagram 1430 includes a first circle 1432 and a second circle 1434, both having a common center S. The points A, B and C represent the exterior junction 114A-114C of the primary windings. The sides AB, BC and CA of triangle ABC represent the primary windings 108A-108C respectively. Points A1, B1 and C1 correspond to the interior junctions 112A1, 112B1 and 112C1 respectively of the primary windings 108A-108C.

Lines A-A1, A1-A2, A2-A3 and A3-B represent sub-primary windings 108A1-108A4 respectively. Similarly, Lines B-B1, B1-B2, B2-B3 and B3-C represent sub-primary windings 108B1-108B4 respectively. Similarly, lines C-C1, C1-C2, C2-C3 and C3-A represent sub-primary windings 108C1-108C4 respectively.

Points A1V1-A3V1, B1V1-B3V1 and C1V1-C3V1 represent the second end 120 of the secondary windings 116A1-116A3, 116B1-116B3 and 116C1-116C3 respectively. Similarly points AV2, A1V2, A2V2 and A3V2; BV2, B1V2, B2V2 and B3V2; and CV2, C1V2, C2V2 and C3V2 represent the second end 126 of the third windings 122A1-122A4, 122B1-122B4 and 122C1-122C4 respectively.

As previously discussed, some of the secondary windings include at least two sub-windings connected in series, for example, secondary winding 116A1. For example, the lines A1-A1', B1-B1' and C1-C1' represent the first sub-windings 116A11, 116B11 and 116C11 of secondary windings 116A1, 116B1 and 116C1 respectively. Similarly, the line A1'-A1V1, B1'-B1V1 and C1'-C1V1 represent the second sub-windings 116A12, 116B12 and 116C12 of secondary windings 116A1, 116B1 and 116C1.

The third windings are also represented in the phasor diagram. For example, the lines A-AV2, B-BV2 and C-CV2 represent the third windings 122A1, 122B1 and 122C1 respectively. Similarly, the line A1'-A1V2, B1'-B1V2 and C1'-C1V2 represent the third windings 122A2, 122B2 and 122C2 respectively.

As previously discussed, the length of lines in a phasor diagram represent the number of turns for the windings. For example, the length of line A-A1 represent number of turns N4 for sub-primary winding 108A1. Similarly, the length of line A1-A1' represent number of turns N6 for sub-winding 116A11 of secondary winding 116A1. And, the length of line A-AV2 represent the number of turns N5 for third winding 122A1.

The lines SA, SB and SC represent the input AC voltage Vin applied to the exterior junctions A, B and C of the primary windings 108A-108C. As it is evident from the phasor diagram, a three phase input voltage Vin depicted as phaseA_230, phaseB_230 and phaseC_230 is applied, with each phase separated by about 120 degrees.

As previously described, the lines in a phasor diagrams are vector lines depicting the vector of the induced voltage. For example, the vector of induced voltage in primary windings AB, BC and CA are depicted by the arrows 536, 538 and 540. Similarly, the arrows on lines representing the secondary windings and the third windings represent the vector of induced voltage. For example, arrows 542 and 544 represent the vector of induced voltage in the secondary winding 116A2 and 116B2 respectively. The arrow 546 represents the vector of inducted voltage in the third winding 122A1.

In one embodiment, the vector of induced voltage in the secondary windings and the sub-windings of the secondary windings are such that they are either in phase or 180 degrees out of phase with the vector of induced voltage in a primary winding to which they are magnetically coupled. In one embodiment, the vector of induced voltage in the secondary windings are such that the phase angle difference of the output voltage at two adjacent second ends of the secondary windings are substantially same. In one embodiment, the first sub-winding and second sub-winding of a secondary winding may be magnetically coupled to two different primary windings.

In one embodiment, the vector of induced voltage in the third windings and the sub-windings are such that they are either in phase or 180 degrees out of phase with the vector of induced voltage in a primary winding to which they are magnetically coupled. In one embodiment, the first sub-winding and second sub-winding of a third winding may be magnetically coupled to two different primary windings. In one embodiment, the vector of induced voltage in the third windings are such that the phase angle difference of the output voltage at two adjacent second ends of the third windings are substantially same.

The phasor diagram 1430 shows an exemplary vector of induced voltage in the primary windings, secondary windings and the third windings.

Various additional embodiments will now be described with reference to FIGS. 15A, 15B, 16A, 16B 17A, 17B, 18A, 18B, 19A and 19B. FIGS. 15A, 16A, 17A, 18A and 19A show exemplary winding diagrams of multi-phase transformers similar to the winding diagrams described previously. FIGS. 15B, 16B, 17B, 18B and 19B show exemplary phasor diagrams for multi-phase transformers described with reference to FIGS. 15A, 16A, 17A, 18A and 19A respectively.

In all of the embodiments of multi-phase transformer described with reference to FIGS. 15A-19B, at least one of the secondary windings includes a plurality of sub-windings and further, ends of more than one sub-winding define a second end. For example, secondary winding 116A2 includes more than one second end 120.

Multi-phase transformers with reference to FIGS. 15A-19B will now be described. The description will be focused on secondary winding 116A2 with reference to primary winding 108A and associated third windings. In one embodiment, secondary windings 116B2 and 116C2 are similar to secondary winding 116A2. Other details of the multi-phase transformer will be apparent one skilled in the art by referring to FIGS. 15A-19B, based upon various other embodiments of multi-phase transformers described in detail in this disclosure.

Referring to FIGS. 15A, 16A and 15B and 16B, multi-phase transformer 1500 and 1600 will now be described. Transformers 1500 and 1600 are another exemplary fifteen phase or thirty pulse multi-phase transformers. The multi-phase transformers 1500 and 1600 are substantially similar in the structure and differ in the magnetic coupling of some secondary windings, which will be highlighted while describing the phasor diagrams with reference to FIGS. 15B and 16B.

Figure 15A:
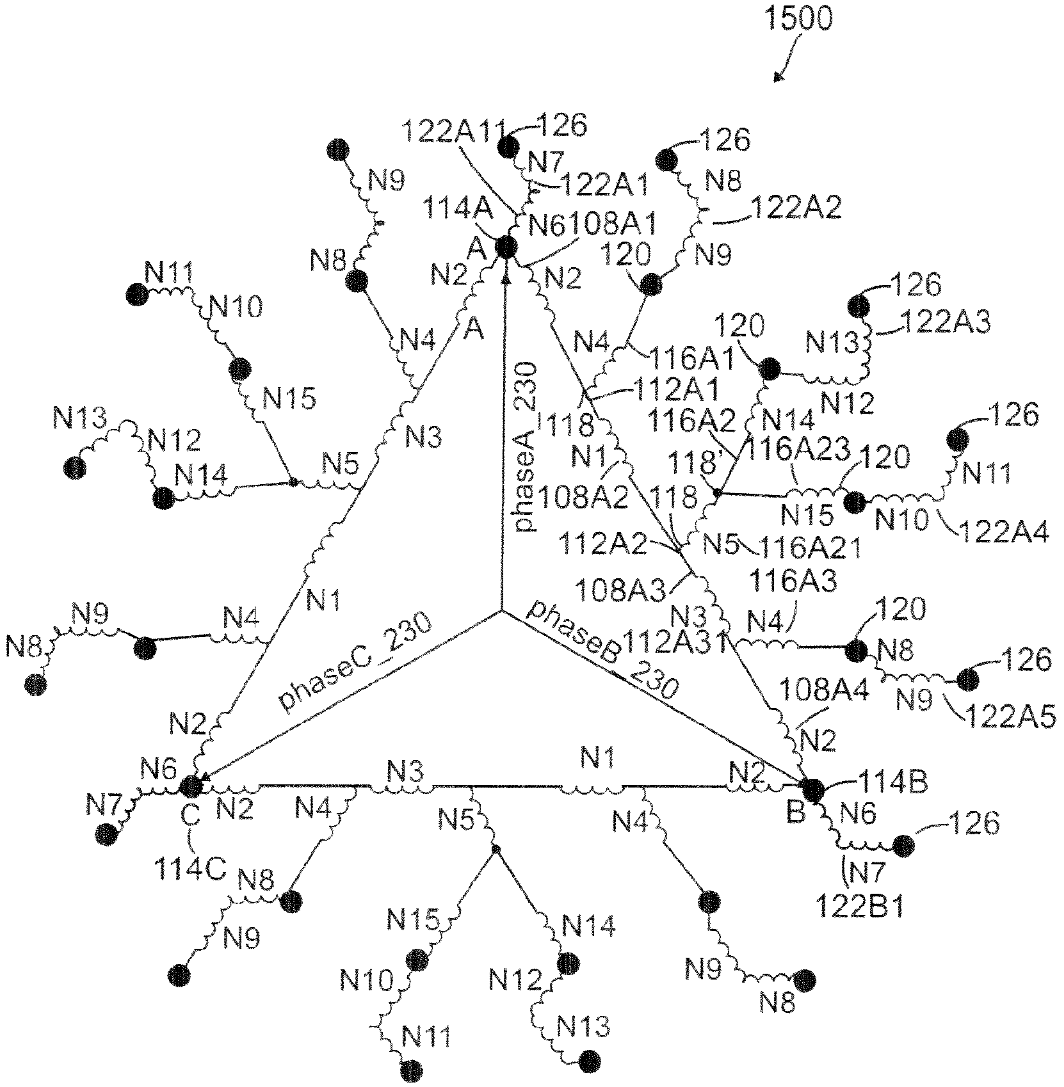
FIG. 15A is a winding diagram for an alternate multi-phase auto-transformer.
Figure 16A:
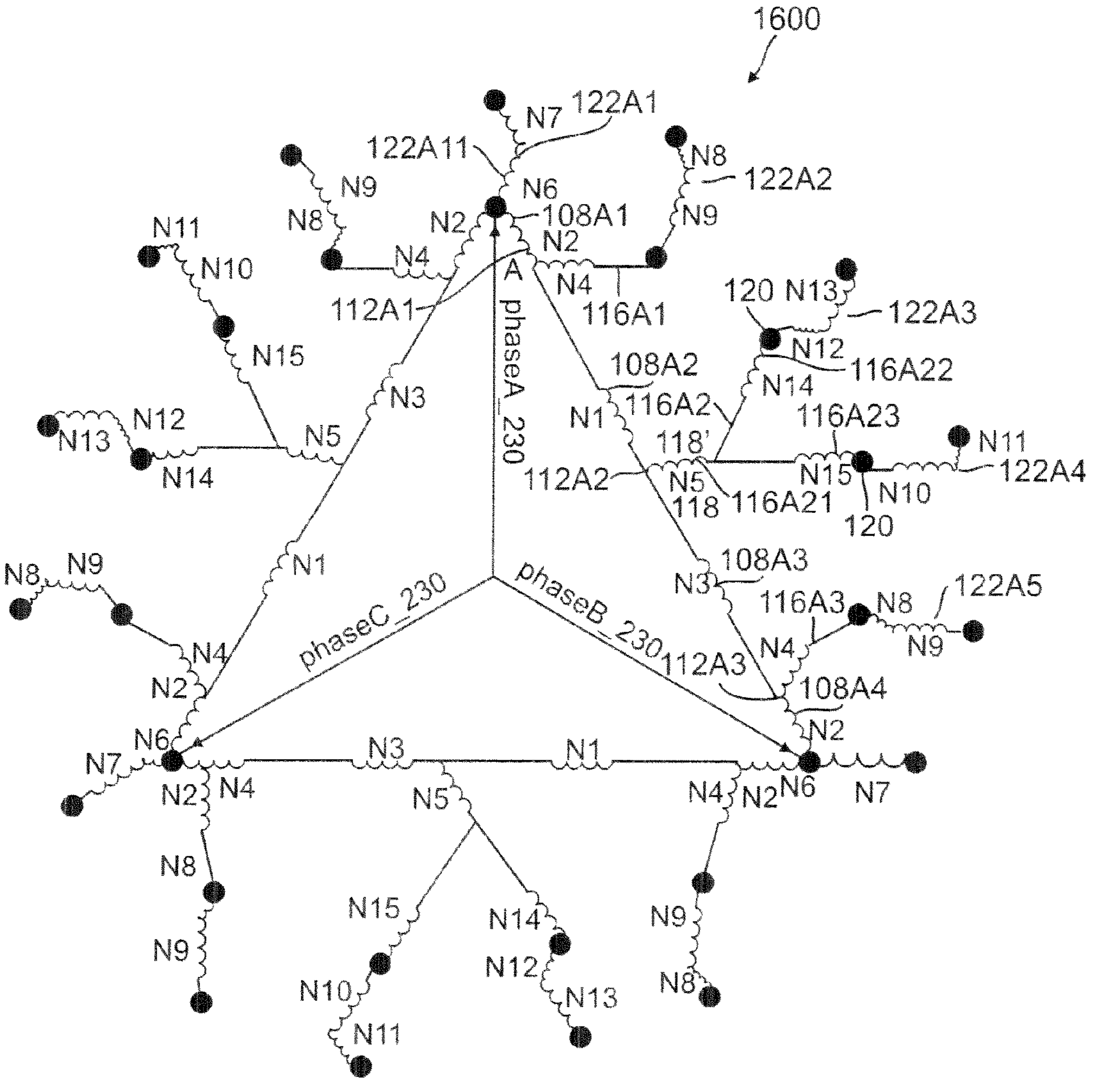
FIG. 16A is a winding diagram for an alternate multi-phase auto-transformer.

Referrings to FIG. 15A and 16A, in this specific embodiment, each of the primary windings 108A-108C include a plurality of sub primary windings. For example, primary winding 108A includes sub primary windings 108A1-108A4 that are coupled in series. The sub primary windings are coupled at interior junctions 112A1-112A3. Each ends of the primary windings 108A-108C are coupled to the ends of the other primary winding 108A-108C to form a delta configuration with exterior junctions 114A-114C. Each of the primary windings 108A-108C are configured to receive one phase of multi-phase input voltage at the exterior junction 114A-114C.

The second group of windings 104 includes a plurality of secondary windings. For example, secondary windings 116A1-116A3. Each secondary winding 116A1-116C2 has a first end 118 and at least a second end 120. Some of the secondary windings include a plurality of sub-windings connected in series at a sub-junction. For example, secondary winding 116A2.

For example, the secondary winding 116A2 includes a first sub-winding 116A21 and a plurality of second sub-windings 116A22 and 116A23. One end of the first sub-winding 116A21, second sub-winding 116A22 and second sub-winding 116A23 are coupled together to define a sub-junction 118'. The other end of first sub-winding 116A21 correspond to the first end 118 of secondary winding 116A2. The other end of second sub-windings 116A22 and 166A23 corresponds to two second end 120 of secondary winding 116A2.

Each secondary winding 116A1-116C2 may be magnetically coupled to on of the primary windings 108A-108C. In one embodiment, each of the sub-windings for example, first sub-windings and second sub-windings may be magnetically coupled to different primary windings. The first end 118 of each secondary winding 116A1-116C2 may be coupled to one of the primary windings 108A-108C. For example, the first end 118 of secondary winding 116A2 may be coupled to interior junction 112A2 of primary winding 108A.

The third group of windings 106 includes a plurality of third windings. For example, plurality of third windings 122A1-122A5. Each third winding, for example 122A1-122A5 has a first end 124 and a second end 126. Each third winding 122A1-122A5 may be magnetically coupled to one of the primary windings 108A-108C.

In one embodiment, the first end 124 of some of the third windings, for example, 122A1-122A4 may be coupled to a primary winding, for example, primary winding 108A. For example, some of the first end 124 are coupled to one of the exterior junctions 114A-114C. For example, the first end 124 of the third winding 122A1 may be coupled to exterior junction 114A.

In one embodiment, the first end 124 of some of the third windings, for example, third windings 122A2-122A5 are coupled to the second ends of the secondary windings, for example, secondary windings 116A1-116A3.

In one embodiment, the phase angle difference of the output voltage Vout2 at two adjacent second ends of third windings are substantially same. For example, the phase angle difference of the output voltage Vout2 at second end 126 of two adjacent third windings 122A1-122A2 are substantially same.

In one embodiment, the output voltage Vout2 at the second end of the third windings are substantially equal. For example, the output voltage Vout2 at the second end 126 of the third windings 122A1-122A4 are substantially same.

In one embodiment, the output voltage Vout1 at the second end of secondary windings and at the exterior junction of the primary windings are the same. For example, the output voltage Vout1 at the second end 120 of secondary windings 116A1-116A3 and at the exterior junction 114A-114C of the primary windings 108A-108C are substantially equal.

In one embodiment, the output voltage Vout2 may be greater than output voltage Vout1.

Figure 15B:
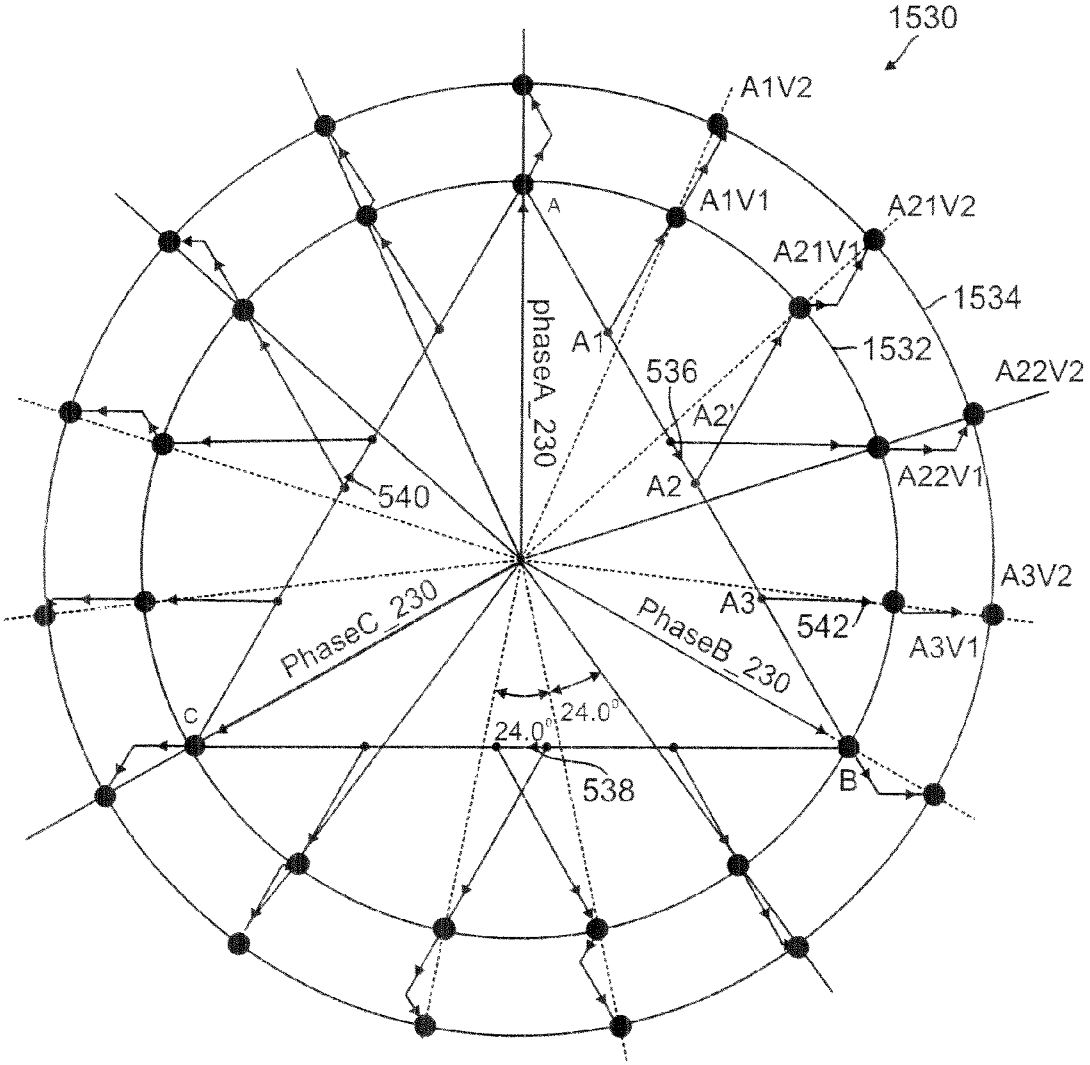
FIG. 15B is a phasor diagram for the multi-phase auto-transformer of FIG. 15A.

FIG. 15A and 15B also shows exemplary number of turns for various windings and sub-windings, with some of the windings or sub-windings having substantially same number of turns. For example, the number of turns N1-N14 are shown in FIG. 15A and the number of turns N1-N14 are shown in FIG. 16A. For example, sub-primary windings 108A1, 108B1 and 108C1 each have substantially same number of turns, for example, N2 and N2 respectively.

Figure 16B:
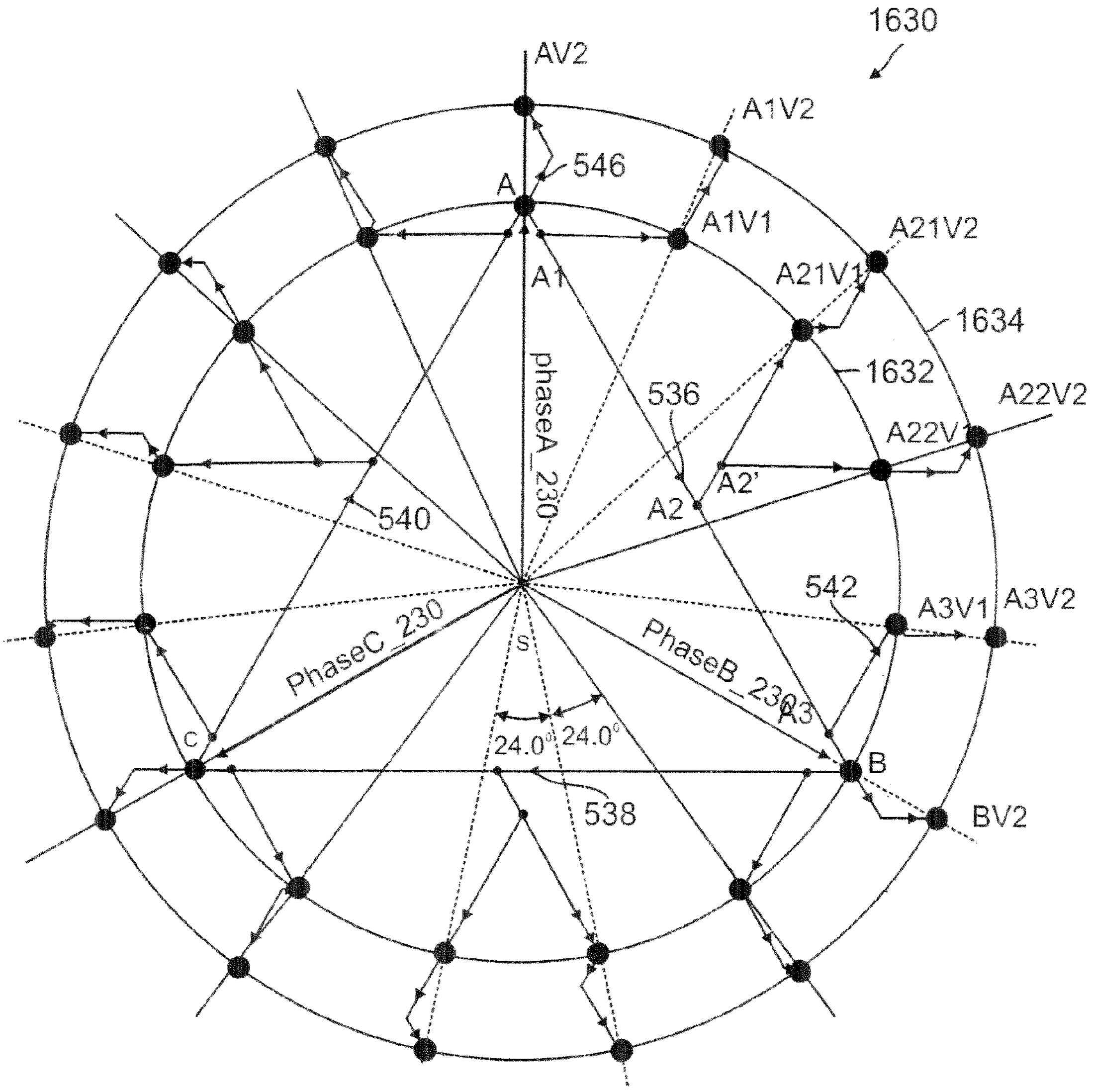
FIG. 16B is a phasor diagram for the multi-phase auto-transformer of FIG. 16A.

Now referring to FIGS. 15B and 16B, exemplary phasor diagram 1530 and 1630 for the multi-phase transformer 1500 of FIG. 15A and exemplary phasor diagram 1630 for the multi-phase transformer 1600 of FIG. 16A is disclosed.

The phasor diagrams 1530 and 1630 include a first circle 1532 and 1632, and second circle 1534 and 1634, both circles having a common center S. The points A, B and C represent the exterior junction 114A-114C of the primary windings. The sides AB, BC and CA of triangle ABC represent the primary windings 108A-108C respectively. Points A1, A2 and A3 correspond to the interior junction 112A1-112A3 respectively of the primary winding 108A.

Lines A-A1, A1-A2, A2-A3 and A3-B represent sub-primary windings 108A1-108A4 respectively.

Points A1V1, A21V1, A22V1 and A3V1 represent the second end 120 of the secondary windings 116A1-116A3 respectively. As previously discussed, secondary winding 116A2 has two second ends, represented by A21V1 and A22V1.

As previously discussed, some of the secondary windings include at least two sub-windings, for example, secondary winding 116A2. For example, the line A2-A2' represents the first sub-winding 116A21. The line A2'-A21V1 represents the second sub-winding 116A22 and the line A2'-A22V1 represents the second sub-winding 116A22.

The third windings are also represented in the phasor diagram. For example, the lines A-A'-AV2 represent the third winding 122A1.

As previously discussed, the length of lines in a phasor diagram represent the number of turns for the windings. For example, the length of line A-A1 represent number of turns N2 for sub-primary winding 108A1 of multi-transformer 1500 of FIG. 15A. Similarly, the length of line A-A1 represent number of turns N2 for sub-primary winding 108A1 of multi-transformer 1600 of FIG. 16A The lines SA, SB and SC represent the input AC voltage Vin applied to the exterior junctions A, B and C of the primary windings 108A-108C. As it is evident from the phasor diagram, a three phase input voltage Vin depicted as phaseA_230, phaseB_230 and phaseC_230 is applied, with each phase separated by about 120 degrees.

As previously described, the lines in a phasor diagrams are vector lines depicting the vector of the induced voltage. For example, the vector of induced voltage in primary windings AB, BC and CA are depicted by the arrows 536, 538 and 540. Similarly, the arrows on lines representing the secondary windings and the third windings represent the vector of induced voltage. For example, arrow 542 represent the vector of induced voltage in the secondary winding 116A3. The arrow 546 represents the vector of inducted voltage on the sub-winding 122A11 of third winding 122A1.

In one embodiment, the vector of induced voltage in the secondary windings and the sub-windings of the secondary windings are such that they are either in phase or 180 degrees out of phase with the vector of induced voltage in a primary winding to which they are magnetically coupled. In one embodiment, the vector of induced voltage in the secondary windings are such that the phase angle difference of the output voltage at two adjacent second ends of the secondary windings are substantially same. In one embodiment, first sub-windings and second sub-windings of a secondary winding may be magnetically coupled to two different primary windings.

Note that the vector of induced voltage in the secondary winding 116A3 of multi-phase transformer 1500 is different than the vector of induced voltage in the secondary winding 116A3 of multi-phase transformer 1600. For example, the secondary winding 116A3 of multi-phase transformer 1500 may be magnetically coupled to and in-phase with primary winding 108C, as depicted by arrows 540 and 542 in FIG. 15B. On the other hand, the secondary winding 116A3 of multi-phase transformer 1600 may be magnetically coupled to and 180 degrees cut of phase with primary winding 108B, as depicted by arrows 538 and 542 in FIG. 16B.

In one embodiment, the vector of induced voltage in the third windings and the sub-windings are such that they are either in phase or 180 degrees out of phase with the vector of induced voltage in a primary winding to which they are magnetically coupled. In one embodiment, the first sub-winding and second sub-winding of a third winding may be magnetically coupled to two different primary windings. In one embodiment, the vector of induced voltage in the third windings are such that the phase angle difference of the output voltage at two adjacent second ends of the third windings are substantially same.

The phasor diagram 1530 shows an exemplary vector of induced voltage in the primary windings, secondary windings and the third windings of multi-phase transformer 1500. The phasor diagram 1630 shows an exemplary vector of induced voltage in the primary windings, secondary windings and the third windings of multi-phase transformer 1600.

Multi-phase transformer 1700 will be described with reference to FIGS. 17A and 17B. Transformer 1700 is another exemplary fifteen phase or thirty pulse multi-phase transformer. One of the similarities between the multi-phase transformer 1700 and multi-phase transformers 1500 and 1600 described with reference to FIGS. 15A-16B is that the structure of some of the secondary windings, for example, secondary winding 116A2 is similar. One of the differences is that at least one of the thirds windings includes a plurality of sub-windings. Additionally, some of the third windings include more than one second end.

Figure 17A:
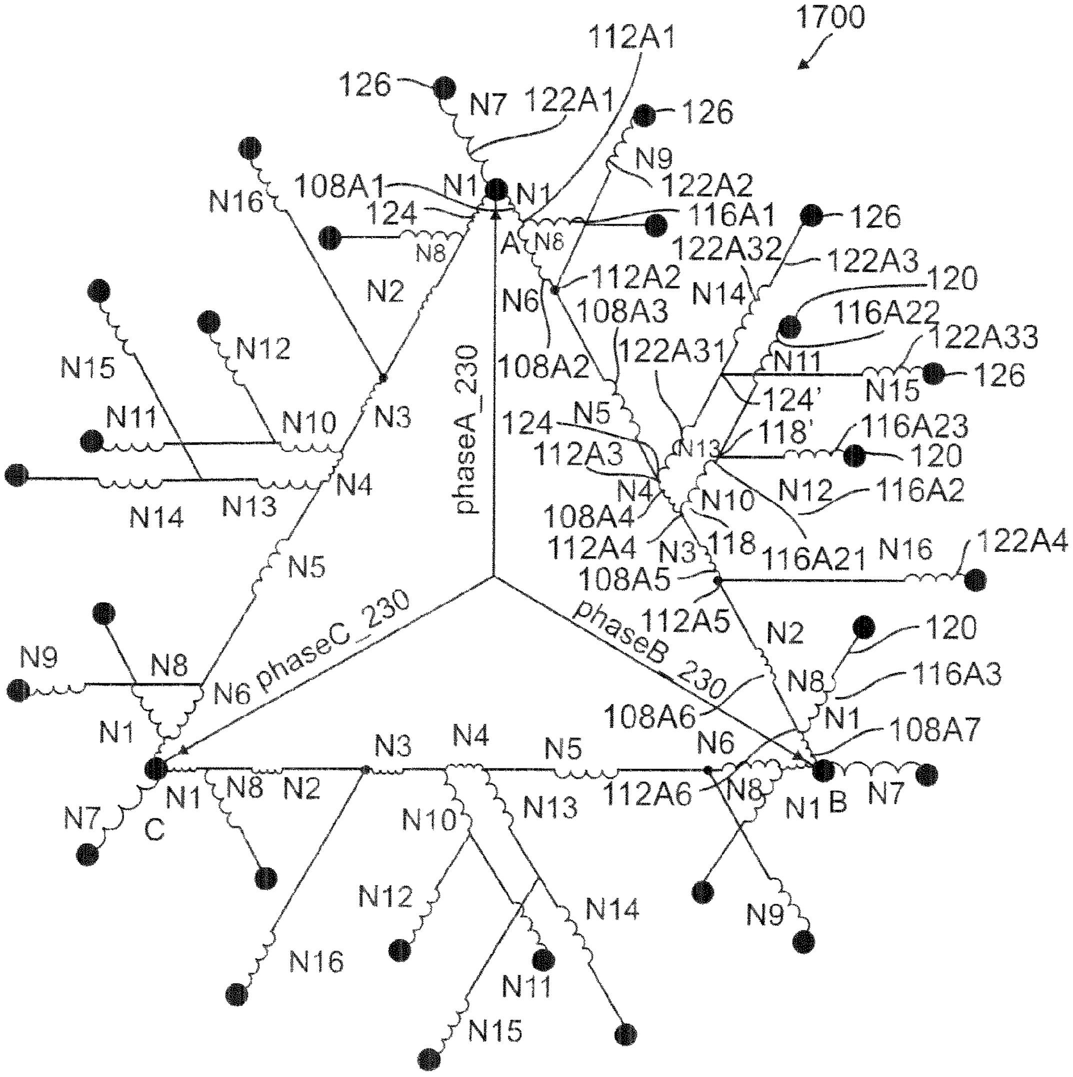
FIG. 17A is a winding diagram for an alternate multi-phase auto-transformer.

Referring to FIG. 17A, in this specific embodiment, each of the primary windings 108A-108C include a plurality of sub primary windings. For example, primary winding 108A includes sub primary windings 108A1-108A7 that are coupled in series. The sub primary windings are coupled at interior junctions 112A1-112A6. Each ends of the primary windings 108A-108C are coupled to the ends of the other primary winding 108A-108C to form a delta configuration with exterior junctions 114A-114C. Each of the primary windings 108A-108C are configured to receive one phase of a multi-phase input voltage at the exterior junction 114A-114C.

The second group of windings 104 includes a plurality of secondary windings. For example, secondary windings 116A1-116A3. Each secondary winding 116A1-116C2 has a first end 118 and at least a second end 120. Some of the secondary windings include a plurality of sub-windings connected in series at a sub-junction. For example, secondary winding 116A2.

For example, the secondary winding 116A2 includes a first sub-winding 116A21 and a plurality of second sub-windings 116A22 and 116A23. One end of the first sub-winding 116A21, second sub-winding 116A22 and second sub-winding 116A23 are coupled together to define a sub-junction 118'. The other end of first sub-winding 116A21 corresponds to the first end 118 of secondary winding 116A2. The other end of second sub-windings 116A22 and 166A23 corresponds to two second end 120 of secondary winding 116A2.

Each secondary winding 116A1-116A3 may be magnetically coupled to one of the primary windings 108A-108C. In one embodiment, each of the sub-windings for example, first sub-windings and second sub-windings may be magnetically coupled to different primary windings. The first end 118 of each secondary winding, for example, secondary winding 116A1-116A3 may be coupled to one of the primary windings, for example, primary winding 108A. For example, the first end 118 of secondary winding 116A2 may be coupled to interior junction 112A4 of primary winding 108A.

The third group of windings 106 includes a plurality of third windings. For example, plurality of third windings 122A1-122A4. Each third winding, for example 122A1-122A4 has a first end 124 and a second end 126. Each third winding 122A1-122A4 may be magnetically coupled to one of the primary windings, for example, primary winding 108A.

In one embodiment, some of the third windings include a plurality of sub-windings connected at a sub-junction. For example, third winding 122A3.

The third winding 122A3 includes a first sub-winding 122A31 and a plurality of second sub-windings 122A32 and 122A33. One end of the first sub-winding 122A31, second sub-winding 122A32 and second sub-winding 122A33 are coupled together to define a sub-junction 124'. The other end of first sub-winding 122A31 corresponds to the first end 124 of third winding 122A3. The other end of second sub-windings 122A32 and 122A33 corresponds to two second end 126 of third winding 122A3.

In one embodiment, the first end 124 of some of the third windings, for example, third windings 122A1-122A4 may be coupled to a primary winding, for example, primary winding 108A. For example, some of the first end 124 are coupled to one of the exterior junctions 114A-114C. For example, the first end 124 of the third winding 122A1 may be coupled to exterior junction 114A. Similarly, the first end 124 of third windings 122A2-122A4 are coupled to interior junction 112A2, 112A3 and 112A5 respectively.

In one embodiment, the phase angle difference of the output voltage Vout2 at two adjacent second ends of third windings are substantially same. For example, the phase angle difference of the output voltage Vout2 at second end 126 of two adjacent third windings 122A1-122A2 are substantially same.

In one embodiment, the output voltage Vout2 at the second end of the third windings are substantially equal. For example, the output voltage Vout2 at the second end 126 of the third windings 122A1-122A4 are substantially same.

In one embodiment, the output voltage Vout1 at the second end of secondary windings and at the exterior junction of the primary windings are the same. For example, the output voltage Vout1 at the second end 120 of secondary windings 116A1-116A3 and at the exterior junction 114A-114C of the primary windings 108A-108C are substantially equal.

In one embodiment, the output voltage Vout2 may be greater than output voltage Vout1.

FIG. 17A also shows exemplary number of turns for various windings and sub-windings, with some of the windings or sub-windings having substantially same number of turns. For example, the number of turns N1-N16 are shown in FIG. 17A. For example, sub-primary windings 108A1, 108B1 and 108C1 each have substantially same number of turns, for example, N6.

Figure 17B:
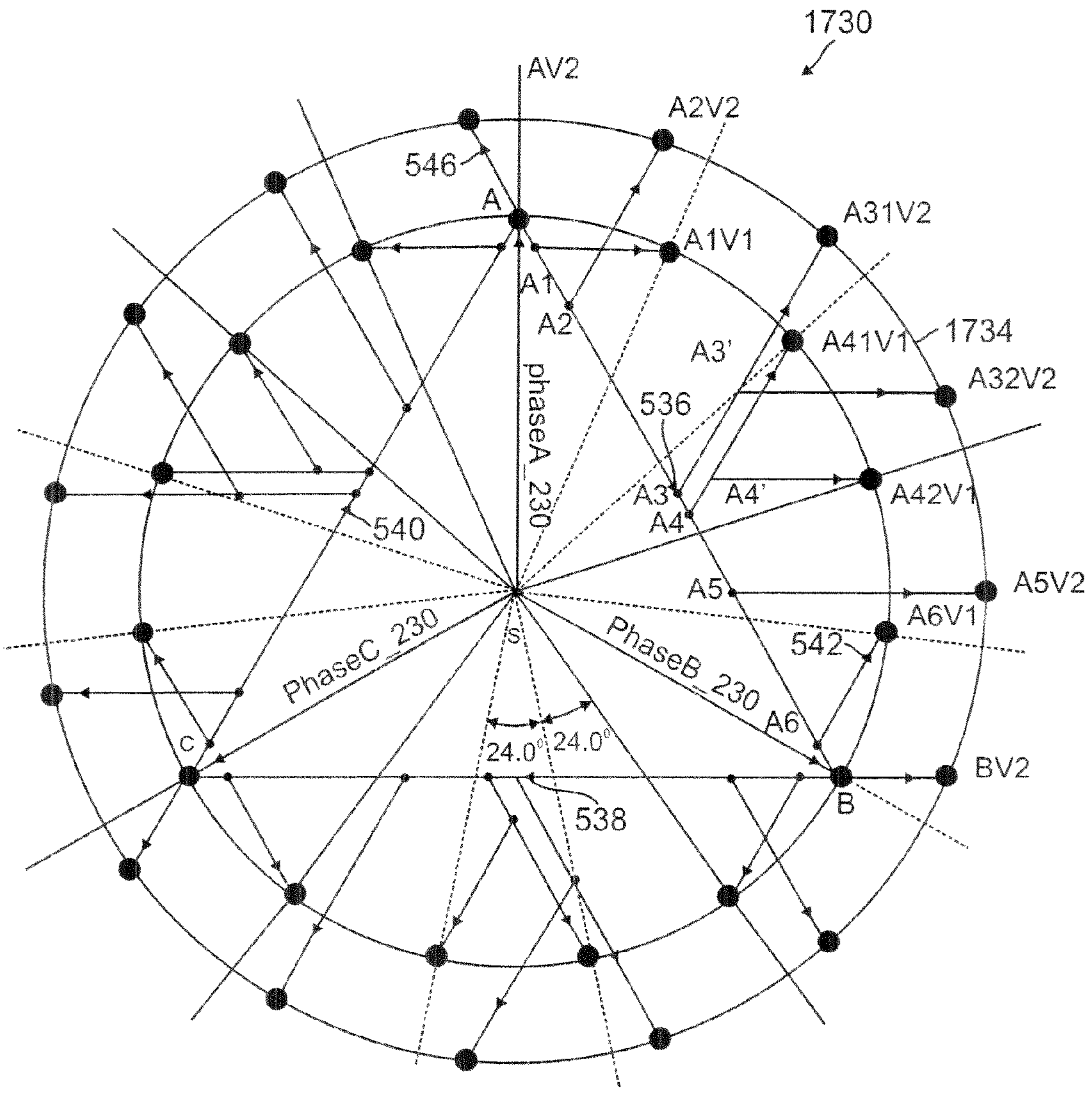
FIG. 17B is a phasor diagram for the multi-phase auto-transformer of FIG. 17A.

Now referring to FIG. 17B, exemplary phasor diagram 1730 for the multi-phase transformer 1700 of FIG. 17A is disclosed.

The phasor diagram 1730 includes a first circle 1732 and second circle 1734, both circles having a common center S. The points A, B and C represent the exterior junction 114A-114C of the primary windings. The sides AB, BC and CA of triangle ABC represent the primary windings 108A-108C respectively. For example, points A1-A6 correspond to the interior junction 112A1-112A6 respectively of the primary winding 108A. Lines A-A1, A1-A2, A2-A3, A3-A4, A4-A5, A5-A6 and A6-B represent sub-primary windings 108A1-108A7 respectively.

Points A1V1, A41V1, A42V1 and A6V1 represent the second end 120 of the secondary windings 116A1-116A3 respectively. As previously discussed, secondary winding 116A2 has two second ends, represented by A41V1 and A42V1.

As previously discussed, some of the secondary windings include at least two sub-windings, for example, secondary winding 116A2. For example, the line A4-A4' represents the first sub-winding 116A21. The line A4'-A41V1 represents the second sub-winding 116A22 and the line A4'-A42V1 represents the second sub-winding 116A22.

The third windings are also represented in the phasor diagram. For example, the lines A-A'-AV2 represent the third winding 122A1. As previously discussed, some of the third windings include at least two sub-windings, for example, third winding 122A3. For example, the line A3-A3' represents the first sub-winding 122A31. The line A3'-A31V2 represents the second sub-winding 122A32 and the line A3'-A32V2 represents the second sub-winding 122A32.

As previously discussed, the length of lines in a phasor diagram represent the number of turns for the windings. For example, the length of line A-A1 represent number of turns N6 for sub-primary winding 108A1 of multi-transformer 1700 of FIG. 17A.

The lines SA, SB and SC represent the input AC voltage Vin applied to the exterior junctions A, B and C the primary windings 108A-108C. As it is evident from the phasor diagram, a three phase input voltage Vin depicted as phaseA_230, phaseB_230 and phaseC_230 is applied, with each phase separated by about 120 degrees.

As previously described, the lines in a phasor diagrams are vector lines depicting the vector of the induced voltage. For example, the vector of induce voltage in primary windings AB, BC and CA are depicted by the arrows 536, 538 and 540. Similarly, the arrows on lines representing the secondary windings and the third windings represent the vector of induced voltage. For example, arrow 542 represent the vector of induced voltage in the secondary winding 116A3. The arrow 546 represents the vector of inducted voltage in the third winding 122A1.

In one embodiment, the vector of induced voltage in the secondary windings and the sub-windings of the secondary windings are such that they are either in phase or 180 degrees out of phase with the vector of induced voltage in a primary winding to which they are magnetically coupled. In one embodiment, the vector of induced voltage in the secondary windings are such that the phase angle difference of the output voltage at two adjacent second ends of the secondary windings are substantially same. In one embodiment, first sub-windings and second sub-windings of a secondary winding may be magnetically coupled to two different primary windings.

In one embodiment, the vector of induced voltage in the third windings and the sub-windings are such that they are either in phase or 180 degrees out of phase with the vector of induced voltage in a primary winding to which they are magnetically coupled. In one embodiment, the first sub-winding and second sub-windings of a third winding may be magnetically coupled to two different primary windings. In one embodiment, the vector of induced voltage in the third windings are such that the phase angle difference of the output voltage at two adjacent second ends of the third windings are substantially same.

The phasor diagram 1730 shows an exemplary vector of induced voltage in the primary windings, secondary windings and the third windings of multi-phase transformer 1700.

Multi-phase transformer 1800 will be described with reference to FIGS. 18A and 18B. Transformer 1800 is another exemplary twelve phase or twenty four pulse multi-phase transformer. One of the similarities between the multi-phase transformer 1800 and multi-phase transformers 1700 described with reference to FIGS. 17A-17B is that some of the secondary windings, for example, secondary winding 116A2 include a plurality sub-windings. The coupling of some of the sub-windings of the secondary winding is different.

Figure 18A:
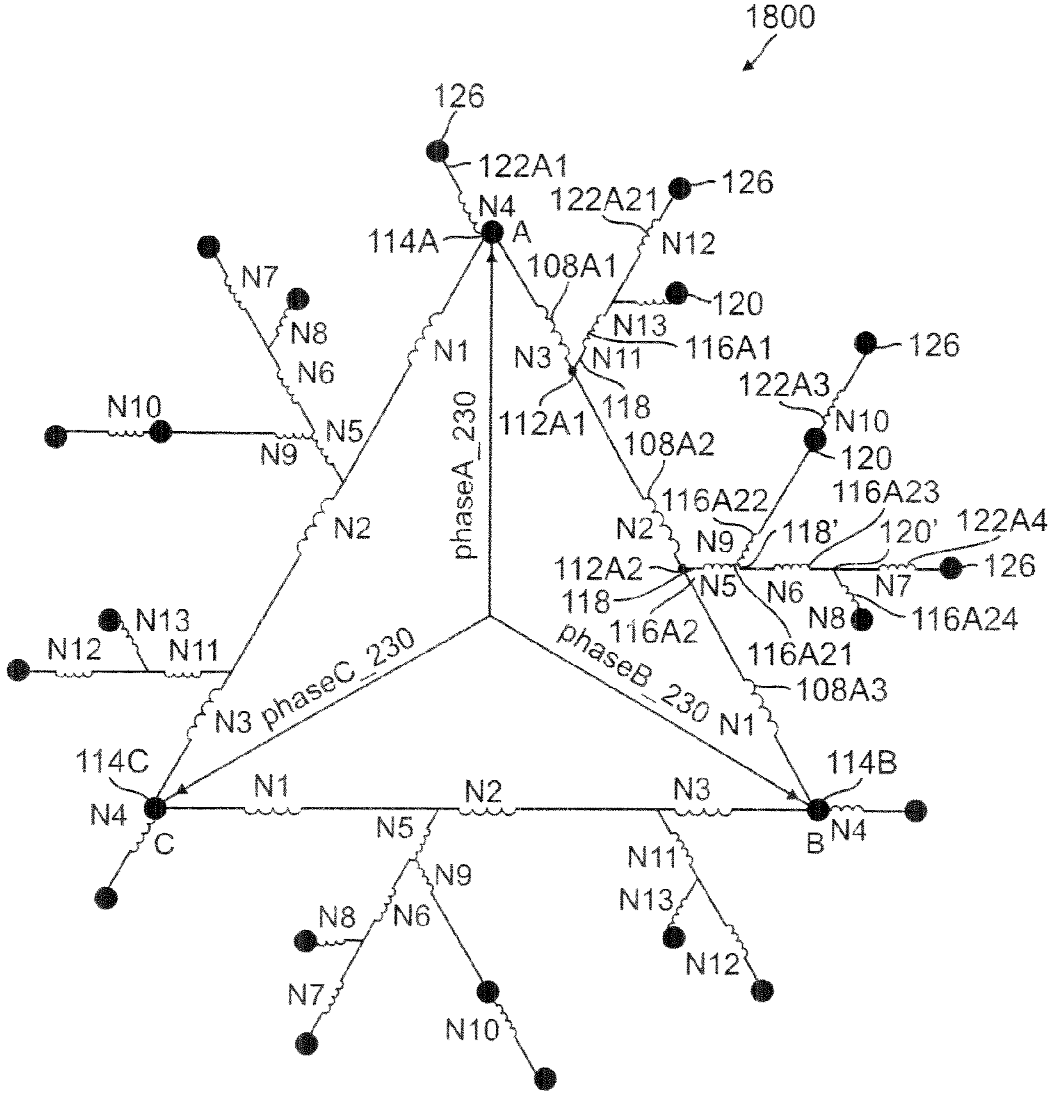
FIG. 18A is a winding diagram for an alternate multi-phase auto-transformer.

Referring FIG. 18A, in this specific embodiment, each of the primary windings 108A-108C include a plurality of sub primary windings. For example, primary winding 108A includes sub primary windings 108A1-108A3 that are coupled in series. The sub primary windings are coupled at interior junctions 112A1-112A2. Each ends of the primary windings 108A-108C are coupled to the ends of the other primary winding 108A-108C to form a delta configuration with exterior junctions 114A-114C. Each of the primary windings 108A-108C are configured to receive one phase of a multi-phase input voltage at the exterior junction 114A-114C.

The second group of windings 104 includes a plurality of secondary windings. For example, secondary windings 116A1-116A2. Each secondary winding, for example, secondary winding 116A1-116A2 has a first end 118 and at least a second end 120. Some of the secondary windings include a plurality of sub-windings connected at a sub-junction. For example, secondary winding 116A2.

For example, the secondary winding 116A2 includes a first sub-winding 116A21 and a plurality of second sub-windings 116A22, 116A23 and 116A24. One end of the first sub-winding 116A21, second sub-winding 116A22 and second sub-winding 116A23 are coupled together to define a sub-junction 118'. The other end of first sub-winding 116A21 corresponds to the first end 118 of secondary winding 116A2. The other end of second sub-winding 116A22 corresponds to a second end 120 of secondary winding 116A2. The other end of second sub-winding 116A23 may be coupled to an end of another second sub-winding 116A24 at sub-junction 120'. The other end of second sub-winding 116A24 corresponds to another second end of sub-winding 116A22.

Each secondary winding 116A1-116A2 may be magnetically coupled to one of the primary windings 108A-108C. In one embodiment, each of the sub-windings for example, first sub-windings and second sub-windings may be magnetically coupled to different primary windings. The first end 118 or each secondary winding, for example, secondary winding 116A1-116A2 may be coupled to one of the primary windings, for example, primary winding 108A. For example, the first end 118 of secondary winding 116A2 may be coupled to interior junction 122A2 of primary winding 108A.

The third group of windings 106 includes a plurality of third windings. For example, plurality of third windings 122A1-122A4. Each third winding, for example 122A1-122A4 has a first end 124 and a second end 126. Each third winding 122A1-122A4 may be magnetically coupled to one of the primary windings, for example, a primary winding 108A-108C.

In one embodiment, the first end 124 of some of the third windings, for example, third windings 122A1-122A4 may be coupled to a primary winding, for example, primary winding 108A. For example, some of the first end 124 are coupled to one of the exterior junctions 114A-114C. For example, the first end 124 of the third winding 122A1 may be coupled to exterior junction 114A.

In one embodiment, the first end 124 of some of the third windings, for example, third windings 122A1-122A4 may be coupled to a secondary winding, for example, secondary winding 116A1 and 116A2. For example, some of the first end 124 are coupled to one of the second end of a secondary winding, for example, the first end 124 of third winding 122A3 may be coupled to one of the second end 120 of secondary winding 116A2. The first end 124 of third winding 122A4 may be coupled to a sub-junction 120' of secondary winding 116A2.

In one embodiment, the phase angle difference of the output voltage Vout2 at two adjacent second ends of third windings are substantially same. For example, the phase angle difference of the output voltage Vout2 at second end 126 of two adjacent third windings 122A1-122A2 are substantially same.

In one embodiment, the output voltage Vout2 at the second end of the third windings are substantially equal. For example, the output voltage Vout2 at the second end 126 of the third windings 122A1-122A4 are substantially same.

In one embodiment, the output voltage Vout1 at the second end of secondary windings and at the exterior junction of the primary windings are the same. For example, the output voltage Vout1 at the second end 120 of secondary windings 116A1-116A2 and at the exterior junction 114A-114C of the primary windings 108A-108C are substantially equal.

In one embodiment, the output voltage Vout2 may be greater than output voltage Vout1.

FIG. 18A also shows exemplary number of turns for various windings and sub-windings, with some of the windings or sub-windings having substantially same number of turns. For example, the number of turns N1-N13 are shown in FIG. 18A.

For example, sub-primary windings 108A1, 108B1 and 108C1 each have substantially same number of turns, for example, N3.

Figure 18B:
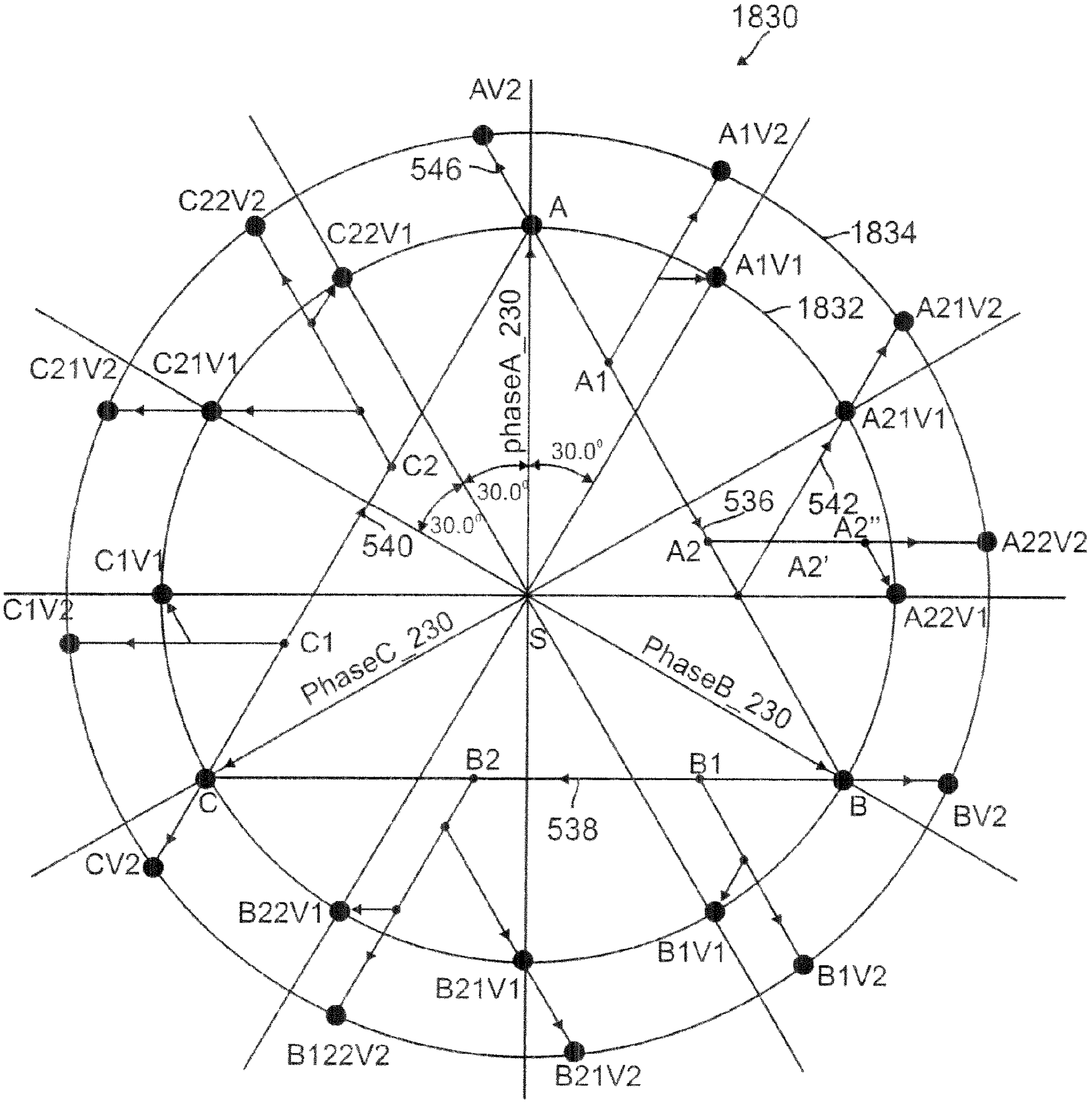
FIG. 18B is a phasor diagram for the multi-phase auto-transformer of FIG. 18A.

Now referring to FIG. 18B, exemplary phasor diagram 1830 for the multi-phase transformer 1800 of FIG. 18A is disclosed.

The phasor diagram 1830 includes a first circle 1832 and second circle 1834, both circles having a common center S. The points A, B and C represent the exterior junction 114A-114C of the primary windings. The sides AB, BC and CA of triangle ABC represent the primary windings 108A-108C respectively. For example, points A1-A2 correspond to the interior junction 112A1-112A2 respectively of the primary winding 108A. Lines A-A1, A1-A2 and A2-B represent sub-primary windings 108A1-108A3 respectively.

Points A1V1, A21V1 and A22V1 represent the second ends 120 of the secondary windings 116A1-116A2 respectively. As previously discussed, secondary winding 116A2 has two second ends, represented by A21V1 and A22V1.

As previously discussed, some of the secondary windings include at least two sub-windings, for example, secondary winding 116A2. For example, the line A2-A2' represents the first sub-winding 116A21. The line A2'-A21V1 represents the second sub-winding 116A22 the line A2"-A22V1 represents the second sub-winding 116A24.

The third windings are also represented in the phasor diagram. For example, the lines A-AV2 represent the third winding 122A1.

As previously discussed, the length of lines in a phasor diagram represent the number of turns for the windings. For example, the length of line A-A1 represent number of turns N3 for sub-primary winding 108A1 of multi-transformer 1800 of FIG. 18A.

The lines SA, SB and SC represent the input AC voltage Vin applied to the exterior junctions A, B and C of the primary windings 108A-108C. As it is evident from the phasor diagram, a three phase input voltage Vin depicted as phaseA_230, phaseB_230 and phaseC_230 is applied, with each phase separated by about 120 degrees.

As previously described, the lines in a phasor diagrams are vector depicting the vector of the induced voltage. For example, the vector of induced voltage in primary windings AB, BC and CA are depicted by the arrows 536, 538 and 540. Similarly, the arrows on lines representing the secondary windings and the third winding represent the vector of induced voltage. For example, arrow 542 represent the vector of induced voltage in the sub-winding 116A22 of secondary winding 116A2. The arrow 546 represents the vector of inducted voltage in the third winding 122A1.

In one embodiment, the vector or induced voltage in the secondary windings and the sub-windings of the secondary windings are such that they are either in phase or 180 degrees out of phase with the vector of induced voltage in a primary winding to which they are magnetically coupled. In one embodiment, the vector of induced voltage in the secondary windings are such that the phase angle difference of the output voltage at two adjacent second ends of the secondary windings are substantially same. In one embodiment, first sub-windings and second sub-windings of a secondary winding may be magnetically coupled to two different primary windings.

In one embodiment, the vector of induced voltage in the third windings and the sub-windings are such that they are either in phase or 180 degrees out of phase with the vector of induced voltage in primary winding to which they are magnetically coupled. In one embodiment, the first sub-winding and second sub-windings of a third winding may be magnetically coupled to two different primary windings. In one embodiment, the vector of induced voltage in the third windings are such that the phase angle difference of the output voltage at two adjacent second ends of the third windings are substantially same.

The phasor diagram 1830 shows an exemplary vector of induced voltage in the primary windings, secondary windings and the third windings of multi-phase transformer 1800.

Multi-phase transformer 900 will be described with reference to FIGS. 19A and 19B. Transformer 1900 is another exemplary fifteen phase or thirty pulse multi-phase transformer. One of the similarities between the multi-phase transformer 1900 and multi-phase transformer 1800 described with reference to FIG. 18A-18B is that some of the secondary windings, for example, secondary winding 116A2 include a plurality of sub-windings. The coupling of some of the sub-windings of the secondary winding is different.

Figure 19A:
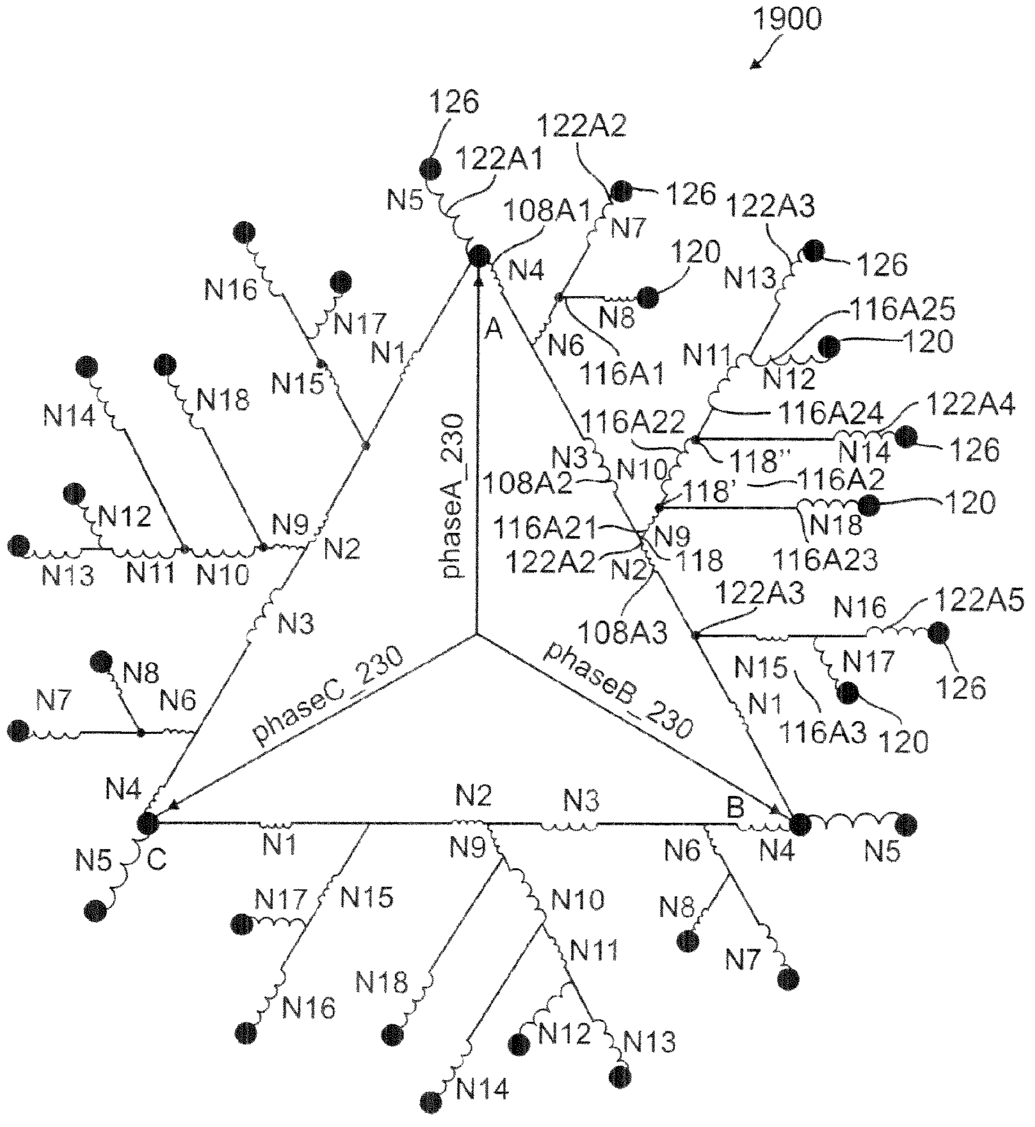
FIG. 19A is a winding diagram for an alternate multi-phase auto-transformer.

Referring to FIG. 19A, in this specific embodiment, each of the primary windings 108A-108C include a plurality of sub primary windings. For example, primary winding 108A includes sub primary windings 108A1-108A4 that are coupled in series. The sub primary windings are coupled at interior junctions 112A1-112A3. Each ends of the primary windings 108A-108C are coupled to the ends of the other primary winding 108A-108C to form a delta configuration with exterior junctions 114A-114C. Each of the primary windings 108A-108C are configured to receive one phase of a multi-phase input voltage at the exterior junction 114A-114C.

The second group of windings 104 includes a plurality of secondary windings. For example, secondary windings 116A1-116A3. Each secondary winding, for example, secondary winding 116A1-116A3 has a first end 118 and at least a second end 120. Some of the secondary windings include a plurality of sub-windings connected at a sub-junction. For example, secondary winding 116A2.

For example, the secondary winding 116A2 includes a first sub-winding 116A21 and a plurality of second sub-windings 116A22, 116A23, 116A24 and 116A25. One end of the first sub-winding 116A21, second sub-winding 116A22 and second sub-winding 116A23 are coupled together to define a sub-junction 118'. The other end of first sub-winding 116A21 corresponds to the first end 118 of secondary winding 116A2. The other end of second sub-winding 116A23 corresponds to a second end 120 of secondary winding 116A2. The other end of second sub-winding 116A22 may be coupled to an end of another second sub-winding 116A24 at sub-junction 118". The other end of second sub-winding 116A24 may be coupled to an end of another second sub-winding 116A25 at sub-junction 120'. The other end of second sub-winding 116A25 corresponds to another second end 120 of secondary winding 116A2.

Each secondary winding 116A1-116A3 may be magnetically coupled to one of the primary windings 108A-108C. In one embodiment, each of the sub-windings for example, first sub-windings and second sub-windings may be magnetically coupled to different primary windings. The first end 118 of each secondary winding, for example, secondary winding 116A1-116A3 may be coupled to one of the primary windings, for example, primary winding 108A. For example, the first end 118 of secondary winding 116A2 may be coupled to interior junction 112A2 of primary winding 108A.

The third group of windings 106 includes a plurality of third windings. For example, plurality of third windings 122A1-122A5. Each third winding, for example 122A1-122A4 has a first end 124 and a second end 126. Each third winding 122A1-122A5 may be magnetically coupled to one of the primary windings, for example, a primary winding 108A-108C.

In one embodiment, the first end 124 of some of the third windings, for example, third windings 122A1-122A5 may be coupled to a primary winding, for example, primary winding 108A. For example, some of the first end 124 are coupled to one of the exterior junctions 114A-114C. For example, the first end 124 of the third winding 122A1 may be coupled to exterior junction 114A.

In one embodiment, the first end 124 of some of the third windings, for example, third windings 122A1-122A4 may be coupled to a secondary winding, for example, secondary winding 116A1, 116A2 and 116A3. For example, some of the first end 124 are coupled to one of the sub-junctions of a secondary winding. For example, the first end 124 of third winding 122A3 may be coupled to sub-junction 120' of secondary winding 116A2. The first end 124 of third winding 122A4 may be coupled to sub-junction 118" of secondary winding 116A2.

In one embodiment, the phase angle difference of the output voltage Vout2 at two adjacent second ends of third windings are substantially same. For example, the phase angle difference of the output voltage Vout2 at second end 126 of two adjacent third windings 122A1-122A2 are substantially same.

In one embodiment, the output voltage Vout2 at the second end of the third windings are substantially equal. For example, the output voltage Vout2 at the second end 126 of the third windings 122A1-122A5 are substantially same.

In one embodiment, the output voltage Vout1 at the second end of secondary windings and at the exterior junction of the primary windings are the same. For example, the output voltage Vout1 at the second end 120 of secondary windings 116A1-116A3 and at the exterior junction 114A-114C of the primary windings 108A-108C are substantially equal.

In one embodiment, the output voltage Vout2 is greater than output voltage Vout1.

FIG. 19A also shows exemplary number of turns for various windings and sub-windings, with some of the windings or sub-windings having substantially same number of turns. For example, the number of turns N1-N17 are shown in FIG. 19A. For example, sub-primary windings 108A1, 108B1 and 108C1 each have substantially same number of turns, for example, N4.

Figure 19B:
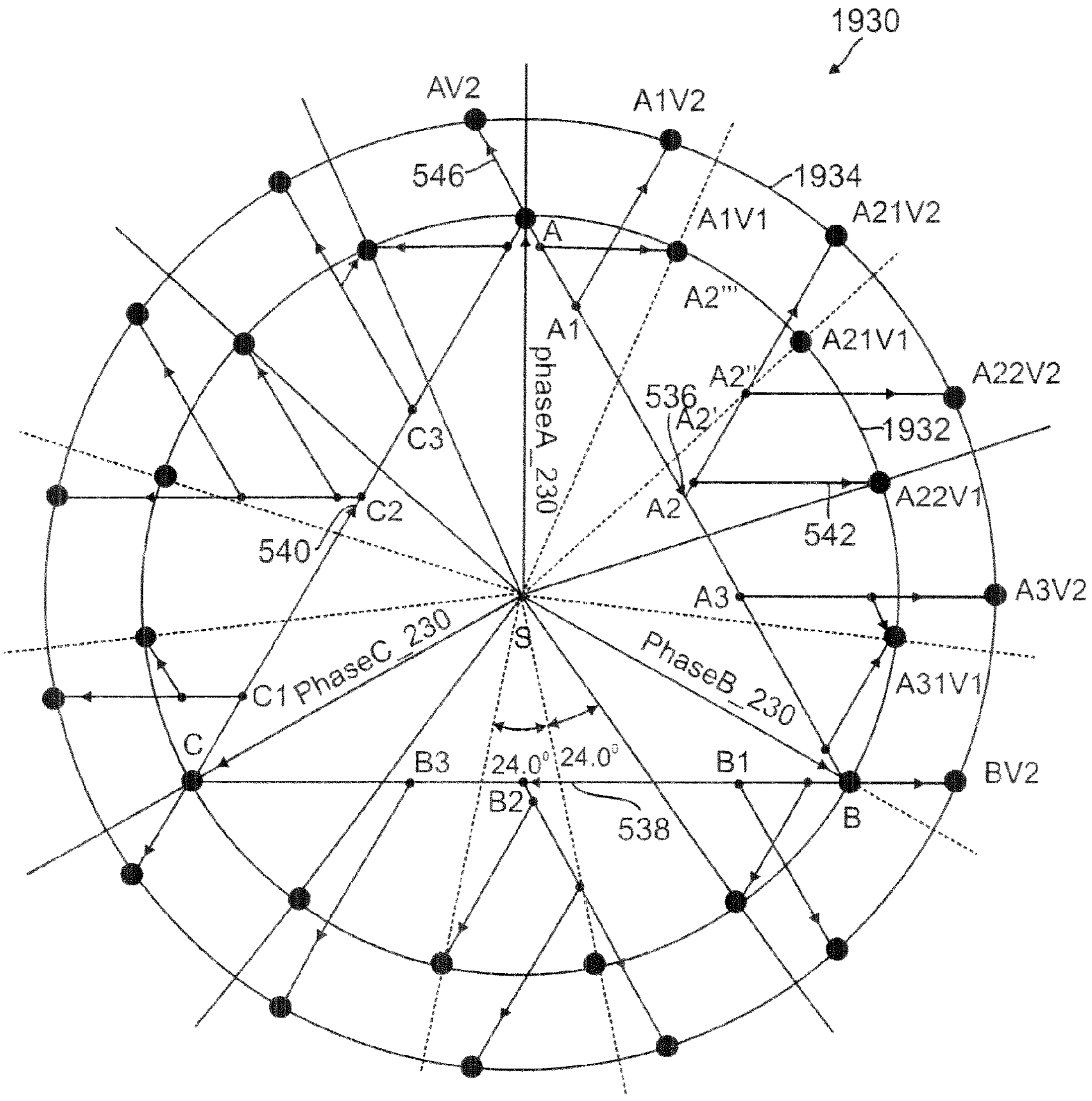
FIG. 19B is a phasor diagram for the multi-phase auto-transformer of FIG. 19A.

Now referring to FIG. 19B, exemplary phasor diagram 1930 for the multi-phase transformer 1900 of FIG. 19A is disclosed.

The phasor diagram 1930 includes a first circle 1932 and second circle 1934, both circles having a common center S. The points A, B and C represent the exterior junction 114A-114C of the primary windings. The sides AB, BC and CA of triangle ABC represent the primary windings 108A-108C respectively. For example, points A1-A3 correspond to the interior junction 112A1-112A3 respectively of the primary winding 108A. Lines A-A1, A1-A2, A2-A3 and A3-B represent sub-primary windings 108A1-108A4 respectively.

Points A1V1, A21V1, A22V1 and A23V1 represent the second ends 120 of the secondary windings 116A1-116A3 respectively. As previously discussed, secondary winding 116A2 has two second ends, represented by A21V1 and A22V1.

As previously discussed, some of the secondary windings include at least two sub-windings, for example, secondary winding 116A2. For example, the line A2-A2' represents the first sub-winding 116A21. The line A2'-A22V1 represents the second sub-winding 116A23 and the line A2'-A2" represents the second sub-winding 116A22.

The third windings are also represented in this phasor diagram. For example, the lines A-AV2 represent the third winding 122A1.

As previously discussed, the length of lines in a phasor diagram represent the number of turns for the windings. For example, the lines of line A-A1 represent number of turns N4 or sub-primary winding 108A1 of multi-transformer 1900 of FIG. 19A.

The lines SA, SB and SC represent the input AC voltage Vin applied to the exterior junctions A, B and C of the primary windings 108A-108C. As it is evident from the phasor diagram, a three phase input voltage Vin depicted as phaseA_230, phaseB_230 and phaseC_230 is applied, with each phase separated by about 120 degrees.

As previously described, the lines in a phasor diagrams are vector lines depicting the vector of the induced voltage. For example, the vector of induced voltage in primary windings AB, BC and CA are depicted by arrows 536, 538 and 540. Similarly, the arrows on lines representing the secondary windings and the third windings represent the vector of induced voltage. For example, arrow 542 represent the vector of induced voltage in the sub-winding 116A23 of secondary winding 116A2. The arrow 546 represents the vector of inducted voltage in the third winding 122A1.

In one embodiment, the vector of induced voltage in the secondary windings and the sub-windings of the secondary windings are such that they are either in phase or 180 degrees out of phase with the vector of induced voltage in a primary winding to which they are magnetically coupled. In one embodiment, the vector of induced voltage in the secondary windings are such that the phase angle difference of the output voltage at two adjacent second ends of the secondary windings are substantially same. In one embodiment, first sub-windings and second sub-windings of a secondary winding may be magnetically coupled to two different primary windings.

In one embodiment, the vector of induced voltage in the third windings and the sub-windings are such that they are either in phase or 180 degrees out of phase with the vector of induced voltage in a primary winding to which they are magnetically coupled. In one embodiment, the first sub-winding and second sub-windings of a third winding may be magnetically coupled to two different primary windings. In one embodiment, the vector of induced voltage in the third windings are such that the phase angle difference of the output voltage at two adjacent second ends of the third windings are substantially same.

The phasor diagram 1930 shows an exemplary vector of induced voltage in the primary windings, secondary windings and the third windings of multi-phase transformer 1900.

As one skilled in the art appreciates, various embodiments of multi-phase transformers have been described. Using various variations of the first group of windings, second group of windings and third group of windings, multi-phase transformers providing different number of phases or pulses may be configured.

The number of turns for windings shown in each of the winding diagrams are exemplary for the multi-phase transformer described with reference to that winding diagram only. For example, number of turns N1 described with reference to transformer 100 of FIG. 1A may not be equal to the number of turns N1 described with reference to transformer 1500 of FIG. 15A.

Although exemplary vector of induced voltage in the primary windings, secondary windings and third windings have been shown with reference to various phasor diagrams, as one skilled in the art appreciates, modifications may be made to magnetic coupling configurations.

In one embodiment, with reference to six phase or twelve pulse transformers, the phase angle difference of the output voltage at two adjacent second ends of third windings are about 60 degrees. In one embodiment, the phase angle difference of the output voltage at two adjacent second ends of secondary windings and the exterior junctions are about 60 degrees.

In one embodiment, with reference to nine phase or eighteen pulse transformers, to phase angle difference of the output voltage at two adjacent second ends of third windings are about 40 degrees. In one embodiment, the phase angle difference of the output voltage at two adjacent second ends of secondary windings and the exterior junctions are about 40 degrees.

In one embodiment, with reference to twelve phase or twenty four pulse transformers, the phase angle difference of the output voltage at two adjacent second ends of third windings are about 30 degrees. In one embodiment, the phase angle difference of the output voltage at two adjacent second ends of secondary windings and the exterior junctions are about 30 degrees.

In one embodiment, with reference to fifteen phase or thirty pulse transformers, the phase angle difference of the output voltage at two adjacent second ends of third windings are about 24 degrees. In one embodiment, the phase angle difference of the output voltage at two adjacent second ends of secondary windings and the exterior junctions are about 24 degrees.

Although the present disclosure has been described with reference to specific embodiments, these embodiments are illustrative only and not limiting. Many other applications and embodiments of the present disclosure will be apparent in light or this disclosure and the following claims.

What is claimed is:

1. A multi-phase transformer, comprising:

a first group of windings having a plurality of primary windings;

wherein each primary winding includes one or more sub primary windings coupled in series, and a junction of two sub primary windings defines an interior junction;

wherein each end of the primary windings is coupled to an end of another primary winding to form a delta configuration and a junction of two primary windings defines an exterior junction; and wherein each of the primary windings is configured to receive a phase of a multi-phase input voltage at the exterior junction;

a second group of windings having a plurality of secondary windings and each secondary winding has a first end and a second end;

wherein the first end of each secondary winding is coupled to one of the primary windings;

wherein each secondary winding is magnetically coupled to a primary winding from among the plurality of plurality of primary winding; and a third group of windings having a plurality of third windings;

wherein each third winding includes a first end and a second end, and the first end of each of the third winding is coupled to a secondary winding from among the plurality of secondary windings or to a primary winding from among the plurality of primary windings;

wherein each third winding is magnetically coupled to a primary winding from among the plurality of primary windings;

wherein the third group of windings is configured such that an output voltage at the second end of the third windings is higher than an output voltage at the second end of the secondary windings and the exterior junction of the primary windings.

2. The transformer of claim 1, wherein a phase angle difference between output voltage at two adjacent second ends of the third windings are substantially same.

3. The transformer of claim 2, wherein the output voltage at the second end of the third windings is substantially equal and the output voltage at the second end of the secondary windings and the exterior junction of the primary windings are substantially equal.

4. The transformer of claim 1, wherein a plurality of second end of the third windings are configured to couple to a rectifier circuit to rectify the output voltage at the second end of the third windings and output a rectified second voltage.

5. The transformer of claim 4, wherein the rectified second voltage is greater than a rectified output voltage derived from rectifying an input voltage.

6. The transformer of claim 4, wherein a plurality of the second ends of the second windings and the exterior junction of the primary windings are configured to couple to a rectifier circuit to rectify an output voltage at the second end and the exterior junction, and output a rectified first voltage which is less than the rectified second voltage.

7. The transformer of claim 6, wherein the rectified first voltage is substantially equal to a rectified output voltage derived from rectifying the input voltage.

8. The transformer of claim 2, wherein the phase angle difference is about 60, 40, 30, or 24 degrees.

9. The transformer of claim 1, wherein a vector of induced voltage in each of the plurality of secondary windings is in-phase with a vector of an induced voltage in a primary winding other than a primary winding to which the secondary winding is coupled.

10. The transformer of claim 1, wherein the third winding includes at least a first sub-winding and a second sub-winding connected in series, and a vector of an induced voltage in the first sub-winding is different from a vector of an induced voltage in the second sub-winding.

11. The transformer of claim 10, wherein the first end of at least two of the secondary windings are jointly coupled to a common interior junction of one of the primary windings.

12. The transformer of claim 11, wherein the first end of the third winding is coupled to either the external junction of one of the plurality of primary windings or to one of the second end of one of the plurality secondary windings that are jointly coupled.

13. The transformer of claim 1, wherein all of the third windings include at least two sub-windings connected in series; wherein the first end of the third windings is coupled to either the external junction of one of the primary windings or one of the second end of one of the secondary windings; and wherein a vector of induced voltage in a sub-winding is different than a vector of induced voltage in another sub-winding such that a phase angle difference of an output voltage at two adjacent second ends of the third windings are substantially same.

14. The transformer of claim 1, wherein some of the third windings include at least two sub-winding connected in series; and other third windings do not include a sub-winding; and wherein the first end of a combination of third windings with sub-windings and the third windings without sub-winding are coupled to each of the external junction of the plurality of primary windings.

15. The transformer of claim 14, wherein some of the third windings without sub-windings are coupled to an interior junction of the primary windings and a phase angle difference of the output voltage at two adjacent second ends of the third windings are substantially same.

16. A multi-phase transformer, comprising:

a first group of windings having a plurality of primary windings;

wherein each primary winding includes one or more sub primary windings coupled in series, and a junction of two sub primary windings defines an interior junction;

wherein each end of the plurality of primary windings is coupled to an end of another primary winding to form a delta configuration and a junction of two primary windings defines an exterior junction; and each of the plurality of primary windings is configured to receive a phase of a multi-phase input voltage at the exterior junction;

a second group of windings having a plurality of secondary windings and each secondary winding has a first end and a second end;

wherein each secondary winding is magnetically coupled to a primary winding from among the plurality of primary windings;

wherein a first end of each secondary winding from among the plurality of secondary windings is coupled to an interior junction of one of the primary windings; and a third group of windings having a plurality of third windings; wherein each third winding is magnetically coupled to a primary winding from among the plurality of primary windings;

wherein each of the third winding includes a first end and a second end; wherein the first end is coupled to the second end of a secondary winding from among the plurality of secondary windings; or to an exterior junction of a primary winding from among the plurality of primary windings; and wherein the third group of windings is configured such that an output voltage at the second end of the third windings is higher than an output voltage at the second end of the secondary windings and the exterior junction of the primary windings.

17. A multi-phase transformer, comprising:

a first group of windings having a plurality of primary windings;

wherein each primary winding includes one or more sub primary windings coupled in series, and a junction of two sub primary windings define an interior junction;

wherein each end of a primary winding from among the plurality of primary windings is coupled to an end of another primary winding to form a delta configuration and a junction of two primary windings defines an exterior junction; and each of the plurality of primary windings is configured to receive a phase of a multi-phase input voltage at the exterior junction;

a second group of windings having a plurality of secondary windings and each secondary winding has a first end and a second end;

wherein each secondary winding is magnetically coupled to a primary winding from among the plurality of primary windings; and wherein the first end of each secondary winding is coupled to an interior junction of one of the primary windings; and a third group of windings having a plurality of third windings; wherein each third winding is magnetically coupled to a primary winding;

wherein each of the third winding includes a first end and a second end; wherein the first end is coupled to an interior junction of one of the plurality of primary windings other than an interior junction to which a secondary winding is coupled or to an exterior junction of one of the primary winding from among the plurality of primary windings; and wherein the third group of windings is configured such that an output voltage at the second end of the third windings is higher than an output voltage at the second end of the secondary windings and the exterior junction of the primary windings.

18. The transformer of claim 17, wherein a vector of induced voltage in each of the plurality of secondary windings is in-phase with a vector of induced voltage in a primary winding other than a primary winding to which the secondary winding is coupled; and wherein a vector of induced voltage in a third winding coupled to either an interior junction or an exterior junction of a primary winding is in-phase with an induced voltage in the secondary winding that is also coupled to the same primary winding such that a phase angle difference of the output voltage at two adjacent second ends of the third windings are substantially same.

19. A multi-phase transformer, comprising:

a first group of windings having a plurality of primary windings;

wherein each primary winding includes one or more sub primary windings coupled in series, and a junction of two sub primary windings defines an interior junction;

wherein each end of the primary windings is coupled to an end of another primary winding to form a delta configuration and a junction of two primary windings defines an exterior junction; and each of the primary winding is configured to receive a phase of a multi-phase input voltage at the exterior junction;

a second group of windings having a plurality of secondary windings and each secondary winding has a first end and a second end;

wherein each secondary winding is magnetically coupled to a primary winding; and wherein the first end of each of the plurality of secondary winding is coupled to an interior junction of one of the plurality of primary windings; and a third group of windings having a plurality of third windings; wherein each third winding is magnetically coupled to a primary winding from among the plurality of primary windings;

wherein each of the third winding includes a first end and a second end;

wherein the first end of each of the third winding is coupled to a second end of a secondary winding from among the plurality of secondary windings, an interior junction of the primary winding or an exterior junction of the primary winding; and wherein the third group of windings is configured such that an output voltage at the second end of the third windings is higher than an output voltage at the second end of the plurality secondary windings and the exterior junction of the plurality of primary windings.

20. The transformer of claim 19, wherein the first end of at least two of the secondary windings are jointly coupled to a common interior junction of one of the primary windings; and wherein the first end of a third winding is not coupled to one of the at least two of the secondary windings that are jointly coupled.

21. The transformer of claim 20, wherein a vector of induced voltage in the third windings is such that a phase angle difference of the output voltage at two adjacent second ends of the third windings are substantially same.

22. A multi-phase transformer, comprising:

a first group of windings having a plurality of primary windings;

wherein each primary winding includes one or more sub primary windings coupled in series, and a junction of two sub primary windings define an interior junction;

wherein each end of the primary windings is coupled to an end of another primary winding to form a delta configuration and a junction of two primary windings define an exterior junction; and wherein each of the plurality of primary windings is configured to receive a phase of a multi-phase input voltage at the exterior junction;

a second group of windings having a plurality of secondary windings and each secondary winding has a first end and a second end; wherein each of the secondary winding is magnetically coupled to a primary winding from among the plurality of primary windings; and wherein some of the secondary windings include a plurality of sub-windings coupled in series, and a junction of two sub-windings defines a sub-junction;

wherein the first end of each secondary winding is coupled to an interior junction of one of the primary windings; and a third group of windings having a plurality of third windings; wherein each of the third winding is magnetically coupled to a primary winding from among the plurality of primary windings;

wherein each of the third winding includes a first end and a second end;

wherein the first end of each of the third winding is coupled to a second end of a secondary winding from among the plurality of secondary windings, a sub-junction of a secondary winding or an exterior junction of the primary winding from among the plurality of primary windings;

wherein the third group of windings is configured such that an output voltage at the second end of the third windings is higher than an output voltage at the second end of the secondary windings and the exterior junction of the primary windings.

23. The transformer of claim 22, wherein some of the secondary windings include more than one second end formed by ends of one or more additional sub-windings coupled to a sub-junction of two sub-windings.

24. The transformer of claim 22, wherein all of the secondary windings include a plurality of sub-windings and none of the first end of each of the third winding is coupled to a second end of a secondary winding from among the plurality of secondary windings.

25. The transformer of claim 23, wherein each of the third windings include at least two sub-windings connected in series; and each third winding is coupled to either the external junction of the primary windings or one of the second end of the plurality of secondary windings; and wherein a vector of induced voltage in a sub-winding is different than a vector of induced voltage in another sub-winding such that a phase angle difference of the output voltage at two adjacent second ends of the third windings are substantially same.

26. The transformer of claim 22, wherein the secondary windings include a plurality of sub-windings; and wherein each of the third windings include at least two sub-windings;

wherein the first end of each of the third winding is coupled to either an external junction of the plurality of primary windings or one of the sub-junctions of the plurality of secondary windings; and none of the first end of each of the third winding is coupled to a second end of a secondary winding from among the plurality of secondary windings; and wherein a vector of induced voltage in a sub-winding is different than a vector of induced voltage in another sub-winding such that a phase angle difference of the output voltage at two adjacent second ends of the third windings are substantially same.

27. The transformer of claim 22, wherein the secondary windings include a plurality of sub-windings; and the third windings include at least two sub-windings connected in series; and each of the first end of a third winding from among the third windings is coupled to either an external junction of the plurality of primary windings or one of the sub-junctions of the plurality of secondary windings; and none of the first end of each of the third winding is coupled to a second end of a secondary winding from among the plurality of secondary windings; and wherein a vector of induced voltage in a sub-winding is different than a vector of induced voltage in another sub-winding such a phase angle difference of the output voltage at two adjacent second ends of the third windings are substantially same.

28. The transformer of claim 23, wherein some of the third windings include at least two sub-windings connected in series, and a junction of two sub-windings defines a sub-junction.

29. The transformer of claim 28, wherein some of the third windings include more than one second end formed by an end of one or more additional sub-windings coupled to the sub-junction of two sub-windings; and wherein the first end of each of the plurality of third windings with a sub-winding is coupled to an interior junction of the primary windings.

30. The transformer of claim 29, wherein each of the third windings without a sub-winding is coupled to an interior junction or an exterior junction of the plurality of primary windings; and none of the third windings is coupled to a second end of the secondary windings; and wherein a vector of induced voltage in a sub-winding is different than the vector of induced voltage in another sub-winding such that a phase angle difference of the output voltage at two adjacent second ends of the third windings are substantially same.

31. A multi-phase transformer, comprising:

a first group of windings having a plurality of primary windings;

wherein each primary winding includes one or more sub primary windings coupled in series, and a junction of two sub primary windings define an interior junction;

wherein each end of the primary windings is coupled to an end of another primary winding to form a delta configuration and a junction of two primary windings define an exterior junction;

wherein each of the primary windings is configured to receive a phase of a multi-phase input voltage at the exterior junction;

a second group of windings having a plurality of secondary windings and each secondary winding has a first end and a second end;

wherein some of the secondary windings include a plurality of sub-winding connected in series, junction of two sub-windings define a sub-junction;

wherein each secondary winding is magnetically coupled to a primary winding;

wherein the first end of each of the secondary winding is coupled to an interior junction of one of the primary windings or to the exterior junction of the primary windings; and a third group of windings having a plurality of third windings;

wherein each of the third winding includes a first end and a second end;

wherein some of the third windings include at least two sub-windings connected in series, with junction of two sub-windings define a sub-junction;

wherein each of the third winding is magnetically coupled to a primary winding;

wherein the first end of each of the third winding is coupled to a sub-junction of a secondary winding or an exterior junction of the primary winding; and wherein the third group of windings is configured such that an output voltage at the second end of the third windings is higher than an output voltage at the second end of the secondary windings and the exterior junction of the primary windings.

32. The transformer of claim 31, wherein the third group of windings includes at least two sub-windings coupled to a sub-junction of a secondary winding from among the plurality of secondary windings and the secondary winding is coupled to an external junction of the plurality of primary windings.

* * * * *